United States Patent [19]

Duso et al.

[11] Patent Number: 5,892,915
[45] Date of Patent: Apr. 6, 1999

[54] SYSTEM HAVING CLIENT SENDING EDIT COMMANDS TO SERVER DURING TRANSMISSION OF CONTINUOUS MEDIA FROM ONE CLIP IN PLAY LIST FOR EDITING THE PLAY LIST

[75] Inventors: Wayne W. Duso, Shrewsbury; John Forecast, Newton, both of Mass.

[73] Assignee: EMC Corporation, Hopkinton, Mass.

[21] Appl. No.: 851,560

[22] Filed: May 5, 1997

Related U.S. Application Data

[60] Provisional application No. 60/044,948, Apr. 25, 1997.

[51] Int. Cl.$^6$ .................................................. G06F 13/00
[52] U.S. Cl. ........................................ 395/200.49; 348/7
[58] Field of Search ........................ 395/200.33, 200.49, 395/200.57, 200.56, 200.59; 348/7, 12, 13, 552, 906

[56] References Cited

U.S. PATENT DOCUMENTS

| | | | |
|---|---|---|---|
| 4,608,688 | 8/1986 | Hansen et al. | 371/11 |
| 4,755,928 | 7/1988 | Johnson et al. | 364/200 |
| 5,109,482 | 4/1992 | Bohrman | 345/328 |
| 5,175,837 | 12/1992 | Arnold et al. | 395/425 |
| 5,206,939 | 4/1993 | Yanai et al. | 395/400 |
| 5,208,665 | 5/1993 | McCalley et al. | 358/862 |
| 5,218,672 | 6/1993 | Morgan et al. | 345/501 |
| 5,218,695 | 6/1993 | Noveck et al. | 395/600 |

(List continued on next page.)

FOREIGN PATENT DOCUMENTS

| | | | |
|---|---|---|---|
| 0 061 570 A3 | 10/1982 | European Pat. Off. | G11C 9/06 |
| 633694 A1 | 1/1995 | European Pat. Off. | H04N 7/173 |
| 0 683 464 A2 | 11/1995 | European Pat. Off. | G06F 17/60 |
| 0 697 660 A1 | 2/1996 | European Pat. Off. | G06F 11/20 |
| 0 701 372 A1 | 3/1996 | European Pat. Off. | H04N 7/173 |
| WO 93/16557 | 8/1993 | WIPO | H04N 7/14 |
| WO 94/00816 | 1/1994 | WIPO | G06F 13/00 |
| WO 95/10918 | 4/1995 | WIPO | H04N 7/14 |
| WO 97/10623 | 5/1997 | WIPO | H04N 7/173 |

OTHER PUBLICATIONS

M(aurice) William Collins, "A Network File Storage System," IEEE Seventh Symposium on Mass Storage Systems, Nov. 4–7, 1985, Tuscon, AZ, pp. 1–11, Los Alamos Nat. Lab. No. LA–UR–85–3183.

John H. Howard, "An Overview of the Andrew File System," USENIX Winter Conference, Feb. 9–12, 1988, Dallas, TX, pp. 23–26.

John H. Howard et al., "Scale and Performance in a Distributed File System," ACM Transactions on Computer Systems, vol. 6, No. 1, Feb. 1988, pp. 51–81.

(List continued on next page.)

*Primary Examiner*—Moustafa M. Meky
*Attorney, Agent, or Firm*—Arnold White & Durkee

[57] ABSTRACT

A protocol and interface provides continuous play over multiple clips for extended periods of time, allows a play-list to be edited dynamically after being given to the video server and during playback of clips in the play-list, allows some notion of "current time" to be used during the streaming of continuous media data, and supports features of the "Louth Automation" video disk communications protocol. Preferably, the client application first creates a session with a play-list containing a fixed number of entries; the number should be as small as possible consistent with the client's requirements. The client edits this play-list by appending the first few clips and then starts the session playing. Each time transmission of video data of a clip is completed, the clip is removed from the head of the play-list, all other clips are moved down, and a callback is issued to the client with the current, updated, play-list. A callback is also issued with the updated play-list to acknowledge each edit command. Preferably, there is a limit as to how close to air-time a clip normally may be deleted or new material inserted, in order to ensure continuity of transmission of the video stream of each clip. To allow live break-ins or other "emergency" operations, however, the session may be paused and later resumed and subsequent clips may be "trimmed" to reduce their play times to recover the time lost to the break-in.

63 Claims, 36 Drawing Sheets

U.S. PATENT DOCUMENTS

| | | |
|---|---|---|
| 5,255,270 | 10/1993 | Yanai et al. ............................. 371/10.2 |
| 5,267,092 | 11/1993 | Kizu et al. ................................. 386/55 |
| 5,269,011 | 12/1993 | Yanai et al. ............................. 395/425 |
| 5,276,860 | 1/1994 | Fortier et al. ........................... 395/575 |
| 5,276,867 | 1/1994 | Kenley et al. ........................... 395/600 |
| 5,335,352 | 8/1994 | Yanai et al. ............................. 395/800 |
| 5,341,493 | 8/1994 | Yanai et al. ............................. 395/425 |
| 5,367,698 | 11/1994 | Webber et al. .......................... 395/800 |
| 5,371,532 | 12/1994 | Gelman et al. ............................. 348/7 |
| 5,381,539 | 1/1995 | Yanai et al. ............................. 395/425 |
| 5,408,465 | 4/1995 | Gusella et al. ............................ 370/17 |
| 5,410,343 | 4/1995 | Coddington et al. ....................... 348/7 |
| 5,414,455 | 5/1995 | Hooper et al. .............................. 348/7 |
| 5,442,390 | 8/1995 | Hooper et al. .............................. 348/7 |
| 5,442,771 | 8/1995 | Filepp et al. ....................... 395/200.08 |
| 5,469,270 | 11/1995 | Yamamoto ............................... 386/55 |
| 5,477,263 | 12/1995 | O'Callaghan et al. ...................... 348/7 |
| 5,508,732 | 4/1996 | Bottomley et al. .......................... 348/7 |
| 5,508,733 | 4/1996 | Kassatly .................................. 348/13 |
| 5,528,282 | 6/1996 | Voeten et al. ............................... 348/7 |
| 5,528,513 | 6/1996 | Vaitzblit et al. .................... 364/514 A |
| 5,530,557 | 6/1996 | Asit et al. ............................... 358/342 |
| 5,533,021 | 7/1996 | Branstad et al. ....................... 370/60.1 |
| 5,534,912 | 7/1996 | Kostreski ................................... 348/6 |
| 5,537,408 | 7/1996 | Branstad et al. .......................... 370/79 |
| 5,539,660 | 7/1996 | Blair et al. ........................... 364/514 C |
| 5,544,313 | 8/1996 | Shachnai et al. ................... 395/200.01 |
| 5,544,327 | 8/1996 | Dan et al. ................................ 395/250 |
| 5,544,345 | 8/1996 | Carpenter et al. ...................... 395/477 |
| 5,544,347 | 8/1996 | Yanai et al. ............................. 395/489 |
| 5,550,577 | 8/1996 | Verbiest et al. ............................. 348/7 |
| 5,553,005 | 9/1996 | Voeten et al. ....................... 364/514 R |
| 5,553,281 | 9/1996 | Brown et al. ............................ 707/104 |
| 5,557,317 | 9/1996 | Nishio et al. ............................... 348/7 |
| 5,559,949 | 9/1996 | Reimer et al. ........................... 395/161 |
| 5,583,561 | 12/1996 | Baker et al. ............................... 347/7 |
| 5,584,006 | 12/1996 | Reber et al. ............................. 711/100 |
| 5,586,264 | 12/1996 | Belknap et al. ................... 395/200.08 |
| 5,594,910 | 1/1997 | Filepp et al. ............................ 395/800 |
| 5,603,058 | 2/1997 | Belknap et al. ......................... 395/855 |
| 5,606,359 | 2/1997 | Youden et al. ............................. 348/7 |
| 5,640,320 | 6/1997 | Jackson et al. ......................... 364/192 |
| 5,687,332 | 11/1997 | Kurahashi et al. ...................... 345/333 |
| 5,732,219 | 3/1998 | Blumer et al. ...................... 395/200.57 |
| 5,799,150 | 8/1998 | Hamilton et al. .................. 395/200.33 |

OTHER PUBLICATIONS

David C. Steere et al., "Efficient User–Level File Cache Management on the Sun Vnode Interface," USENIX Summer Conference, Jun. 11–15, 1990, Anaheim, CA, pp. 325–331.

Matt Blaze et al., "Long–Term Caching Strategies for Very Large Distributed File Systems," USENIX, Summer '91, Nashville, TN, pp. 3–15.

Thomas W. Page, Jr., et al., "Management of Replicated Volume Location Data in the Ficus Replicated File System," USENIX, Summer '91, Nashville, TN, pp. 17–29.

Storage Computer Corporation, "High Performance, Fault Tolerant Disk Array Platform For File Servers And Computer Systems," 1991, Nashua, NH, 12 pages.

France Telecom, "Telesauvegarde," 26 page paper dated Nov. 2, 1994 about work based on France Telecom patent application Dispositif et Proceed de Sauvegaude a Distance de Donnees Numeriques [Method and Apparatus for Safeguarding at a Distance Numeric Data], Institute National de la Propiete Industrielle, France, Appln. No. 93.12771, Oct. 28, 1994 (filed Oct. 21, 1993), and partial English translation (15 pages).

Krishnan Natarajan, "Video Servers Take Root," IEEE Spectrum, Apr. 1995, IEEE, New York, NY, pp. 66–69.

K. K. Ramakrishnan et al., "Operating system support for a video–on–demand file service," Multimedia Systems (1995) 3:53–65.

Ralf Steinmetz, "Analyzing the Multimedia Operating System," IEEE MultiMedia, Spring 1995, pp. 68–84.

Audrey Chou, "EMC, Computer–Storage Leader, Still Hears Footsteps," The Wall Street Journal, Aug. 9, 1995, Dow Jones & Co., Princeton, N.J.

Pardhu Vadlamudi, "EMC Hunts for Solution to Bottlenecks," InfoWorld, Apr. 15, 1996, #1590, San Mateo, CA 94402.

Michael Goldberg, "EMC to Pump Data Over Networks," *Computerworld*, Apr. 15, 1996.

"EMC Moves Into Servers," *Broadcasting Cable*, Apr. 15, 1996.

"Symmetrix Model 55XX Product Manual, P/N 200–810–550 Rev D," EMC Corporation, Hopkinton, Mass., May 1994, pp.1–236.

"NFS: Network File System Protocol Specification ," RFC 1094, Sun Microsystems, Inc., Mar. 1989, pp. 1–27.

J. Case, M. Fedor, M. Schoffstall, J. Davin, "A Simple Network Management Protocol (SNMP)," May 1990, MIT Laboratory for Computer Science, Cambridge, Mass., pp. 1–35.

Rangen PV, Vin HM, "Designing file systems for digital video and audio," Proceedings of the 13th ACM Symposium on Operating Systems Principles, Monterey, Calif., 1991, pp. 81–94.

Vin HM, Rangan PV, (1993) "Designing a multiuser HDTV storage server," IEEE Journal on Selected Areas in Communication, vol. 11, No. 1, Jan. 1993, pp. 153–164.

Anderson DP, Osawa Y, Govindan R, "A file system for continuous media," ACM Transactions on Computer Systems, vol. 10., No. 4, Nov. 1992, pp. 311–337.

Federighi C, "A Distributed Hierarchical Storage Manager for a Video–on–Demand System," Department of Electrical Engr. and Computer Science, University of California, Berkeley, California, Dec. 1993.

Haskins R, "The shark continuous–media file server," Proceedings IEEE COMPCON 93, San Francisco, Calif., 1993, pp. 12–15.

Little TD, Rhanger G, Folz RJ, Gibbon JF, Reeve FW, Schelleng DH, Venkatesh D, "A digital on–demand video service supporting content based queries," Proceedings of ACM Multimedia 93, Anaheim, Calif., Aug. 1–6, 1993, pp. 427–436.

Lougher, P. Sheperd, D. "The design of a storage server for continuous media," The Computer Journal, vol. 36, No. 1, 1993, pp. 32–42.

Rangan PV, Vin HM, Ramanathan S, "Designing an on–demand multimedia service," IEEE Communications Magazine, vol. 30, No. 7, Jul. 1992, pp. 56–64.

Sincoskie, WD, "System architecture for a large scale video on demand service," Computer Networks and ISDN Systems, vol. 22, No. 2, Sep. 1991, pp. 155–162.

Tobagi FA, Pang J, "StarWorks (Trademark)—A video applications server," Proceedings, IEEE COMPCON 93, San Francisco, Calif., 1993, pp. 4–11.

Vaitzblit L, "The design and implementation of a high bandwidth file service for continuous media," Master's Thesis, Massachusetts Institute of Technology, Cambridge, Mass., Nov. 4, 1991.

TRANSFER UNIT MAPPING TABLE 230

| TRANSFER UNIT INDEX | DRIVE INDEX | HYPER-VOL. INDEX |
|---|---|---|
| 0 | 1 | 0 |
| 1 | 2 | 0 |
| 2 | 3 | 0 |
| 3 | 4 | 0 |
| 4 | 5 | 0 |
| 5 | 6 | 0 |
| 6 | 7 | 0 |
| 7 | 0 | 1 |
| • | • | • |
| • | • | • |
| • | • | • |
| 26 | 6 | 3 |
| 27 | 7 | 3 |

SYSTEM HAVING CLIENT SENDING EDIT COMMANDS TO SERVER DURING TRANSMISSION OF CONTINUOUS MEDIA FROM ONE CLIP IN PLAY LIST FOR EDITING THE PLAY LIST

RELATED APPLICATIONS

The present application is a continuation of provisional application Ser. No. 60/044,948 filed Apr. 25, 1997 by Dinesh Venkatesh, Wayne W. Duso, John Forecast, Uday Gupta, Uresh K. Vahalia, and Dennis P. J. Ting, entitled "Raid Striping, Client-Server Protocols, and Failover Services for a Video File Server."

AUTHORIZATION PURSUANT TO 37 C.F.R § 1.17(e)

A portion of the disclosure of this patent document contains command formats and other computer language listings all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates generally to a video file server, and more particularly to a client-server protocol and interface for providing the video server with open network connectivity.

2. Background Art

There are various industry-standard network file access protocols, such as the Network File System (NFS, version 2 and version 3). NFS is a well-known IETF file access protocol standard (RFC 1094, Sun Microsystems, Inc., "NFS: Network File System Protocol Specification," Mar. 1, 1989). NFS acts as a network server for network communications by providing basic file access operations for network clients. Such basic file access operations include opening a file, reading a file, writing to a file, and closing a file.

It is also known to provide a video server with an access protocol supporting isochronous real-time data transmission from continuous media. The file access protocol provides functions such as opening a movie, playing a movie, stopping play of a movie, and "fast forward" and "fast reverse" functions. Such a virtual VCR-type of interface to client applications allows them to create video streams, manipulate them with VCR-like controls and then close them. An example is the Continuous Media File Access Protocol (CMFAP) used by the Continuous Media File System (CMFS) component of a software package available from EMC Corporation, 171 South Street, Hopkinton, Mass., 01748-9103. CMFAP provides a VCR-like functionality that includes commands to Play, Record, Pause, Restart, and Rewind. CMFAP also supports a set of management commands for opening and closing streams, listing all active streams, and redirecting an active playback stream to an alternative display destination.

CMFS is an extent-based file system that allocates file space in large contiguous disk chunks called extents; the size of an extent is a system parameter. Extents of an appropriately chosen size promote file contiguity, simplify disk space management, and are well suited for large files. File contiguity benefits performance in the environment where most files are accessed for read-only, which is a design assumption. Assuming that most files contain interleaved audio and video, there is no need to leave gaps between blocks in anticipation of filling the gaps with frames of a related stream.

CMFS may span several disks. All disks that comprise CMFS are collectively called the CMFS volume set. When a new CMFS file is created, it is written to the disk that contains more free blocks than any other disk within the volume set. The reason for multi-disk volume sets is to increase capacity rather than provide load balancing. Load balancing may be accomplished by exporting multiple file systems.

Each disk in the CMFS volume set is divided into two areas: the data area and the inode area. The data area is used to store file data, while the inode area is used to store inodes that hold file metadata. In addition to the standard file metadata information, the inode contains an array of extent descriptors that locate each extent comprising the corresponding file. An extent descriptor may also point to an inode located on another disk. Such a descriptor is used to point to a continuation inode when a CMFS file spans multiple disks.

Another known protocol for continuous media data transmission is the "Louth Automation" video disk communications protocol, as described in "Video Disk Communications Protocol," Louth Automation, Aug. 30, 1996, pp. 1–39, incorporated herein by reference. This video disk communications protocol uses a tightly coupled master-slave methodology. The controlling device takes the initiative in communications between the controlling device and the controlled device. The topology is point-to-point. The video disk protocol conforms to the OSI (open system interconnection) reference model.

SUMMARY OF THE INVENTION

Although VCR-like functionality is sufficient for streaming data from video files, it is cumbersome to use the VCR functions in a broadcast environment where a stream needs to run continuously with old clips being deleted from the stream as their playback completes and new clips being appended to the stream as their play time approaches. There must be down-time while an existing play-list is being closed and a new one created.

The present invention provides a client-server protocol and interface for providing broadcast playback functionality. In particular, the protocol and interface easily provides continuous play over multiple clips for extended periods of time, allows a play-list to be edited after being given to the video server and during playback of clips in the play-list, allows some notion of "current time" to be used during the streaming of continuous media data, and supports features of the "Louth Automation" video disk communications protocol. The protocol and interface permits an external application to create and manipulate a dynamic play-list; as clips finish playing they are discarded from the play-list and new clips may be appended to or inserted into the play-list at selected positions (subject to server-imposed constraints).

In a preferred mode of operation, the client application first creates a session with a play-list containing a fixed number of entries; the number should be as small as possible consistent with the functions that the client wishes to perform. The client edits this play-list by appending the first few clips and then starts the session playing. Each time transmission of video data of the clip is completed, the clip is removed from the head of the play-list and all other clips are moved down. A callback is issued to the client with the current, updated, play-list. At any time while the video session is playing, edit commands may be issued to insert or delete new continuous media into or from the play-list of the video session. Preferably, there is a limit as to how close to air-time a clip normally may be deleted or new material inserted, in order to ensure continuity of transmission of the video stream of each clip. To allow live break-ins or other "emergency" operations, however, the session may be paused and later resumed and subsequent clips may be "trimmed" to reduce their play times to recover the time lost to the break-in.

BRIEF DESCRIPTION OF THE DRAWINGS

Other objects and advantages of the invention will become apparent upon reading the following detailed description with reference to the accompanying drawings wherein.

Figure 1:
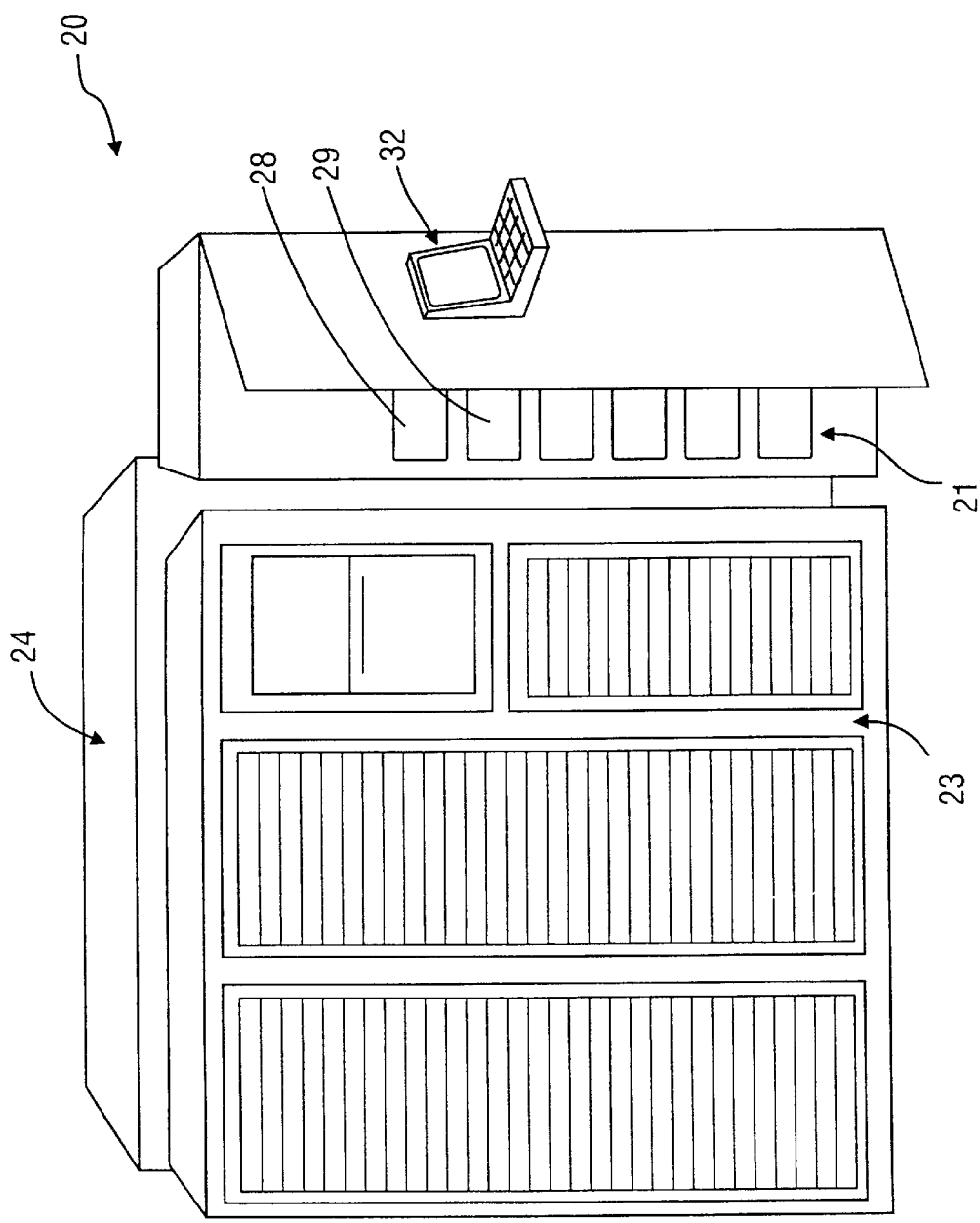
FIG. 1 is a perspective view of a video file server that incorporates the present invention.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

I. The Architecture of the Video File Server

Turning now to FIG. 1 of the drawings, there is shown a video file server generally designated 20 incorporating the present invention. The video file server 20 includes an array of stream servers 21, at least one control server 28, 29, a cached disk array storage subsystem 23, and an optional tape silo 24. The video file server 20 is a high performance, high capacity, and high-availability network-attached data server. It provides the ability for multiple file systems to exist concurrently over multiple communication stacks, with shared data access. It also allows multiple physical file systems to co-exist, each optimized to the needs of a particular data service.

The video file server 20 is managed as a dedicated network appliance, integrated with popular network operating systems in a way, which, other than its superior performance, is transparent to the end user. It provides specialized support for isochronous data streams used in live, as well as store-and forward, audio-visual applications. Therefore, the video file server 20 is suitable for a wide variety of applications such as image repositories, video on demand, and networked video applications, in addition to high-end file server applications such as the Network File System (NFS, version 2 and version 3) (and/or other access protocols), network or on-line backup, fast download, etc. NFS is a well-known IETF file access protocol standard (RFC 1094, Sun Microsystems, Inc., "NFS: Network File System Protocol Specification," Mar. 1, 1989). NFS acts as a network server for network communications by providing basic file access operations for network clients. Such basic file access operations include opening a file, reading a file, writing to a file, and closing a file.

The clustering of the stream servers 21 as a front end to the cached disk array 23 provides parallelism and scalability. The clustering of random-access memory in the stream servers 21 provides a large capacity cache memory for video applications.

Each of the stream servers 21 is a high-end commodity computer, providing the highest performance appropriate for a stream server at the lowest cost. The stream servers 21 are mounted in a standard 19" wide rack. Each of the stream servers 21, for example, includes and Intel processor connected to a EISA or PCI bus and at least 64 MB of random-access memory. The number of the stream servers 21, their processor class (i486, Pentium, etc.) and the amount of random-access memory in each of the stream servers, are selected for desired performance and capacity characteristics, such as the number of concurrent users to be serviced, the number of independent multi-media programs to be accessed concurrently, and the desired latency of access to the multi-media programs, as will be further described below.

Each of the stream servers 21 contains one or more high-performance FWD (fast, wide, differential) SCSI connections to the back-end storage array. Each of the stream servers 21 may also contain one or more SCSI connections to the optional tape silo 24. Each of the stream servers 21 also contains one or more outbound network attachments configured on the stream server's EISA or PCI bus. The outbound network attachments, for example, are Ethernet, FDDI, ATM, DS1, DS3, or channelized T3 attachments to data links to a network (25 in FIG. 2). Each of the stream servers 21 also includes an additional Ethernet connection to a dual redundant internal Ethernet link (26 in FIG. 2) for coordination of the stream servers with each other and with one or more controller servers 28, 29.

Figure 2:
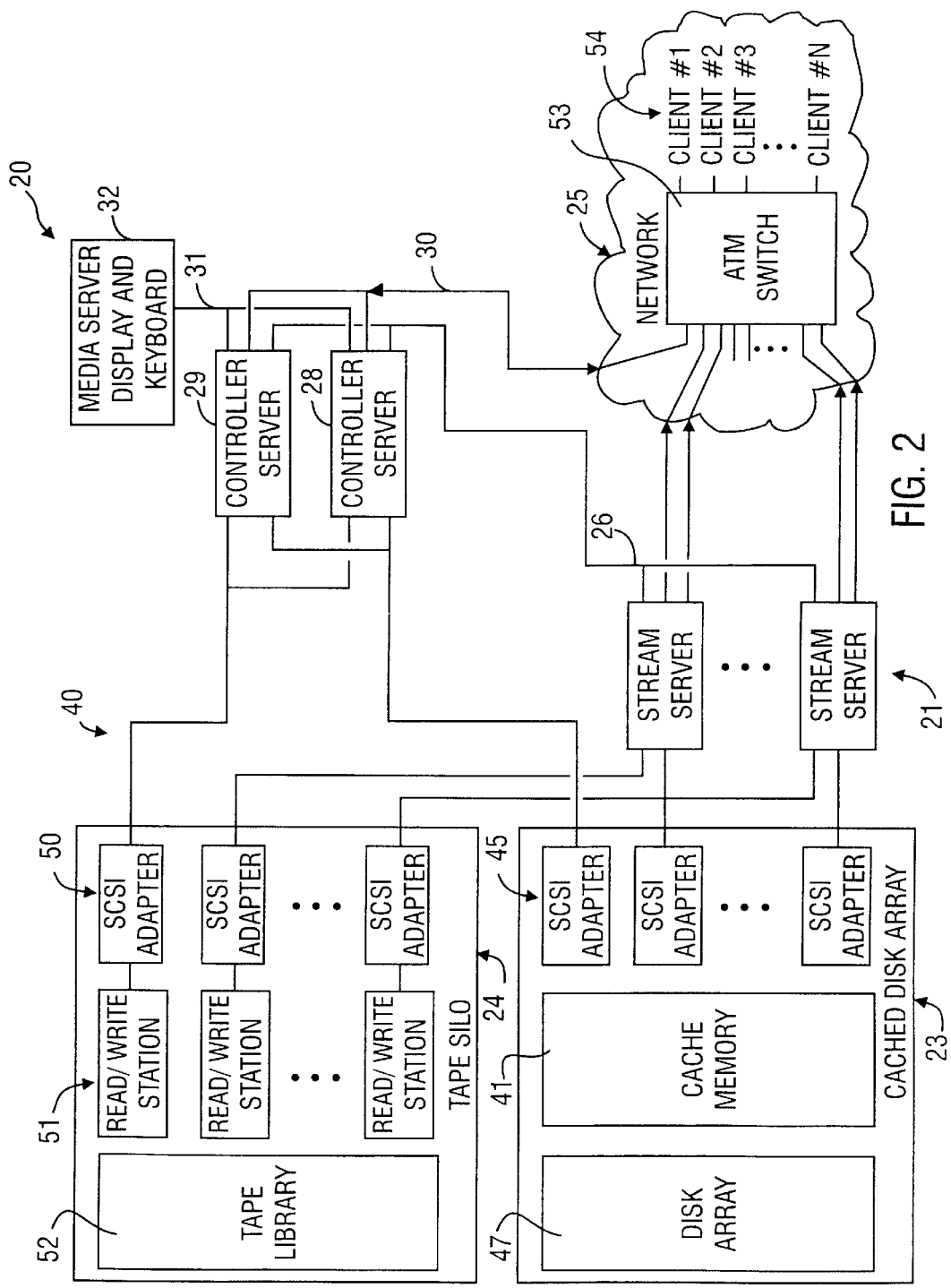
FIG. 2 is a block diagram of the video file server of FIG. 1 and its connections to a network.

The controller servers 28, 29 shown in FIG. 2 are dual redundant computers 28, 29, each of which is similar to each of the stream servers 21. Each of the dual redundant controller servers 28, 29 has a network attachment to a bidirectional link (30 in FIG. 2) in the network (25 in FIG. 2), through which each of the controller servers 28, 29 can conduct service protocols. The service protocols include one or more standard management and control protocols such as SNMP (RFC 1157, M. Schoffstall, M. Fedor, J. Davin, J. Case, "A Simple Network Management Protocol (SNMP)," May 10, 1990), and at least one Continuous Media File Access Protocol supporting isochronous real-time multimedia data transmission from the stream servers 21 to the network (25 in FIG. 2).

Each of the dual redundant controller servers 28, 29 has an Ethernet connection to the local Ethernet link 26. Each of the controller servers 28, 29 also has a connection to a serial link 31 to a media server display and keyboard 32. The controller servers 28, 29 run a conventional operating system (such as Windows NT or UNIX) to provide a hot-failover redundant configuration. An active one of the dual redundant controller servers 28, 29 functions as a media server controller for the video file server 20. The active one of the controller servers 28, 29 also allows management and control of the server resources from the network using standard protocols, such as the Simple Network Management Protocol (SNMP). SNMP is an internet protocol that permits inspection and modification of system variables such as the network address (IP) and the number of buffers for network communication. The active one of the controller servers 28, 29 may also provide lock management if lock management is not provided by the cached disk array 23.

For multi-media data transfer, the active one of the controller servers 28, 29 assigns one of the stream servers 21 to the network client 54 requesting multi-media service. The network 25, for example, has conventional switching mechanisms, such as an ATM switch 53 or arrays of cross-bar switches, that permit any one of the clients 54 to communicate with any one of the stream servers 21. The active one of the controller servers 28, 29 could assign a stream server to a network client by a protocol sending to the client the network address of the stream server assigned to send or receive data to or from the client. Alternatively, the active one of the controller servers 28, 29 could communicate with a switching mechanism such as the ATM switch 53 to establish a data link between the client and the stream server assigned to the client.

The cached disk array 23 is configured for an open systems network environment. Preferably the cached disk array 23 is a Symmetrix 5500™ cached disk array manufactured by EMC Corporation, 171 South Street, Hopkinton, Mass., 01748-9103.

Turning now to FIG. 2, there is shown a block diagram of the video file server 20 including the SCSI connections 40 among the cached disk array 23, the optional tape silo 24, the controller servers 28, 29, and the stream servers 21. The cached disk array 23 includes a large capacity semiconductor cache memory 41 and SCSI adapters 45 providing one or more FWD SCSI links to each of the stream servers 21 and to each of the dual redundant controller servers 28, 29.

The tape silo 24 includes an array of SCSI adapters 50 and an array of read/write stations 51. Each of the read/write stations 51 is connected via a respective one of the SCSI adapters 50 and a FWD SCSI link to a respective one of the stream servers 21 or each of the redundant controller servers 28, 29. The read/write stations 51 are controlled robotically in response to commands from the active one of the controller servers 28, 29 for tape transport functions, and preferably also for mounting and unmounting of tape cartridges into the read/write stations from storage bins.

In a preferred mode of operation, to archive data from a file from the network to tape, one of the stream servers 21 receives the file from the network 25 and prestages the file to the cached disk array 23 at a high rate limited by the network transmission rate (about 150 GB/hour). Then one of the stream servers 21 destages the file from the cached disk array 23 to an associated one of the read/write stations 51 at a tape device speed (about 7 GB/hour). For most applications, prestaging to disk can be done immediately, and staging from disk to tape including sorting of files onto respective tape cassettes can be done as a background operation or at night, when the load on the video server is at a minimum. In this fashion, the cached disk array 23 can absorb a high data inflow aggregation from tens or hundreds of network links streaming from multiple sites, and balance this load on the read/write stations 41. Prestaging to the cached disk array allows better use of the read/write stations 51, matching of server flow to tape streaming flow, and reduction of tape and read/write station wear. Prestaging to the back-end also allows multiple classes of backup and restore services, including instant backup for files maintained on disk in the cached disk array, and temporary batch backup pending a success or failure acknowledgment. Prestaging to the cached disk array 23 also makes economical an on-line archive service performing the staging from the cached disk array to tape as a background process.

Figure 3:
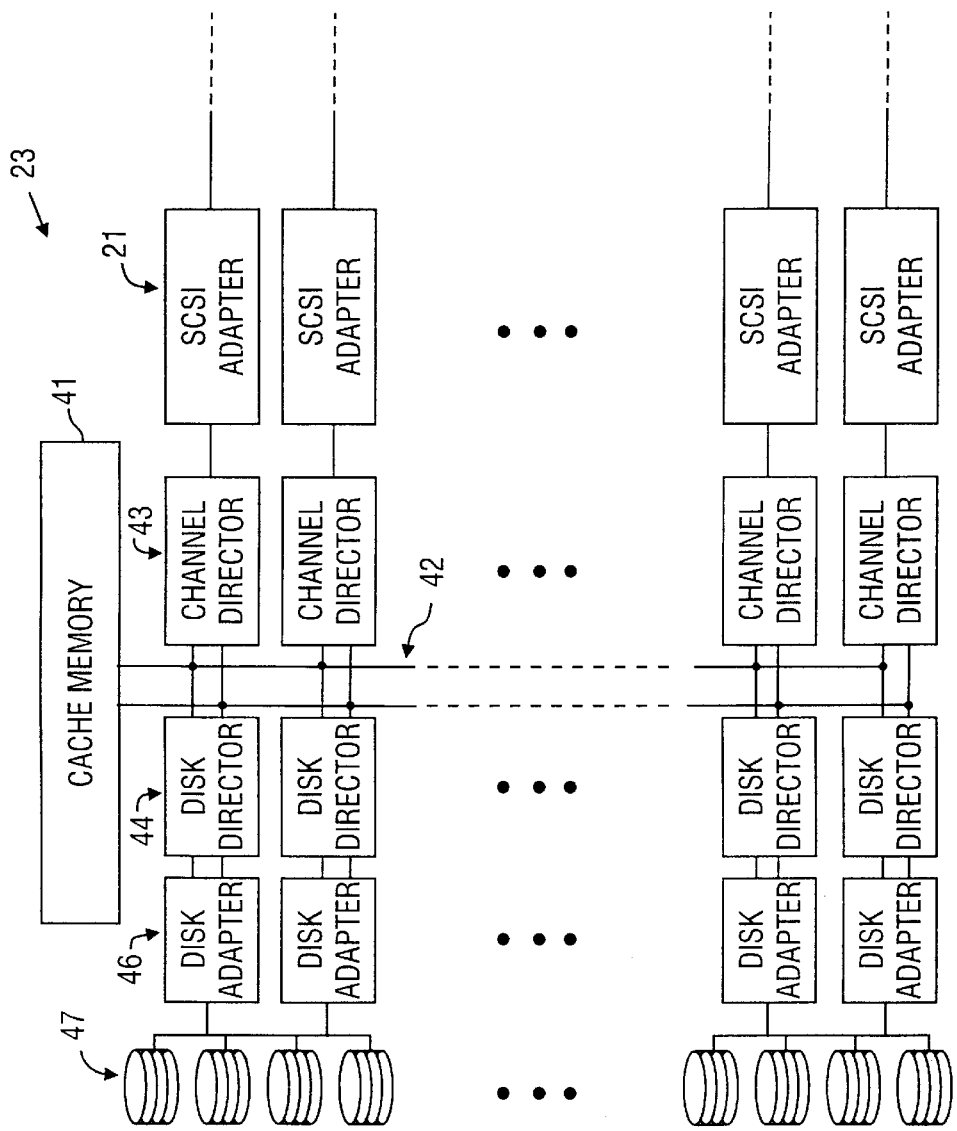
FIG. 3 is a block diagram of a cached disk array storage system used in the video file server of FIG. 1.

Turning now to FIG. 3, there is shown a more detailed block diagram of the cached disk array 23. The cache memory 41 is composed of dynamic RAM cards mating with a dual redundant back-plane system bus 42. The cached disk array 23 also includes micro-processor cards that mate with the back-plane system bus 42 and are programmed to function as channel directors 43 or disk directors 44. Each of the channel directors 43 is interfaced through one of a number of SCSI adapters 45 to the SCSI interface of one of the stream servers 21. Each of the disk directors 44 is interfaced through at least one of a number of disk adapters 46 connected to a string of commodity FBA (fixed-block architecture) disk drives 47. The channel directors 43 access data in the cache memory 41 in response to a request from its associated stream server. If data to be read by a channel director are not found in cache memory, one of the disk directors 44 and disk adapters 46 transfers or "stages" the data from the disk array 47 to the cache memory 41. In a background process, the disk directors 44 and disk adapters 45 also write-back data from the cache memory 41 to the disk array 47, after the channel directors write data to the cache memory 41. In addition to providing intermediate storage for the data transferred between the channel directors 43 and the disk directors 44, the cache memory 41 also provides intermediate storage for control information transferred among the channel directors and disk directors.

The bus 42 is preferably the back-plane of a printed-circuit card-cage or main-frame in the cached disk array 23, and each of the channel directors 43 and disk directors 44 is constructed on a printed circuit board that is mounted in the card-cage or main-frame. The channel director and disk director boards are further described in Yanai et al. U.S. Pat. No. 5,335,352, issued Aug. 2, 1994, and entitled Reconfigurable, Multi-Function Disc Controller, incorporated herein by reference. The cache memory 13 is constructed on a number of additional printed circuit boards that are mounted in the card-cage or main-frame. Further details regarding the construction and operation of the cached disk array 23 are disclosed in Yanai et al., U.S. Pat. No. 5,206,939, issued Apr. 27, 1993; and Yanai et al. U.S. Pat. No. 5,381,539, issued Jan. 10, 1995; all incorporated herein by reference.

II. The Video File Server Software

Figure 4:
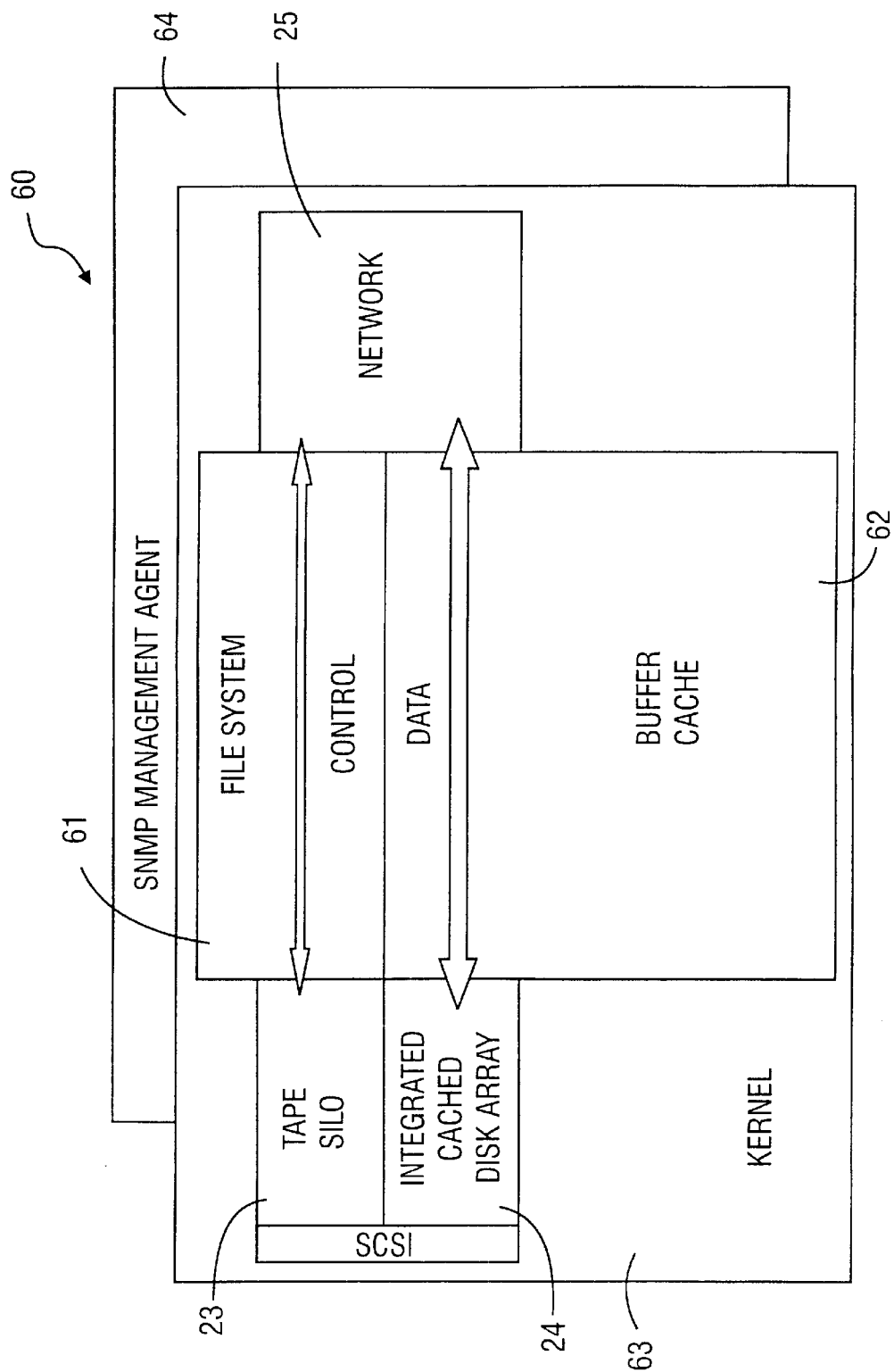
FIG. 4 is a block diagram showing software structure in the video file server of FIG. 1.

Turning now to FIG. 4, there is shown a block diagram of software 60 providing a real-time processing environment in the video file server (20 of FIGS. 1 and 2). The software 60 is executed by the processors of the stream servers 21. The software 60 also provides an environment for managing files services and multiple high-performance data streams as well as a standard set of service-level application program interfaces (APIs) for developing and porting file service protocols (such as NFS).

In the processors of controller servers 28, 29, a software application is run by a general purpose operating system such as Microsoft NT, and a network client communicates service requests to the video file server only through the software application executing on an active one of the controller servers 28, 29. This software application executes as a central control to prevent the video file server from performing conflicting operations in response to concurrent requests from various network clients. For example, the video file server should not erase a file for one client while data from the file is being streamed to another client.

The software 60 includes a file system 61 for controlling transfer of data between the network 25 and the disk array (47 in FIG. 2) or tape silo (24 in FIGS. 1 and 2). A buffer cache 62 composed of part of the random-access memory of the stream servers 21 is used as a buffer for this data transfer.

The software 60 also includes a kernel program 63 for providing a real-time scheduler and an access control program for arbitrating among conflicting service requests. The kernel program 63 separates control information (file access and synchronization protocols) from the underlying data stream. The application software running on an active one of the controller servers 28, 29 includes an admission control program. The kernel program 63 includes a real-time scheduler. The admission control program running on the active one of the controller servers 28, 29 applies an admission control policy to determine whether a service request can be satisfied, and if so, sends the stream servers 21 appropriate control messages that invoke their real-time schedulers to schedule operations to satisfy the service request. The admission control policy considers the global resources available to satisfy the request, including the current loading of the stream servers 21, the cached disk array 23, and the optional tape silo 24. If the request requires an operation of a stream server 21, one of the stream servers is selected to perform the required operation, and the active one of the controller servers 28, 29 transmits an associated operational command over the local Ethernet (26 in FIG. 2) to the selected stream server. Each of the stream servers 26 includes a real-time scheduler to schedule the local operations required to satisfy an operational command from the active one of the controller servers 28, 29. Preferably, one or more of the stream servers 21 are kept in a standby mode, to be used as "hot spares" or replacements for any one of the other stream servers that fails to acknowledge commands from the active one of the controller servers 28, 29 or is otherwise found to experience a failure.

The software 60 further includes an SNMP management agent 64 supporting a Simple Network Management Protocol. SNMP is a standard internet protocol for inspecting and changing system variables. For example, the SNMP management agent is used when an operator at the media server display and keyboard (32 in FIG. 1) sets the network IP address of the video server (20 in FIG. 1).

Figure 5:
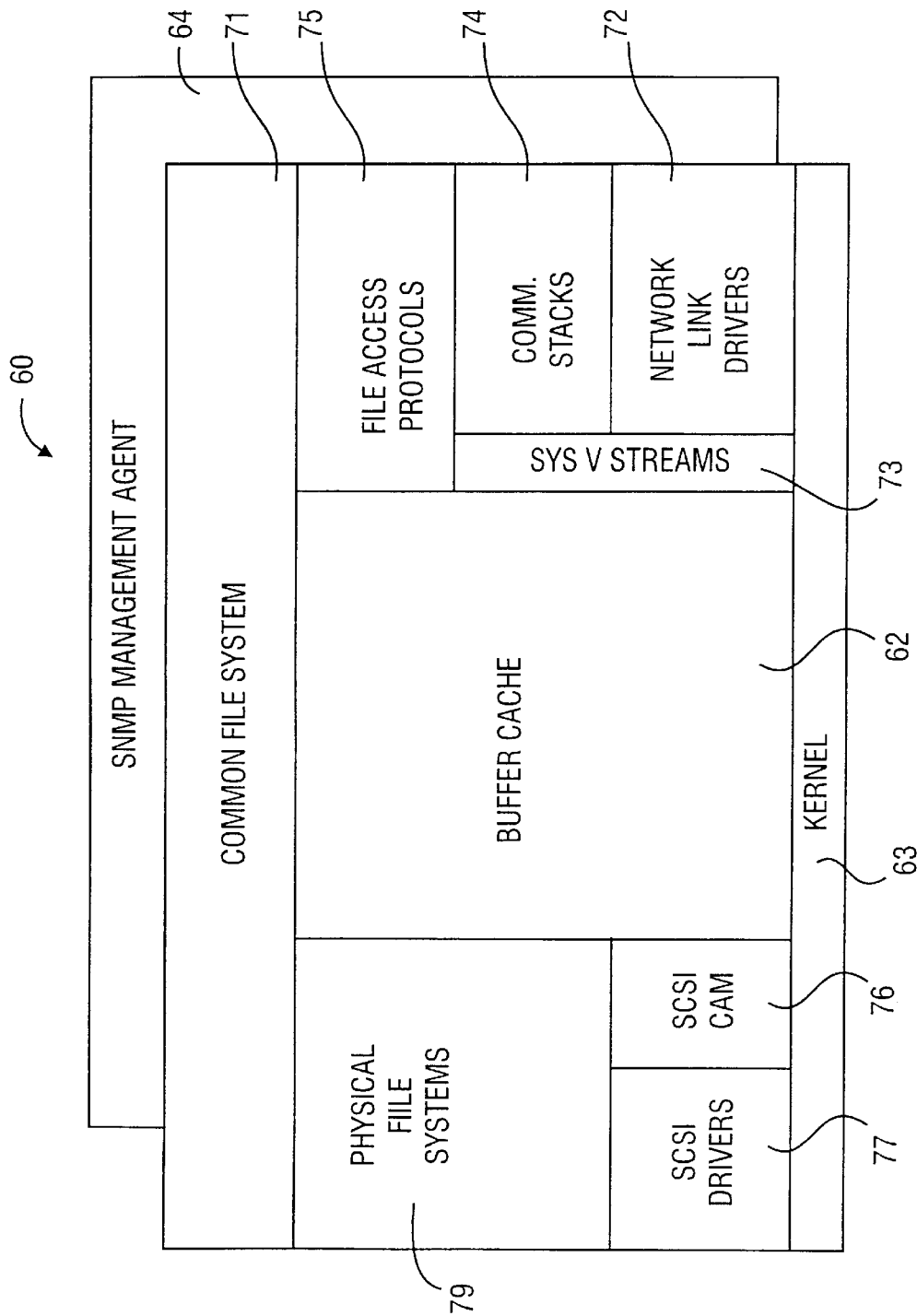
FIG. 5 is a more detailed block diagram showing various modules of the software structure of FIG. 4.

Turning now to FIG. 5, there is shown a more detailed block diagram of the software structure 60. The file system 61 in FIG. 4 has been expanded into its components. These components are a common file system 71, a group of software modules providing communication between the common file system and the network, and a group of software modules providing communication between the common file system and the cached disk array 23 or tape silo 24. The common file system 71 uses the Virtual File System (VFS), which is an industry-standard back-end file system switch, to interface with the physical file systems 79. VFS translates NFS Common File System requests, and permits NFS access to CMFS movie files for editing. (The NFS Common File System Requests in themselves are translations of NFS requests to the intended physical file storage devices. NFS is one of the file access protocols 75.) The common file system 71 accesses the buffer cache 62 during data transfers between the network (25) and disk or tape storage (23, 24).

The group of software modules providing communication between the common file system and the network includes file access protocols 75 and a network server interface 73 using communication stacks 74 and network link drivers 72. The file access protocols 75 include a set of industry standard network server protocols such as NFS, as well as protocols for audio/video services, such as CMFAP. CMFAP is a continuous media file access protocol which provides functions such as opening a movie, playing a movie, stop play of a movie, and "fast forward" and "fast reverse" functions. Other file access protocols compatible with the network 25 could also be used, such as Novell NCP, LanManager, SMB, etc.

The file access protocols 75 are layered between the communication stacks 74 and the common file system 71. The communication stacks 74 provide the network access and connectivity for the data transmitted to the file access protocol layer 75 from the network link drivers 72. The communication stacks include TCP/IP, IPX/SPX, NETbeui, or others. The network server framework 73 allows porting of the network software and file access protocols 72, 74, 75. This framework 73 is System V Streams. There could be multiple concurrent instances of the file access protocols 75, communication stacks 74, and drivers 73.

The group of software modules providing communication between the common file system and the cached disk array 23 or tape silo 24 includes physical file systems 79 and SCSI CAM 76 which provides a standard framework (SCSI Common Access Method) to the SCSI bus drivers 77. The physical file systems 79 include a continuous media file system (CMFS) and at least one conventional industry standard-based file system such as the Unix ufs file system. Other industry standards-based file systems could also be used, such as VxFS, ISO9660, etc. The buffer cache 62 buffers data passed between the SCSI drivers 77 and the physical file system 79. There could be multiple concurrent instances of the network drivers 72, communication stacks 74, file access protocols 75, SCSI drivers 77, and physical file systems 79.

Figure 6:
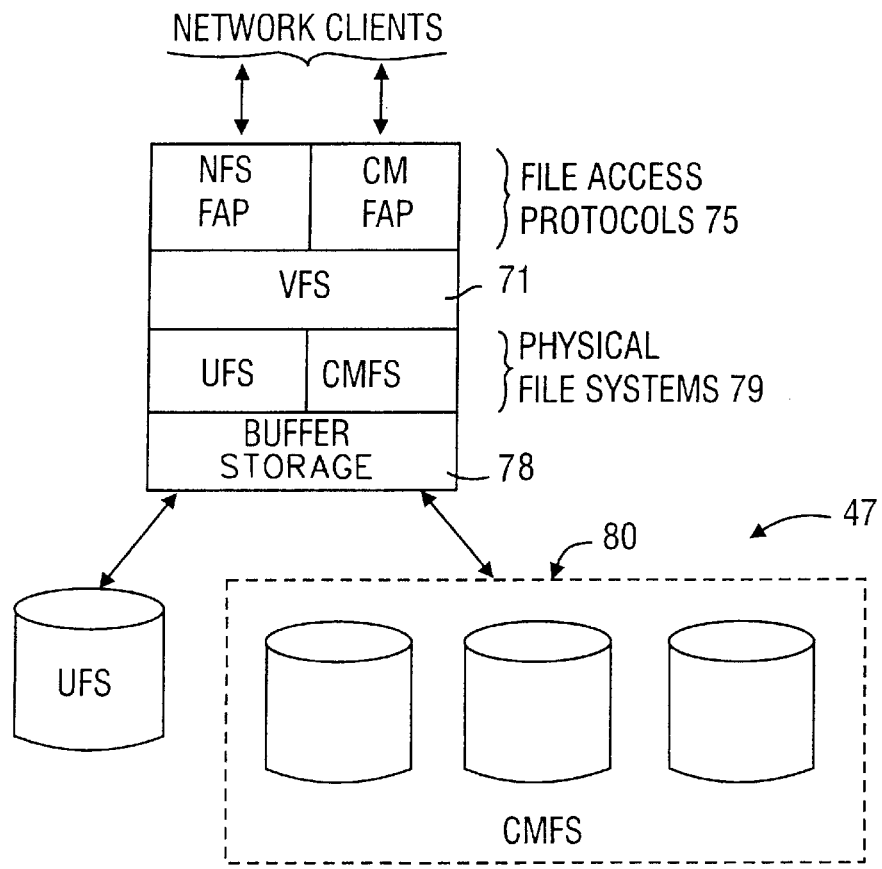
FIG. 6 is a specific example of software modules of FIG. 4 that can be used in an interactive video application to provide transaction processing and continuous media file access.

FIG. 6 is a specific example of software modules of FIG. 5. Two physical file systems are exported onto the network: a conventional UNIX File System (UFS) and a Continuous Media File System (CMFS). CMFS is a component of a software package available from EMC Corporation, 171 South Street, Hopkinton, Mass., 01748-9103. CMFS may be mounted on a directory within the UFS hierarchy, or it may be mounted on the root directory '/' as a stand-alone root file system. Both UFS and CMFS are exported onto the network using NFS. The file system switch that directs client NFS requests to the intended physical file system is implemented using a standard virtual file-system (Vnode/VFS) interface.

In addition to NFS, the file server supports a real-time Continuous Media File Access Protocol (CMFAP) for accessing CMFS. CMFAP provides a VCR-like functionality that includes commands to Play, Record, Pause, Restart, and Rewind. CMFAP also supports a set of management commands for opening and closing streams, listing all active streams, and redirecting an active playback stream to an alternate display destination. CMFAP may not be used for accessing UFS, but only for accessing CMFS.

The design of CMFS is guided by the following assumptions: (1) the majority of files in a video-on-demand system are large, on the order of a few hundred megabytes to a few tens of gigabytes; (2) access patterns are predominantly read-only; that is most files are accessed for real-time playback; and (3) most files are complete in that they contain interleaved audio and video, as opposed to having related audio and video data stored in two separate files. These assumptions suggested an extent-based approach to the design of CMFS on-disk structures. An extent-based file system allocates file space in large contiguous disk chunks called extents; the size of an extent is a system parameter. Extents of an appropriately chosen size promote file contiguity, simplify disk space management, and are well suited for large files. File contiguity benefits performance in the environment where most files are accessed for read-only, which is a design assumption. Assuming that most files contain interleaved audio and video, there is no need to leave gaps between blocks in anticipation of filling the gaps with frames of a related stream.

CMFS may span several disks. All disks that comprise CMFS are collectively called the CMFS volume set 80. When a new CMFS file is created, it is written to the disk that contains more free blocks than any other disk within the volume set. The reason for multi-disk volume sets is to increase capacity rather than provide load balancing. Load balancing may be accomplished by exporting multiple file systems.

Each disk in the CMFS volume set is divided into two areas: the data area and the inode area. The data area is used to store file data, while the inode area is used to store inodes that hold file metadata. In addition to the standard file metadata information, the inode contains an array of extent descriptors that locate each extent comprising the corresponding file. An extent descriptor may also point to an inode located on another disk. Such a descriptor is used to point to a continuation inode when a CMFS file spans multiple disks.

The file server software runs as an embedded system that includes a real-time kernel (63 in FIGS. 4 and 5). The main components of the kernel are a task scheduler, frameworks for writing device drivers, and a number of system services that are commonly found in similar real-time kernels. The system services include kernel interfaces to memory management, timers, synchronization, and task creation.

All kernel tasks run in a single unprotected address space. As a result of this, no copy operations are required to move data from disk to the network. Copying is eliminated by passing references to common buffers across all subsystems. Considerable efficiency is obtained for the video-on-demand service because of the elimination of copy operations by the processor. The only "incremental" work involved in transmitting a frame is due to cycle stealing by the DMA devices for moving data to and from memory. As a result, the predominant component of the service time for transmission of a frame is fixed, even though the size of the frame may vary, depending on the compression algorithm. The kernel exploits the fixed service time per frame in the scheduling and admissions control policy that is described below.

Even a simple video file server that provides playback only needs to receive data from the network and store it on disk. This happens when loading movies from the network. When data are received from the network, a single copy operation is used to move data from the network to the disk. Although the service time for receiving a frame varies according to the frame size, the service time for a network fragment of the frame is fixed (because of a fixed MTU packet size). The fixed per packet service time is used in the scheduling and admissions control policy for real-time tasks that receive network data.

III. The Kernel Scheduler

The kernel 63 uses the scheduler and admission control policy described in K. K. Ramakrishnan et al., "Operating System Support for a Video-On-Demand File Service," *Multimedia Systems*, Vol. 3, Springer-Verlag, 1995, pp. 53–65.

Three classes of schedulable tasks are supported: general-purpose, real-time, and isochronous tasks. These classes correspond to different kinds of requests that are likely to exist in a video-on-demand system. Real-time and isochronous tasks are known in the real-time literature as aperiodic and periodic tasks, respectively.

The design of the CPU scheduler is based on a combination of weighted round-robin and rate monotonic scheduling procedures. Tasks within the isochronous class are scheduled using a rate-monotonic procedure, while the real-time and general-purpose tasks are scheduled using the weighted round-robin scheme. The isochronous class is given the highest priority; that is, any task within the isochronous class always pre-empts a real-time or a general-purpose task.

Figure 7:
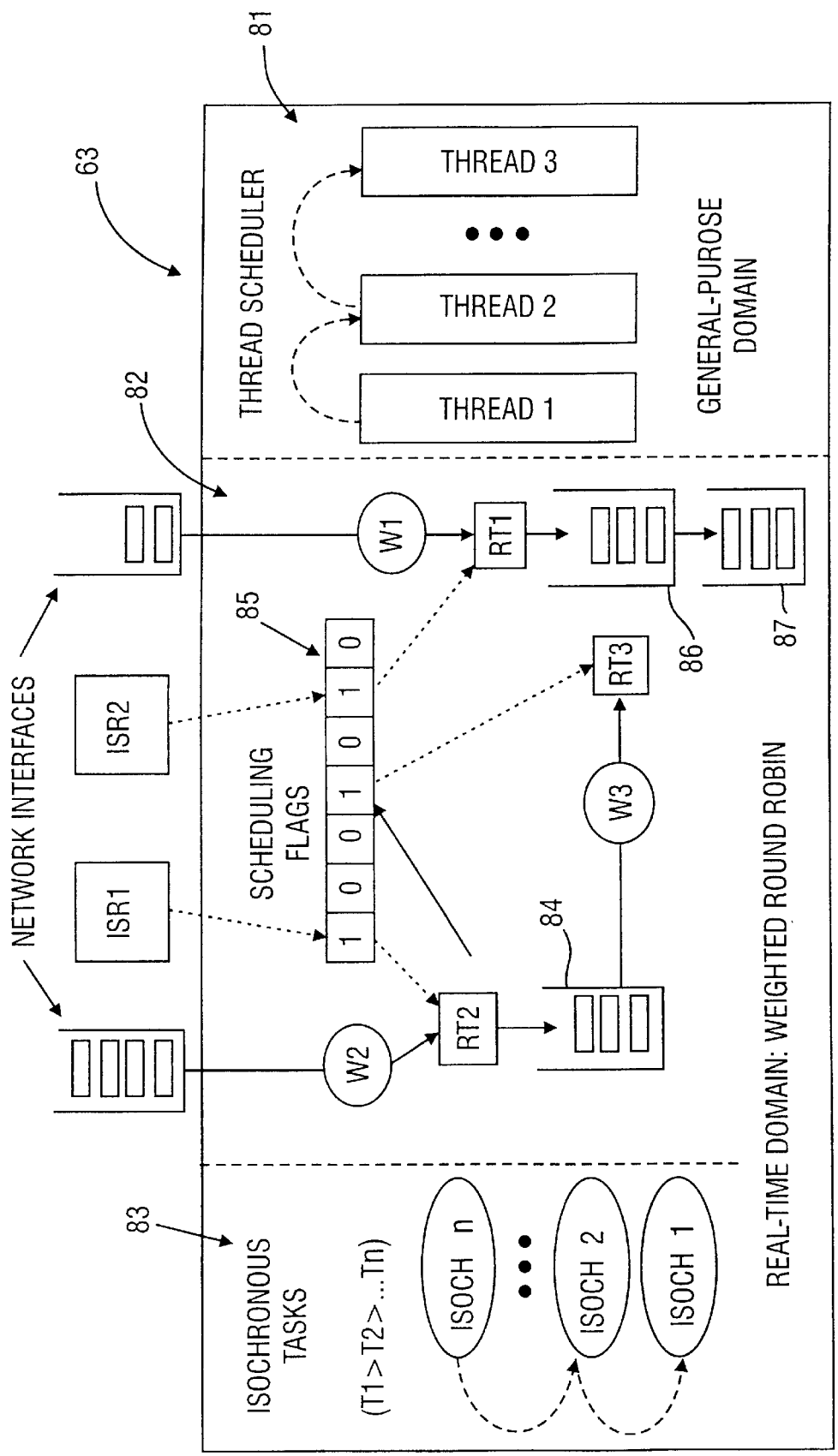
FIG. 7 is a schematic diagram illustrating scheduling operations by a kernel software module of the video file server of FIG. 1.

Turning now to FIG. 7, there is shown a high level view of the three classes of schedulable tasks; namely, the general-purpose tasks 81, the real-time tasks 82, and the isochronous tasks 83.

The general-purpose class supports pre-emptible tasks that are suitable for low-priority background processing. In order to ensure that general-purpose tasks can always make progress, this class is granted a minimum CPU processing quantum.

The general-purpose class is implemented as a standard threads package, with a thread corresponding directly to a general-purpose task as described herein. A suitable threads package is described in A. D. Birrell, "An Introduction to Programming with Threads," Systems Research Center Technical Report, No. 35, Digital Equipment Corporation, Maynard, Mass., (1989).

The real-time class is suitable for tasks that require guaranteed throughput and bounded delay. Real-time tasks are not pre-emptible; however, a software provision is made to allow for the existence of safe "preemption windows" in which all isochronous tasks can be executed. A weight and a scheduling flag is assigned to every real-time task. The weight is used as the means to limit the amount of processing time taken by the real-time task at each invocation. The scheduling flag is used to indicate that the task has pending work and to signal the scheduler that the task needs to be invoked. The scheduling flag may be set by an interrupt service routine or a task of any class.

In the video file server, real-time tasks are used to implement "polling" device drivers and communication stacks. The method of polling for pending work, as opposed to interrupt-driven processing, contributes to system stability and alleviates most of the problems that arise during overloads. It also provides isolation between multiple real-time tasks that have differing performance requirements. Polling regulates the flow of traffic into the video file server. Just as flow control mechanisms, such as a leaky bucket scheme, protect network resources from large bursts, polling protects the end-system resources by regulating the frequency at which work queues are scanned and limiting the amount of work that may be performed during each scan of the round-robin schedule.

The real-time tasks are implemented as callable routines. Invoking a real-time task amounts simply to a procedure call.

The isochronous class supports real-time periodic tasks that require performance guarantees for throughout, bounded latency, and lower jitter. Low jitter reduces the amount of buffering needed at the client, which in turn improves the response time of interactive video applications. The isochronous tasks that support streams of different periods are assigned priorities (w1, w2, w3, etc.) on a rate-monotonic basis (i.e., a task with a higher frequency has a higher priority). Isochronous tasks also allow for a safe "preemption window" in which all higher priority isochronous tasks can be executed. Isochronous tasks are used to schedule periodic network transmission of audio and video frames. An isochronous task executes exactly once per period. In the preferred implementation, a single isochronous task services all client streams that have the same frame rate.

The scheduler executes isochronous tasks from a "Ready" queue 84 in which all isochronous tasks that are ready to run are arranged in order of decreasing priority (a task with the lowest period has the highest priority and resides at the head of the queue). An isochronous task is inserted in its appropriate place on the "Ready" queue 84 upon arrival. The arrival of isochronous tasks is generated by period timers. A unique periodic timer exists in the system for each distinct period among all the admitted isochronous tasks.

Whenever an isochronous task arrives, the scheduler determines whether a currently running task needs to be pre-empted. If the currently running task is a general-purpose task, it is pre-empted by the newly arrived isochronous task. If the currently running task is a real-time task, it will be pre-empted by the newly arrived isochronous task in the next "preemption window". If the currently running task is of the isochronous class, the scheduler compares its priority to that of the task currently at the head of the "Ready" queue 84. If the priority of the current task is lower, it is pre-empted at the next "preemption window" by the isochronous task from the head of the queue. The scheduler continues to execute isochronous tasks until the isochronous "Ready" queue 84 becomes empty. Whenever the queue is empty, the scheduler alternates between the real-time and general-purpose classes using a weighted round-robin scheme.

Selecting a real-time task involves scanning the set of scheduling flags 85; for each flag that is set, the scheduler invokes the corresponding task with the assigned weight as a parameter. The real-time task is expected to process at most the number of work units equal to the task's weight that was passed to it as a parameter. At the completion of each unit of work, the real-time task opens up the "preemption window" which is used by the scheduler to run all the isochronous tasks that may have arrived in the time it took the real-time task to process one unit of work. Upon exhausting the allowed number of work units (the weight) or less, the task voluntarily returns to the scheduler. After having completed one round of scanning the flags, the scheduler switches to the general purpose class.

General purpose tasks that are ready for execution are placed on a "GP ready" queue 86, which in our current implementation is served in a round-robin fashion. If the "GP ready" queue 86 is empty, the scheduler initiates a new round of servicing the real-time tasks. Otherwise, the scheduler starts the general-purpose quantum timer, and activates the first task from the "GP ready" queue 86. The task runs until it blocks or the quantum timer expires. If the task blocks, its context is saved on a wait queue 87 and the next task from the "GP ready" queue 86 is restored for execution. If the quantum timer expires, the scheduler saves the context of the currently running task at the end of the "GP ready" queue 86 and switches to a new round of servicing the real-time tasks. The execution of the general-purpose tasks may be preempted one or more times by the isochronous tasks. The execution of the general-purpose class continues after each preemption until the total time spent in processing general-purpose tasks reaches the guaranteed quantum.

In the absence of isochronous tasks, the scheduler can provide guarantees on throughput and delay bounds for real-time tasks (this assumes that all requests destined for a real-time task generate a constant amount of work). A maximum service delay is the time it takes to complete one round of real-time tasks scheduling plus the general purpose time quantum. Let R denote this maximum service delay in steady state. Weights may be assigned to real-time tasks to allocate and guarantee bandwidth averaged over the maximum service delay, R. If W denotes the weight given to a real-time task (the number of units of this task, or requests, processed in one round), then the task's steady state throughput is (W/R) requests per unit time.

An admission control policy is employed in order to ensure that a feasible schedule exists for all the admitted tasks; that is, all the admitted tasks can be scheduled using the combination of rate monotonic and weighted round-robin scheduling procedure described above without violating any performance guarantees. The admission control policy for access to processor resources balances the needs of the three classes of tasks: throughput and maximum delay requirements of the real-time tasks, a minimum guaranteed CPU quantum for the general-purpose tasks, and the periodic deadline-sensitive nature of the isochronous tasks. The admission control policy uses a time-based admission test for rate monotonic (isochronous) tasks with an adjustment to account for tolerable delay constraints imposed by the real-time tasks, with an adjustment to account for tolerable delay constraints imposed by the real-time tasks. Let $L_r$ denote the maximum delay that can be tolerated by any of the real-time tasks. Then a feasible schedule exists for a set of n isochronous tasks and m real-time tasks if the following two conditions hold true:

$$\sum_{i=1}^{n} C_i \times \left[ \frac{L_r}{T_i} \right] + \sum_{j=1}^{m} W_j \times r_j + Q \leq L_r \quad (1)$$

where
$C_i$ run-time requirement of isochronous task i
$T_i$ the period of isochronous task i
$w_j$ weight assigned to real-time task j
$r_j$ run-time required by the real-time task j to process one request
Q time quantum assigned to the general-purpose class, i.e., GP class runs Q units of time every time interval of length $L_r$ As noted above, $C_i$ is a fixed time per execution of isochronous task i. In the second step a test must be applied to each isochronous task i to ensure that its execution requirements can be fulfilled in the presence of all higher priority isochronous tasks. The test is as follows FOR i=1 TO n $$\sum_{j=1}^{n} C_j \times \left[ \frac{T_i}{T_j} \right] \leq T_i, \forall j/T_j \leq T_i \quad (2)$$

In order to admit an isochronous task, both conditions need to be verified. However, in order to admit a real-time task, only the first condition needs to be verified.

It is convenient to describe the disk scheduling and admission control for access to storage devices by viewing the video file server operating in steady state. The steady state operation the video file server consists of servicing n streams at the rate of $R_j$ bytes/second for each stream (i.e., $R_1$ is the ith stream's playback rate). For each stream the video file server maintains two buffers: a disk buffer and a network buffer. In steady state, a network task empties the network buffer and a disk task fills up the disk buffer. The two operations are performed in parallel. The rate at which the network buffer is emptied needs to be equal to the rate at which the disk buffer is filled up; the goal is that both rates are the same as the stream's playback rate. When the network buffer is empty, the disk buffer is full. At that moment the buffers interchange their roles. The disk buffers are filled up for all the streams in a round-robin fashion. One round of filling up the disk buffers of all streams is known as the disk round-robin service time. We assume that disk transfers are not pre-emptible.

The admission control policy needs to ensure that the steady state operation of the video file server, as described above, is feasible. A new stream can be admitted if the following three conditions are satisfied. First, the rate at which the disk buffers are filled is greater or equal to the rate at which the network buffers are emptied. Second, sufficient buffer space exists for allocating disk and network buffers to all admitted streams, including the newly admitted stream. And third, the disk service time for all the streams does not exceed the minimum tolerable request latency. Request latency is the amount of time that elapses from the moment the server receives a request for the first frame of a stream until the moment the first frame is placed on the network. This is required in order to support interactive video applications, such as games.

The first condition is expressed by the following constraint:

$$\sum_{i=1}^{n} R_i \leq D_{min} \quad (1)$$

where $R_i$ bytes/second is the playback rate of stream i and $D_{min}$ bytes/second is the minimal disk rate, including seek times, at which n disk buffers can be filled. It may be computed as follows $$D_{min} = \frac{R_d}{1 + n \times S_{max}} \quad (2)$$

where $R_d$ bytes is the amount of contiguous data that the disk can transfer in 1 second, (without any seeks involved), and $S_{max}$ is the maximum disk seek time. It is assumed that in between servicing each stream, the disk has to perform a maximum seek.

The second condition is expressed by the following constraint:

$$\sum_{i=1}^{n} B_i \leq M \quad (3)$$

where $B_i$ is the size of the disk buffer allocated to stream i, and M is the total amount of system memory from which the disk buffers are allocated. An equivalent amount of memory is available from which network buffers are allocated. $B_i$ bytes is the amount of data transferred from disk for session i during one round of the round-robin service for the admitted streams. Strategies for choosing an appropriate size for disk buffers are discussed below.

The third condition is expressed as follows:

$$T = \frac{\sum_{i=1}^{n} B_i}{D_{min}} \leq L \quad (4)$$

where T denotes the maximum time taken by one round of filling up the disk buffers of all the streams (i.e., T is the sum of the disk service times for all streams in one round), $B_i$ and $D_{min}$ are given by equations (2) and (3), and L is the smallest among the maximum request latencies tolerated by any of the streams.

While describing conditions 2 and 3 for the admission control, we referred to $B_i$, the size of a disk buffer allocated to stream i, without specifying how this size is chosen. In this section we discuss two strategies for choosing the disk buffer sizes, which is equivalent to determining the amount of data that should be transferred from the disk for each session during one round.

The "optimal strategy" is the one in which the amount of data transferred from disk for each stream is proportional to the stream's playback rate. The constant of proportionality is the disk service time for one round. The strategy is described as follows. Let M bytes denote the total amount of system memory from which the disk buffers are allocated for all streams. Then the maximum time taken by one round of filling up the disk buffers of all the streams is $$T = \frac{M}{D_{min}} \quad (5)$$

where $D_{min}$ is the same as in equation (2). T is used as the constant of proportionality for sizing the disk buffers. The rate at which buffers are filled is $(\Sigma B_i)/T$. The rate at which network buffers are drained is $\Sigma R_i$. The simple constraint therefore is $(\Sigma B_i)/T \geq \Sigma R_i$. This is simplistically satisfied for each stream if $B_i = T R_i$, where $B_i$ is the size of the disk buffer and the size of the disk read block for stream i, and $R_i$ is the stream's playback rate.

Thus, each stream consumes its network buffer in time T which is the exact amount of time needed by the round-robin service to fill up the disk buffers for all the streams. If any stream i reads more than its computed buffer size $B_i$, then the round-robin time will take longer than T, causing some streams to starve. Similarly, if a stream i reads less than its computed buffer size $B_i$, then additional seeks are introduced, causing unnecessary overhead for that stream and reducing $D_{min}$. Thus, the chosen disk buffer size $B_i$ must be optimal for each stream.

Unfortunately, the optimal strategy suffers from two practical limitations. First, the disk round-robin service time T needed to compute each $B_i$, depends on the number of currently active streams (that is, $D_{min}$ depends on n in (2)). Thus, T varies each time a new stream is admitted, or a previously active stream terminates. In order to comply with the optimal strategy during such transitions, it is necessary to re-size the disk buffers and readjust the amount of data that is read from the disk for each stream. Dynamically re-sizing the disk buffers may not be practical from an implementation point of view.

The second limitation of the optimal strategy is that a large amount of buffer space M may lead to an unreasonably large size of some disk buffer $B_i$. It is unreasonable in the sense that it could greatly exceed the practical size for a disk read request. In this case, the disk buffer $B_i$ would need to be filled up by several disk reads, possibly resulting in an unpredictable number of disk seeks, if the file is not entirely contiguous.

The second strategy is designed to overcome the practical limitations inherent in the 'optimal strategy'. In this "practical strategy" we impose a constraint that $B_i$ does not exceed $B_{max}$, where $B_{max}$ is chosen to be a reasonable size for a disk read request. The disk buffer sizes are still allocated in proportion to the playback rate as follows:

$$B_i = B_{max} \times \frac{R_i}{R_{max}}$$

where $R_{max}$ is the maximum playback rate, assumed to be known a priori.

This strategy, although practical for the purposes of implementation, is suboptimal in the theoretical sense that it will admit fewer streams than the "optimal strategy".

The disk scheduling and admission control procedures described above ensure that the playback rates of "real time" streams are satisfied. "Real-time" streams are those streams that require guaranteed response (served both by isochronous and real-time tasks). However, the real-time streams may not consume the entire disk bandwidth. In this case, it is desirable to specify a procedure by which non real-time disk requests (such as NFS) can receive the unused disk bandwidth without interfering with the real-time disk access requests.

A simple case is the one in which the playback of each stream occurs at a constant bit-rate. This situation arises when the video is recorded in its original uncompressed form (frame sizes are constant) or when the video is compressed at a constant bit-rate (MPEG I, for example). In the case of a constant playback rate, all real-time disk requests may be issued to the disk exactly at the beginning of every interval of length T (T is the worst case round-robin service time as computed in the previous section). Let k denote the number of active real-time streams. Then the number of real-time requests that may be issued to the disk every T period is n-k, where n is the maximum number of streams supported by the system, as was described in the previous section. The non real-time requests may be issued at any time within the interval T, as long as the round time to service k real-time streams plus the data transfer time of the non real-time requests does not exceed T.

Figure 8:
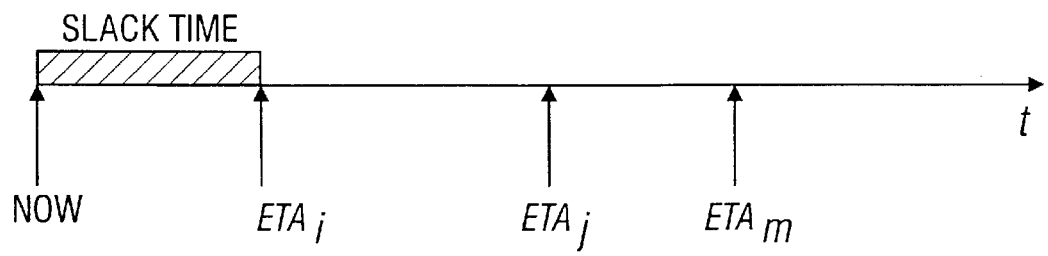
FIG. 8 is a timing diagram showing the accommodation of non real-time requests by the kernel software module of the video file server of FIG. 1.

A more complicated case arises when the playback of each stream occurs at a variable bit-rate (such as in motion JPEG, for example). In this case the admission control policy makes a conservative admission decision based on the assumption that the playback rate for each stream proceeds at a constant frame rate using the stream's maximum frame size. Variations from the maximum frame size, however, are used to accommodate non real-time requests, as described below. Since the network buffer empties at a variable rate, it is not possible to issue all the real-time disk requests at the beginning of every period of length T, as was the case with the constant playback rate. Each stream issues a disk read request as and when its network buffer becomes empty. Thus disk requests arrive at various times. For each real-time stream we maintain a sorted queue of the estimated time of arrival (ETA) of the next read request. As shown in the timing diagram of FIG. 8, the queue is sorted in increasing time order. Notice from FIG. 8 that a non real-time disk read may be issued in the slack time—an interval whose end points are now and the first ETA on the queue (ETA for session i).

Initially, the ETAs are computed based on draining the network buffer at the maximum rate. However, as each variable-sized frame is transmitted, its deviation from the maximum frame size is used to adjust the ETA of the corresponding stream. The adjustment involves moving the ETA forward in time, since the network buffer will hold data longer than the original worst case estimate based on the maximum frame size. The adjustment potentially increases the interval (slack time) in which the non-real time disk requests may be issued.

A drawback of the procedure described above is that its implementation may become computationally expensive since it involves sorting a potentially long queue of ETA entries. Therefore, an alternative procedure is considered for accommodating non real-time requests. The alternative procedure retains the ability of the previous procedure to accommodate non real-time requests during "slack" periods, while substantially reducing its computational complexity.

In the alternative procedure, some portion of the disk bandwidth is permanently allocated to non real-time requests. Let us denote this bandwidth in terms of the number of non real-time requests m that may be issued to the disk during each interval T (T is the worst case round-robin service time as computed in the previous section). Thus each interval of length T is allocated m credits for issuing non real-time requests. The procedure considers two cases: one in which a non real-time request arrives when credits are still available (m>0), and the other in which a request arrives when no credits are left (m=0).

In the first case (m>0), a request is issued to the disk and the number of credits for this interval is decremented by one. If the request completes in the same interval in which it was issued and the number of credits reaches zero, then the number of credits for this interval is incremented by one. If the request completes in the interval following the one in which it was issued, then the number of credits in this new interval is decremented by one.

In the second case (m=0), a credit is borrowed from the next interval, provided that the number of credits available for the next interval is greater than zero. A request issued on a borrowed credit always completes in the interval following the one in which it was issued, otherwise credits would have been available in the current interval. If the request completes before any of the real-time requests need to be issued in the new interval, then the borrowed credit is returned to the current interval (this is the interval from which the credit was borrowed previously).

The basic difference between the two procedures is that in the alternative procedure it is required to reserve a portion of the disk bandwidth for non real-time requests. While the previous procedure accommodates non real-time requests during the "slack" periods only, the alternative procedure accommodates these requests both during "slack" times and "reserved" times. The alternative procedure is more compatible with our CPU scheduling policy which guarantees progress to non real-time requests.

It may also be possible to accommodate non real-time requests simply by using two priority queues: a low priority for non real-time requests and a high priority for real-time requests. In order for such a scheme to work correctly, it is necessary to implement the priority queues at all levels including the lowest level that maintains queued disk requests, such as the disk adapter or the driver level. This scheme also requires that some portion of the disk bandwidth be reserved for non real-time requests.

IV. Prefetching to Service Multiple Video Streams

One advantage to the video server architecture of FIG. 2 is that multiple video streams requested by multiple network clients can sometimes be serviced from the cache memory 41 of the cached disk array 23 without always fetching the video data from the disk array 47. This situation is illustrated in FIGS. 9 and 10.

Figure 9:
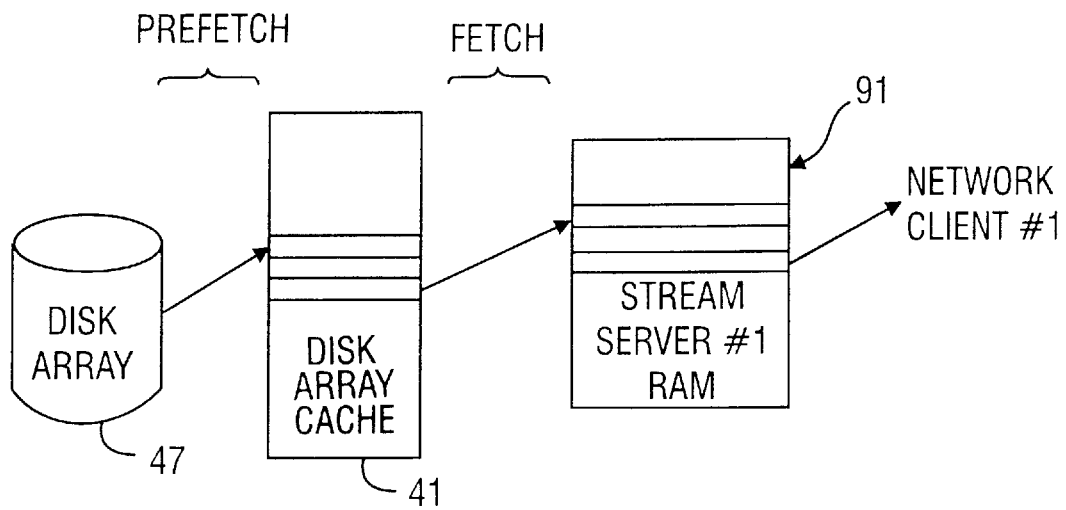
FIG. 9 is a schematic diagram illustrating data flow in the video file server of FIG. 1 from the disk array to a network client.

In FIG. 9, video data are transmitted isochronously to a first network client from a buffer 91 in random access memory (RAM) in a first one of the stream servers (21 in FIG. 2). The buffer 91 is filled by data fetched from the cache 41 of the cached disk array (23 in FIG. 2). The cache 41 is filled by data prefetched from the disk array 47.

Figure 10:
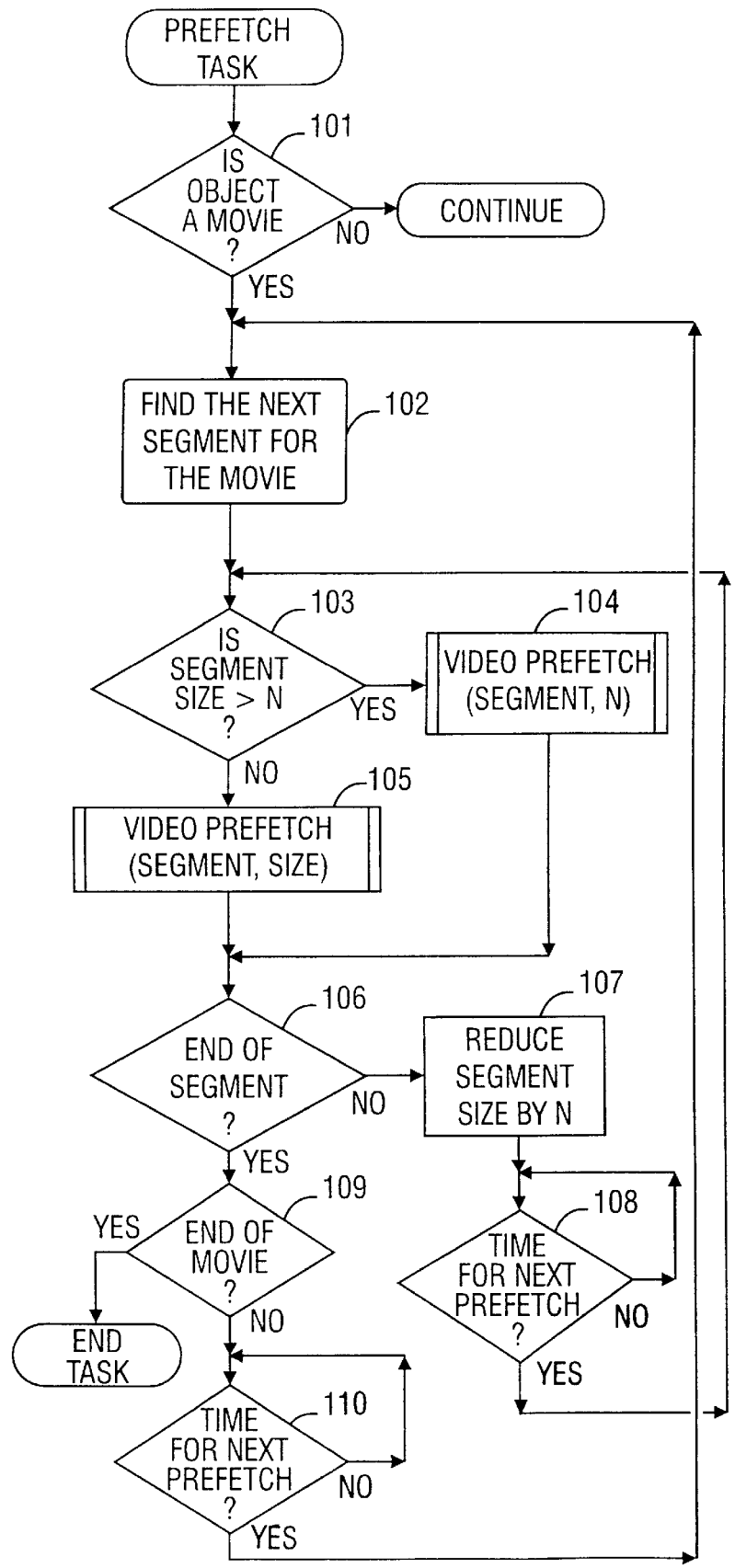
FIG. 10 is a flowchart of a prefetch task of a stream server in the video file server of FIG. 1.

Turning now to FIG. 10, there is shown a flowchart of a prefetch task including steps for scheduling the transmission of video prefetch commands from one of the stream servers (21 in FIG. 2) to the cache disk array (23 in FIG. 2). As indicated for a first step 101, the video prefetch commands are used when the object being accessed by the stream server is a movie. If so, then in step 102 the stream server finds the next segment for the movie. The media server controller, for example, accesses a movie directory to obtain a list of the addresses of the movie segments in the cached disk array and the size or length of each segment, and transmits this list to the stream server as the object to be accessed. In step 102, the stream server obtains from this list the next segment address and the size of the next segment. Then in step 103 the stream server compares the size of this segment to a predetermined number N which is a limit on the amount of data to be prefetched in response to a single video prefetch command. If the segment size is greater than the number N, then in step 104 only a beginning portion of size N of this segment is prefetched by issuing a video prefetch command to the cached disk array (23 in FIG. 2); the rest of this segment is prefetched in one or more subsequent iterations beginning again in step 103. Otherwise, in step 105, the entire segment is prefetched by issuing a video prefetch command to the cached disk array (23 in FIG. 2). After steps 104 or 105, in step 106 execution branches to step 107 if the end portion of the segment has not been prefetched. In step 107 the segment size is reduced by N, in effect truncating the prefetched portion of the segment. After step 107, the prefetch task is suspended until it is time for the next video prefetch command (issued in steps 104 or 105), and then execution loops back to step 103 to continue prefetching the remaining portion of the segment. Otherwise, at the end of the segment, in step 109 the prefetching task is ended if there are no more segments of the movie to prefetch. If there are more segments of the movie to prefetch, in step 110, the prefetch task is suspended until it is time to prefetch the next segment.

There is a fetch task that is similar to the prefetch task shown in FIG. 10, except that a video fetch command instead of a video prefetch command is issued in the fetch task steps corresponding to steps 104 and 105. The time for the next fetch command is established by the requirement of isochronous video data delivery to the network client having requested the video data. Data are fetched sufficiently in advance of the required time for isochronous video delivery to the network client. The time for the next prefetch operation is established by synchronization between the prefetching of the movie with the fetching of the movie. Data are prefetched sufficiently in advance of its fetch time to guarantee that the data are in the cache of the cached disk array when the cached disk array receives the fetch command.

Figure 11:
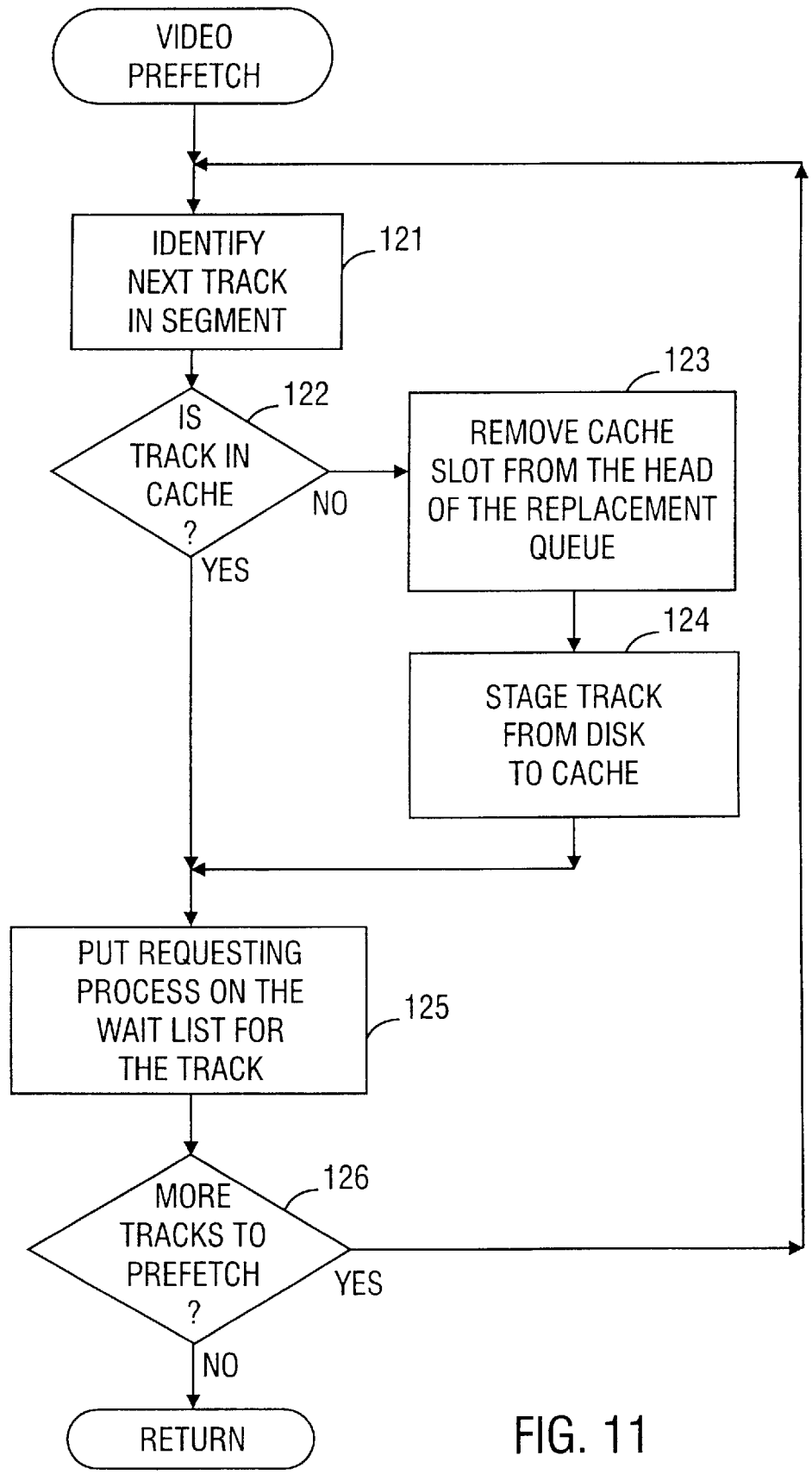
FIG. 11 is a flowchart of a video prefetch procedure of the cached disk array in the video file server of FIG. 1.

Turning now to FIG. 11, there is shown a flowchart of a video prefetch routine performed by the cached disk array in response to a video prefetch command from a stream server. The video prefetch routine ensures that data specified by the video prefetch command will be in the cache of the cached disk array at the time that the cached disk array receives a subsequent fetch command from the stream server. The execution of a video prefetch routine differs from a conventional cached disk array synchronous prefetch operation by ensuring that the video prefetch routine is executed on a high priority basis, and by ensuring that the prefetched video data are retained in the cache of the cached disk array until the subsequent prefetch command is serviced.

In a first step 121, the cached disk array channel director (43 in FIG. 3) having received the prefetch command identifies the next track in the video segment being prefetched. Next, in step 122, a cache directory in the cache memory (41 in FIG. 3) is inspected to determine whether the track is in the cache memory. If not, then in step 123, a cache slot is allocated to receive the track by removing the cache slot from the head of a "replacement queue" that keeps track of the "least recently used" cache slot or otherwise implements a replacement algorithm for the cache of the cached disk array. After step 123, in step 124, the track is staged from the disk array 47 and loaded into the cache slot.

If the track is found to be in the cache in step 122, or after the track is staged into the cache from disk in step 124, then in step 125 the requesting process is placed on a wait list for the track. In this fashion, the track can be retained in the cache until it is fetched by the process. In step 126 a time stamp for the track could also be reset to the current time, and used by a background process in the cached disk array to determine whether any track has been retained in the cache for any inordinate amount of time due to a failure of the process to fetch the video data from the cache. Upon finding that a track has been retained in the cache for an inordinate amount of time, the background process would return the cache slot to the head of the replacement queue and report to the video server manager that the process or processes on the wait list have experienced an error.

In a final step 126, execution loops back to step 121 if there are any more tracks in the video segment that need to be prefetched. If not, execution returns.

Figure 12:
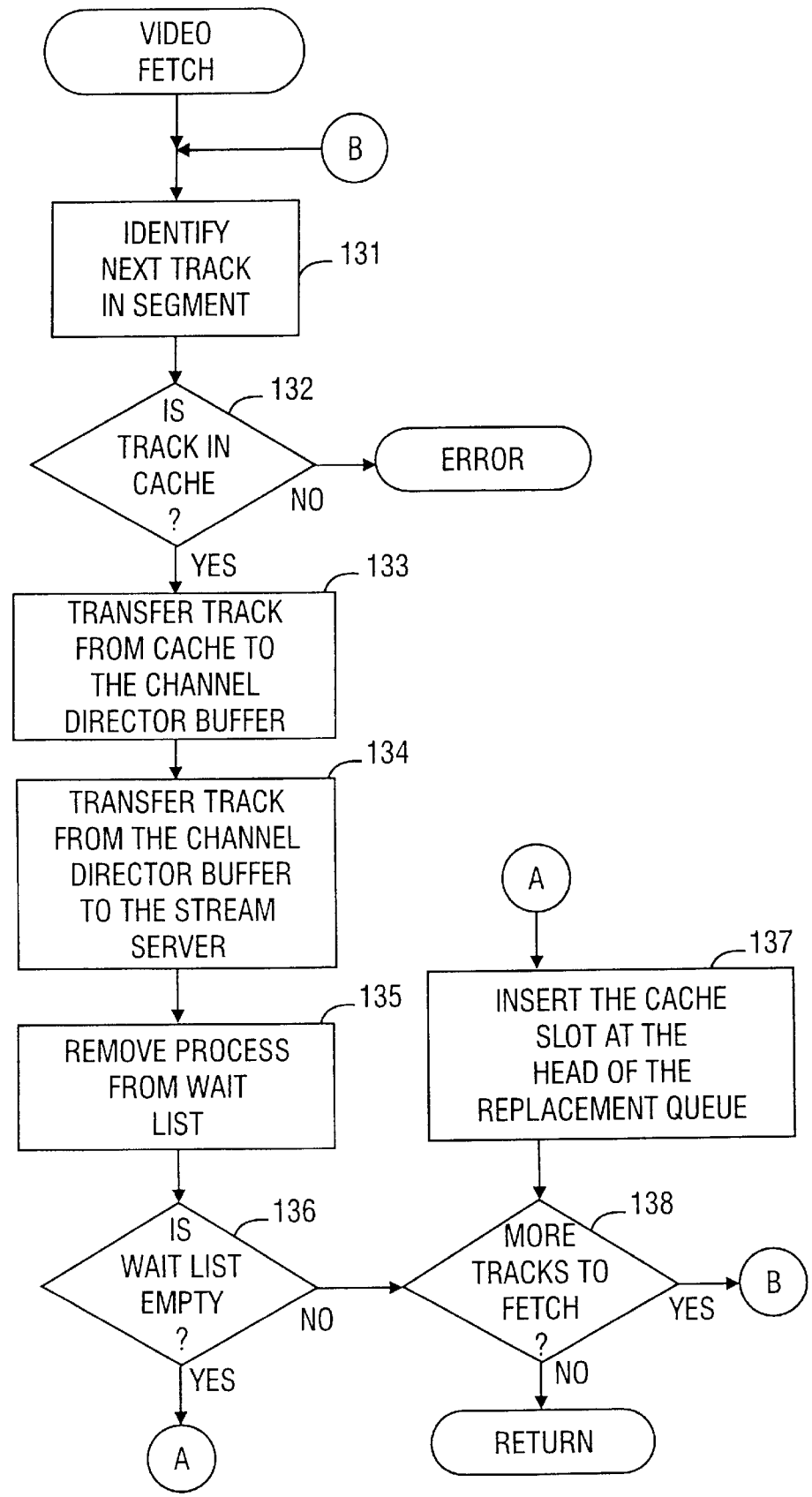
FIG. 12 is a flowchart of a video fetch procedure of the cached disk array in the video file server of FIG. 1.

Turning now to FIG. 12, there is shown a flowchart of a video fetch routine executed by a channel director (43 in FIG. 3) of the cached disk array in response to a video fetch command from a stream server. In a first step 131, the channel director identifies the next track in the video segment to be fetched. Then in step 132, the channel director accesses the directory in the cache memory (41 in FIG. 3) to determine whether data of the track is in the cache and to determine the cache slot containing the data of the track. If the track is not in the cache, then presumably an error has occurred, because each video fetch command specifying a video segment should have been preceded by a video prefetch command specifying the same video segment, and the video prefetch command should have been executed prior to receipt of the video fetch command. Otherwise, in step 133, the data of the track are transferred from the cache slot to a channel director buffer. Next, in step 134, the data are transferred from the channel director buffer to the stream server having issued the fetch command, and in step 135, the process of the stream server having issued the fetch command is removed from the wait list for the cache slot.

In step 136, execution branches depending on whether the wait list is empty. If so, then in step 137, the cache slot is inserted at the head of the replacement queue, so that the cache slot can be used for receiving data staged from another track. After step 137, or when the wait list is not empty, execution continues to step 138. In step 138, execution loops back to step 131 if there are any more tracks in the segment to be fetched. If not, the video fetch routine is done, and execution returns.

If data prefetched from the disk array (47 in FIG. 3) is to be used only by a single network client, then it is desirable to minimize the amount of memory space allocated in the cache 41 and in the stream server buffer 91 for storing the data. This is done by scheduling the fetch operation no more in advance of the delivery of the data to the network client than is necessary to guarantee that the fetched data will be available in the stream server buffer 91 at the scheduled time for delivery of the data to the network client, and scheduling the prefetch operation no more in advance of the delivery of the data from the cache 41 than is necessary to guarantee that prefetched data will be available in the cache when the fetch operation attempts to fetch the data from the cache.

If data prefetched from the disk array (47 in FIG. 3) will be used by multiple network clients, then it may be desirable to allocate more than the minimum amount of memory for storing the data in the cache of the cached disk array or in the stream server buffer. For example, the amount of memory to allocate for a movie-on-demand request could be an increasing function of the popularity of the movie.

Figure 13:
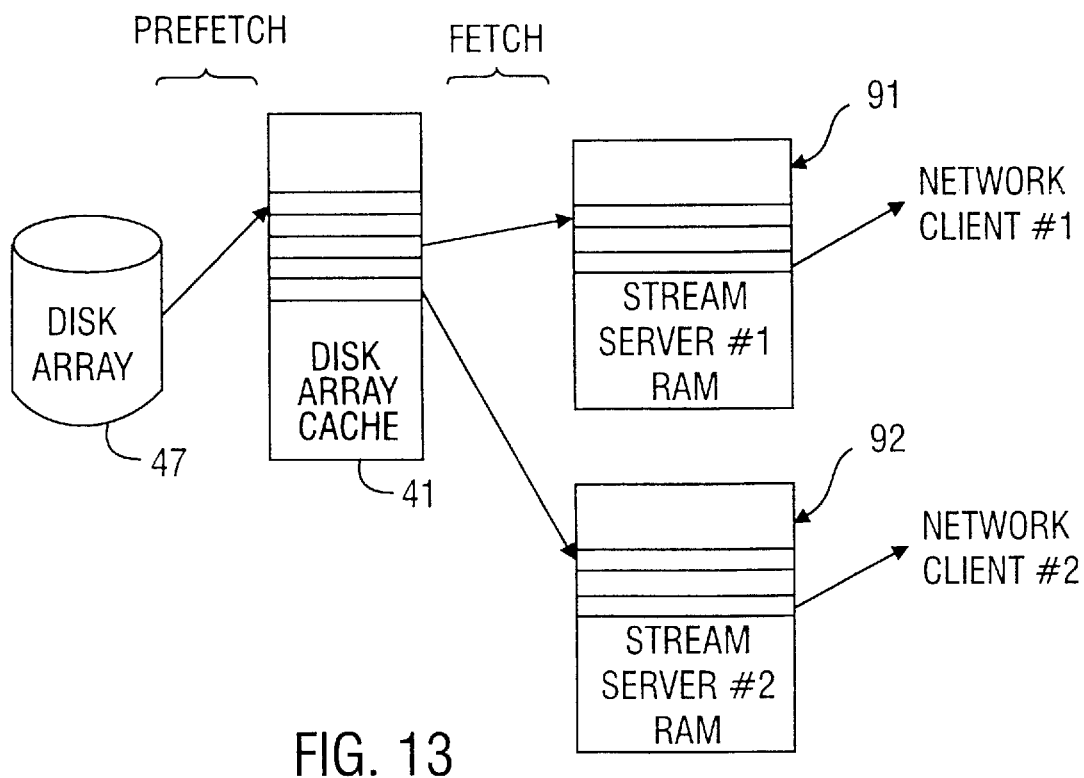
FIG. 13 is a schematic diagram similar to FIG. 9 but showing how a second stream server in the video file server can access data having been prefetched from the disk array for a first stream server of the video file server.

FIG. 13 shows a situation where data prefetched from the disk array 47 and stored in the cache 41 is used by more than one network client. In this situation, the same data previously fetched for the first network client is fetched from the cache 41 and transferred to a buffer 92 in RAM of a second one of the stream servers (21 in FIG. 2) and transmitted to a second network client. The loading on the disk array 47 is reduced because data are not prefetched from the disk array 47 separately and independently for each video stream. Instead, the data prefetched from the disk array 47 and stored in the cache of the cached disk array are shared between the two video streams through the two stream server buffers 91, 92 to the two network clients. This is a consequence of the fact that in the video prefetch routine of FIG. 11, if the data are already in the cache, then the data need not be staged from the disk array.

In the situation of FIG. 13, it may be desirable to schedule the prefetch operation further in advance of the delivery of the data from the cache 41 than is necessary to guarantee that prefetched data will be available in the cache 41 when the fetch operation attempts to fetch the data from the cache 41. It may be desirable to perform such advanced scheduling if the advanced scheduling would reduce the load on the disk array. The load on the disk array would be reduced if at the time of the advanced prefetch for the second network client, the data would reside in the cache of the cached disk array from a prefetch for a first network client. However, by scheduling prefetch far in advance, more cache memory resources would be allocated to servicing the second network client.

In general the desirability of advanced prefetch scheduling is function of the loading on the disk array 47, the loading or free memory capacity of the cache 41, the occurrence or probability of multiple fetch operations being needed to access the same movie, and the relative position or time difference of the different fetch operations on the same movie. In particular, advanced prefetching will not help unless there will be more than one prefetch operation on the same movie. The relative position or time difference between two prefetch operations on the same stream determines the amount of cache memory needed to eliminate additional disk accesses to support an additional one of the streams. Therefore, if the video file server would receive a request for supporting a new stream on a movie, it could decide whether or not to perform advanced prefetching, and to determine how far in advance to prefetch, in dependence on whether the video file server is already providing another network client with a video stream from the same movie, and the relative position or time difference in the movie between the newly requested stream and the closest existing stream. This time difference would set the cache memory requirements to support the new stream without requiring additional disk accesses. If the cache memory is available and it is less costly overall in system resources to support the new stream with cache memory instead of disk accesses, then advanced prefetching by an amount related to the time difference should be performed.

Figure 14:
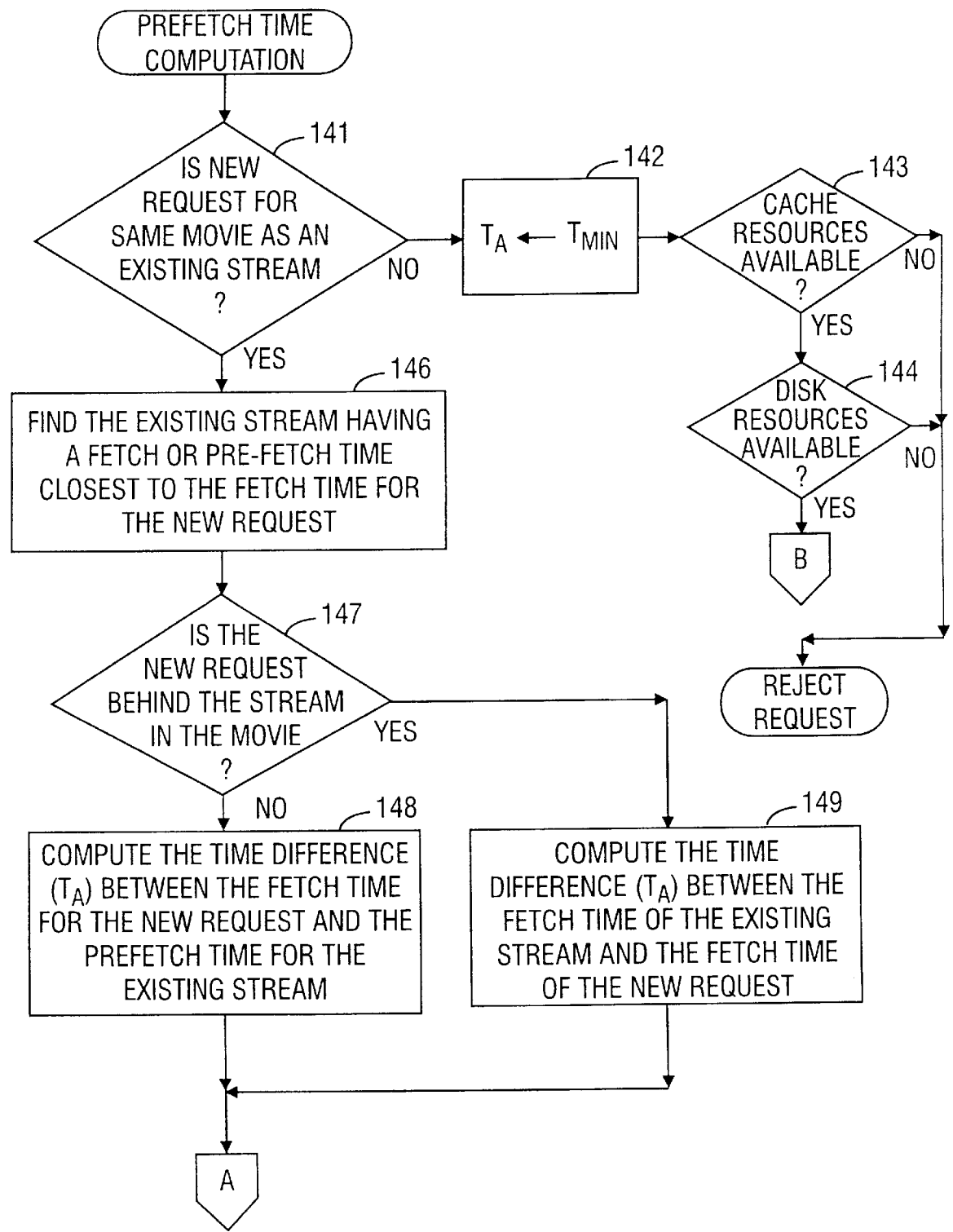
FIG. 14 is a first part of a flowchart of a subroutine for determining whether sufficient cache or disk resources are presently available in the cache disk array for supporting a requested video stream, and if so, determining whether more than a minimum amount of cache memory should be allocated to support the requested video stream.

Turning now to FIG. 14, there is shown a first portion of a flowchart of a routine for computing the prefetch advance time ($T_A$) for supporting a video stream of a new request for an "on demand" movie. Such a routine could be part of the admission policy of the kernel (63 in FIG. 5) of the video server manager. In a first step 141, execution branches depending on whether the new request is for the same movie as an existing stream.

If the new request is not for the same movie as an existing stream, then there is no need for advanced prefetching. In step 142, the prefetch advance time ($T_A$) is set to the minimum time $T_{MIN}$. Then in step 143, the kernel checks whether the minimum cache resources are available to support a new stream. If not, then the new request is rejected. Otherwise, in step 144, the kernel checks whether disk resources are available to support a new stream. If not, then the new request is rejected. Otherwise, execution continues in step 145 in FIG. 15. In step 145, the prefetch advance of the new request is set to $T_A$, and the new request is accepted.

If the new request is for the same movie as an existing stream, then execution continues in FIG. 14 from step 141 to step 146. In step 146, the kernel finds the existing stream having a fetch or pre-fetch time closest in the movie to the fetch time for the new request. In step 147, execution branches depending on whether or not the new request is behind this stream in the movie. If the new request is not behind this existing stream, then in step 148 the kernel computes the time difference ($T_A$) between the fetch time for the new request and the prefetch time for the existing stream. If the new request is behind this existing stream, then in step 149 the kernel computes the time difference ($T_A$) between the fetch time of the existing stream and the fetch time of the new request. After step 148 or 149, execution continues in step 150 of FIG. 15.

Figure 15:
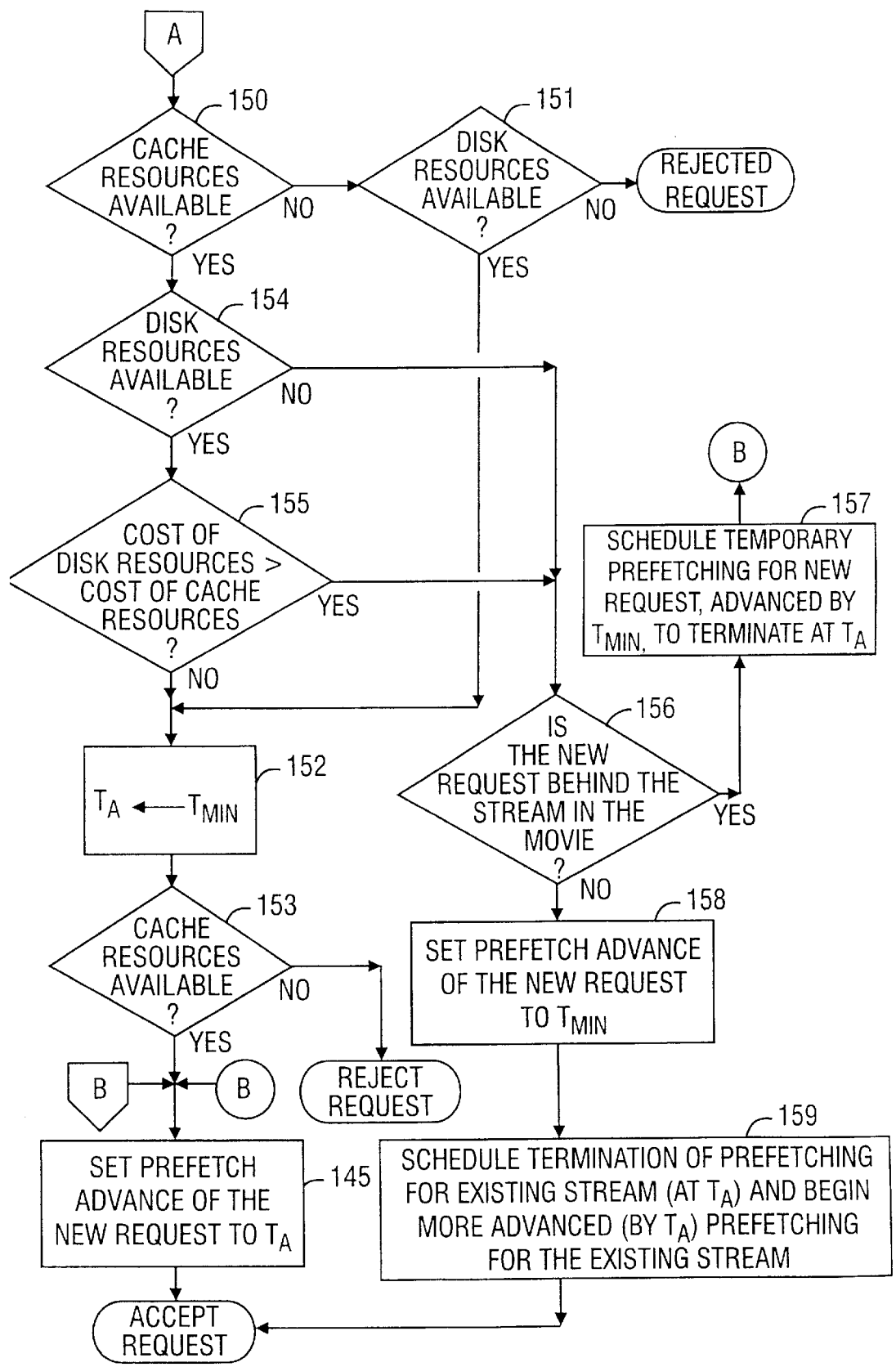
FIG. 15 is a second part of the flowchart begun in FIG. 14.

In step 150 of FIG. 15, the kernel checks whether cache resources are available to support the caching of the movie for the computed time difference ($T_A$). If not, then in step 151 the kernel checks whether disk resources are available to support a new stream. If not, then the request is rejected. If disk resources are available, then execution continues from step 151 to step 152. In step 152, the time difference ($T_A$) is set to the minimum value ($T_{MIN}$). Then in step 153, the kernel checks whether cache resources are available to support the caching of the movie for this minimum time. If not, then the new request is rejected. Otherwise, execution continues to step 145, where the prefetch advance of the new request is set to $T_A$, and the request is accepted.

If in step 150, there are sufficient cache resources available, then execution continues to step 154, where execution branches depending on whether or not disk resources are available to support the new stream. If disk resources are available, then execution continues from step 154 to step 155, where the relative cost of the disk resources for supporting the requested video stream without advanced prefetching is compared to the relative cost of the cache resources for supporting the requested stream with advanced prefetching. For example, the relative cost of the disk resources for supporting the requested video stream without advanced prefetching could be expressed as the percentage of the required disk resources out of presently unused amount of disk resources, and the relative cost of the cache resources for supporting the requested stream with advanced prefetching could be expressed as a percentage of the required cache resources out of the presently unused amount of cache resources. If the relative cost of disk resources does not exceed the relative cost of cache resources, then execution continues from step 155 to step 152. Otherwise, execution branches from step 155 to step 156. Execution also branches to step 156 from step 154 when disk resources are not available to support the new request.

In step 156 execution branches to step 157 if the new request is behind the existing stream in the movie. In this case, in step 157, there is scheduled temporary prefetching for the new request, advanced by $T_{MIN}$, to terminate at a time $T_A$ in the future. This temporary prefetching is scheduled to support the new stream until the time that the new stream caches up to the data having been staged into the cache for the existing stream. After step 157, execution continues to step 145, where the prefetch advance of the new request is set to $T_A$, and the new request is accepted.

When the new request is ahead of the existing stream in the movie, execution continues from step 156 to step 158, where the prefetch advance of the new request is set to the minimum value $T_{MIN}$. Then in step 159, the existing prefetching for the existing stream is scheduled to terminate in the future at a time of $T_A$ from the present time, and more advanced prefetching for the existing stream (advanced by an additional time of $T_A$) is begun for the existing stream. In this fashion, the new request is accepted.

V. Staggered Stream Support for Video On Demand

The method of sharing prefetched data in the cache of the cached disk array to support more than one video stream as illustrated in FIG. 13 can be further adapted to permit sharing of fetched data in the RAM of a stream server to support more than one video stream from the RAM of the stream server. For video "on demand" service for popular movies, however, it is advantageous to initially allocate large amounts of random access memory of the stream servers to the popular movies, in order to reduce loading on the cache and the disk array. Such allocation of the server RAM to the popular movies ensures that each popular movie needs a minimum amount of cache and disk array resources.

Figure 16:
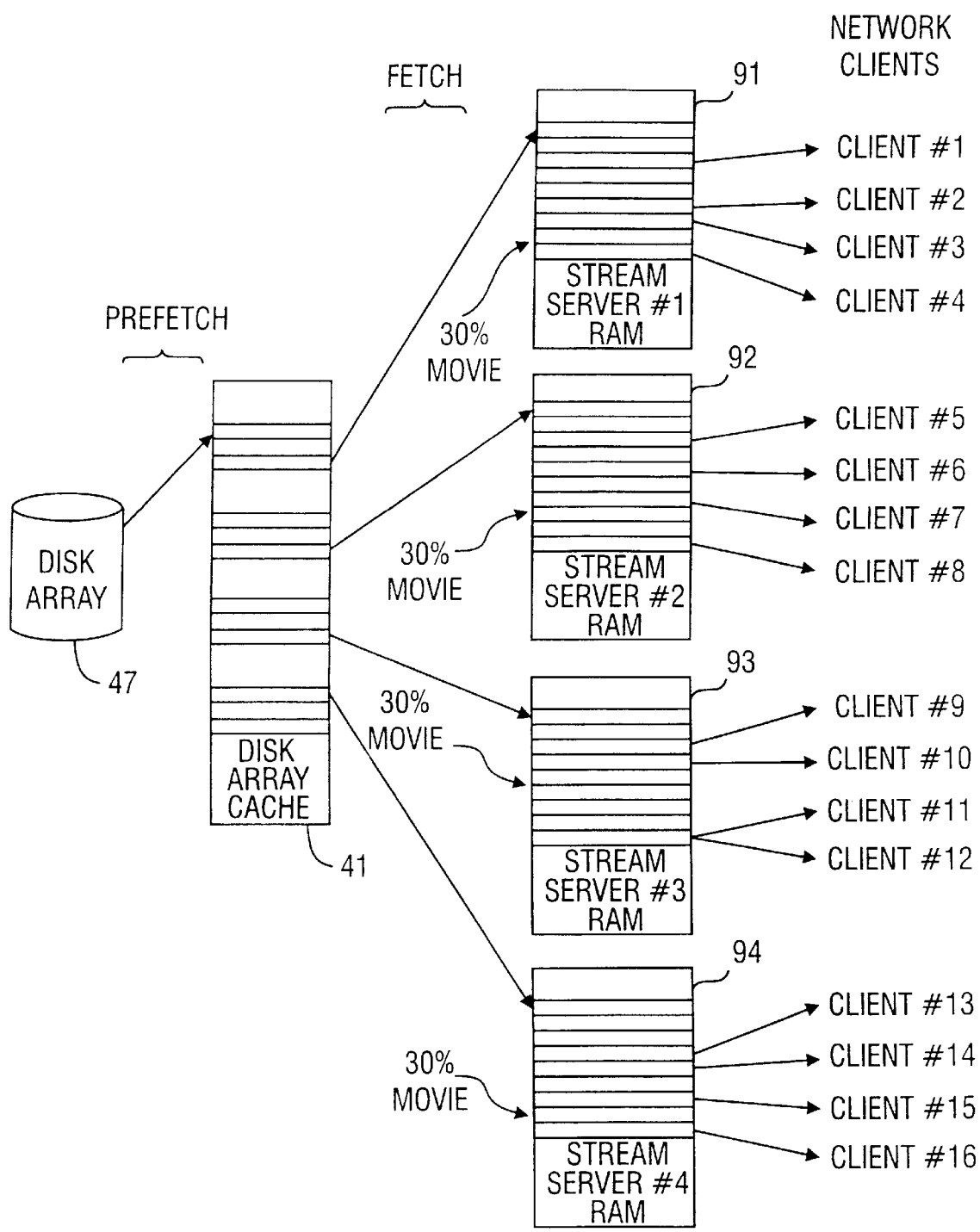
FIG. 16 is a schematic diagram showing "movie-on-demand" service to numerous network clients simultaneously viewing different portions of a movie.

Turning now to FIG. 16, there is shown a schematic diagram illustrating the preferred method of allocating server RAM to a popular movie. In the example in FIG. 16, a block of data for a third of a movie is stored in the RAM of each of four stream servers 91, 92, 93, and 94. In this example, there is a significant amount of overlap between the video data stored in the RAM of the four stream servers in order to simplify scheduling.

Preferably the block of data in the RAM of each of the four stream servers 91, 92, 93 and 94 is a sliding "window" into the movie. New data are added to each window, and old data are removed from each window, at the rate at which data are delivered to the network clients viewing the movie. The block of data providing such a sliding window, for example, is maintained as a simple circular queue. In this fashion, there is no need to re-allocate the network clients to different stream server PCs while a client is viewing a movie in an uninterrupted fashion. However, if a client would request a stop, fast-forward, or fast-reverse operation, it may be necessary to re-allocate a network client to a different stream server PC. In these cases, however, some delay would be acceptable before the client could resume the viewing of the movie. If a stop, fast-forward or fast-reverse operation takes the client's viewing out of the window, then the client's continued viewing of the movie can be treated similar to a new request.

The minimum number of stream server PCs required for supporting each movie according to the method of FIG. 16 is determined as follows. First, each movie needs a certain amount of RAM memory for storing the entire movie, plus a certain minimum amount of window overlap. The amount of RAM memory for storing a movie depends on the length of the movie (such as 90 minutes to 120 minutes) and the bit-rate (megabits per second) at which the encoded movie has been delivered; this rate is typically a function of the method by which the video data are encoded (such as MPEG I or MPEG II).

Second, each stream server PC can be configured with a maximum amount of RAM available as a buffer memory. This maximum amount of memory may limit the size of the window on a single stream server PC. The number of stream server PCs required for storing an entire movie in RAM is computed by dividing the total amount of RAM buffer memory needed for an entire movie (plus required overlap) by the amount of maximum RAM buffer memory of a single stream server PC, and rounding up to a whole number.

Third, each stream server PC can service only a limited number of video streams to the network clients. Given a certain maximum number of anticipated video streams, the minimum number of stream server PCs required for servicing this given number video streams is computed by dividing this given number by the number of video streams that can be serviced by each stream server PC, and rounding up to a whole number.

Finally, the minimum number of stream server PCs required in the system to support a single movie is the greater of the minimum number required to provide the needed buffer memory and the minimum number required to support the maximum number of anticipated video streams. The window size can then be computed by dividing the size of the movie in bytes (plus the required overlap) by the number of stream server PCs in the system.

Figure 17:
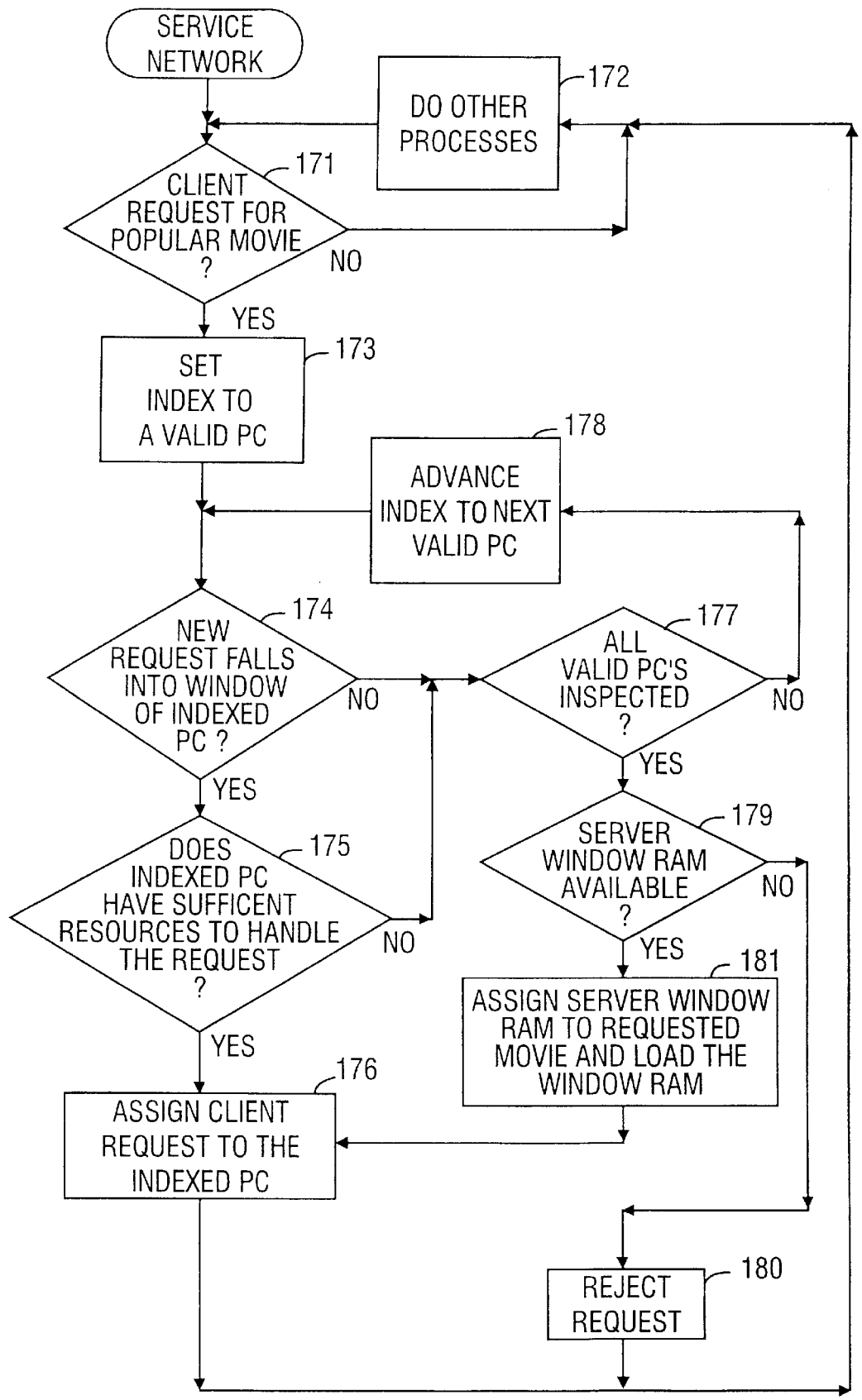
FIG. 17 is a flowchart of a routine for servicing requests from network clients for "movie-on-demand" service in accordance with the schematic diagram in FIG. 16.

Turning now to FIG. 17, there is shown a flowchart of a procedure used in the admission control program for servicing client requests from the network and implementing an admission policy for client requests for a popular movie. In a first step 171, the admission control program checks whether the client request is for something other than a popular movie that has been fetched from the cached disk array and loaded into stream server RAM as described above with reference to FIG. 16. If not, execution branches to step 172 to do other processes to service the client request. For example, if the request is for an unpopular movie that is stored in the disk array 47, then the request could be serviced as described above with reference to FIGS. 9 and 13. If the client request is for a popular movie, then execution continues from step 171 to step 173.

In step 173, the admission control program sets an index to point to a first valid or operable one of the stream server PCs. Then in step 174, the admission control program checks whether the desired starting time or position in the movie of the new request falls in the RAM window of the requested movie in the indexed stream server PC. If so, then in step 175 the admission control program checks whether the indexed stream server PC has sufficient resources to handle the client request. The indexed stream server PC, for example, may not have a free network link that would be needed for satisfying the request. In general, a stream server PC has a total buffer memory capacity limitation and a number of bandwidth limitations. The bandwidth limitations include a network bandwidth limitation, a throughput or buffer bandwidth limitation, and a bus bandwidth limitation for communication with the cached disk array 23 and the tape silo 34. The throughput or buffer bandwidth limitation is dependent on the type of bus used in the stream server PC. An advantage of the method used in FIG. 17 is that the throughput is used efficiently. Very little of the throughput is used for maintaining the sliding window in RAM, so that most of the throughput can be used for transmitting data from the sliding window to network clients.

If the indexed stream server PC has sufficient resources to handle the client request, then in step 176 the request is accepted by assigning the request to the indexed stream server PC.

If in step 174 the new request does not fall in a RAM window of the requested movie in the indexed stream server PC, or in step 175 the indexed stream server PC does not have sufficient resources to handle the request, then execution branches to step 177. In step 177, the admission control program checks whether all of the valid or operable stream server PCs have been inspected in the process of searching for a stream server PC than can satisfy the client request. This would occur when the next valid stream server PC is the one that was selected in step 173 and first inspected in step 174. If all of the valid PCs have not been inspected, then execution branches to step 178 to advance the index to the next valid PC, and after step 178, execution continues to step 174 to inspect this next valid PC.

If all of the valid PCs have been inspected, then execution continues from step 177 to step 179. In step 179, the admission control program checks whether there is any unassigned window RAM of the stream servers that could be allocated to open another window for the popular movie. This is done, for example, by indexing the valid stream servers again, searching for unallocated RAM windows. If an unallocated RAM window is not found, then execution branches to step 180 to reject the client request. Otherwise, in step 181, a server window RAM is assigned to the movie, and a task is initiated to load this server window RAM with duplicate movie data fetched from the cached disk array. If more than one stream server PC has an unallocated window, then one of these stream servers should be selected in an attempt to balance the loading on all of the stream servers. For example, the stream server having the most resources for servicing additional client requests is selected. Then in step 176, the client request is accepted by assigning it to the indexed stream server PC, which has the server window RAM assigned in step 181.

As described above with reference to FIGS. 16 and 17, a set of RAM windows in the RAM 91, 92, 93, 94 of the stream server PCs (21 in FIG. 2) are allocated and loaded with the data for each popular movie before the client requests for the movie are received, so that when a client request for the movie is received, the client can be immediately supplied with a video stream starting at any desired time or position in the movie. In step 181, a new RAM window is allocated and loaded with data when a new client request cannot be serviced from an existing RAM window because the resources of the stream server PC having the existing RAM window are used up in the servicing of prior client requests. However, for a very popular movie, the time for loading of a new RAM window with data might require some delay in the supplying of video data to new client requests because multiple new client requests might be received when data are being loaded from the cached disk array to the new RAM window. Therefore, when the resources of a stream server PC having a RAM window for a very popular movie become used up or nearly used up, it could be desirable to allocate a RAM window in another stream server PC at that time and immediately begin loading data into the newly allocated RAM window in anticipation of additional client requests for the very popular movie.

Figure 18:
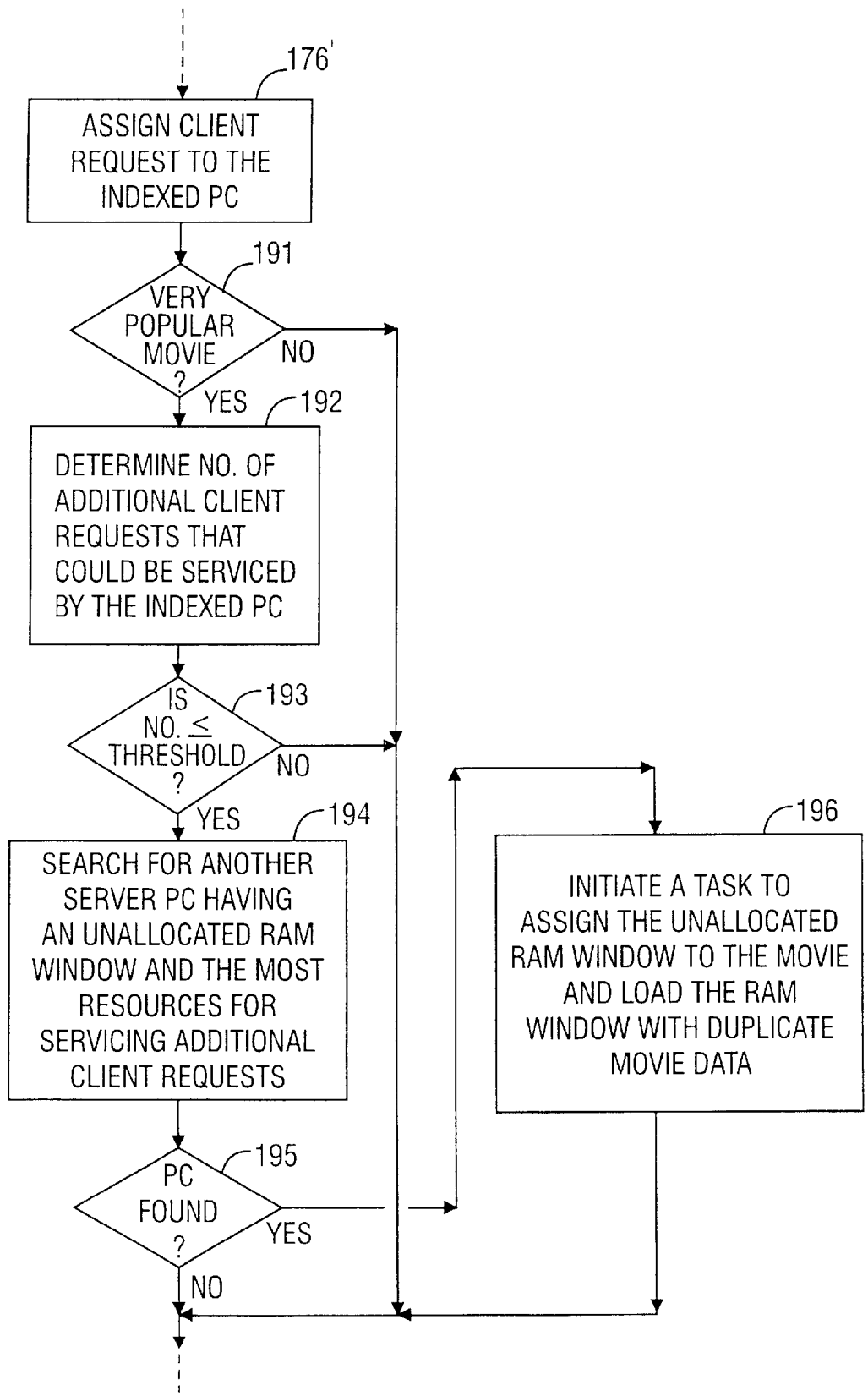
FIG. 18 is a flowchart of steps that could be added to the routine of FIG. 17 to dynamically allocate RAM windows of the stream servers of FIG. 2 in anticipation of client requests for "movie-on-demand" service.

Turning now to FIG. 18, there is shown a flowchart of steps that could be substituted for step 176 of FIG. 17 in order to allocate a RAM window in another stream server PC when the resources of a stream server PC having a RAM window for a very popular movie become used up or nearly used up. The first step 176' in FIG. 18 is similar to step 176 of FIG. 17. After a client request is assigned to the indexed stream server PC in step 176', the admission control program checks in step 191 whether the movie is designated as a very popular movie. For example, a movie should be designated as a very popular movie if more than one client request for the same RAM window of the movie is likely to be received in the time that it takes to load the RAM window.

If the movie is not very popular, then a RAM window of duplicate movie data is not allocated until it is actually needed to service a client request. Otherwise, execution continues from step 191 to step 192. Step 192 determines the number of additional client requests that could be serviced by the indexed stream server PC. In step 193, this number is compared to a threshold, which could be a predetermined constant, such as zero, or which could be a number designated for each movie and related to the popularity of the movie. For example, the number could be approximately the maximum number of requests that are likely to be received for the RAM window of the movie in the time that it takes to load a newly allocated RAM window.

If the number of additional client requests that can be serviced by the indexed stream server PC is not less than or equal to the threshold, then a RAM window of duplicate movie data is not allocated until the indexed stream server PC uses up more of its existing resources for servicing additional client requests. Otherwise, execution continues from step 193 to 194. In step 194, the admission control program searches for another stream server PC having an unallocated RAM window, and the most resources for servicing additional client requests. If such a server PC is found having some resources for servicing additional client requests, as tested in step 195, then execution branches to step 196. In step 196, the admission control program initiates a task to assign the unallocated RAM window to the movie and load the RAM window with duplicate movie data.

VI. On-line Tape Backup

Figure 19:
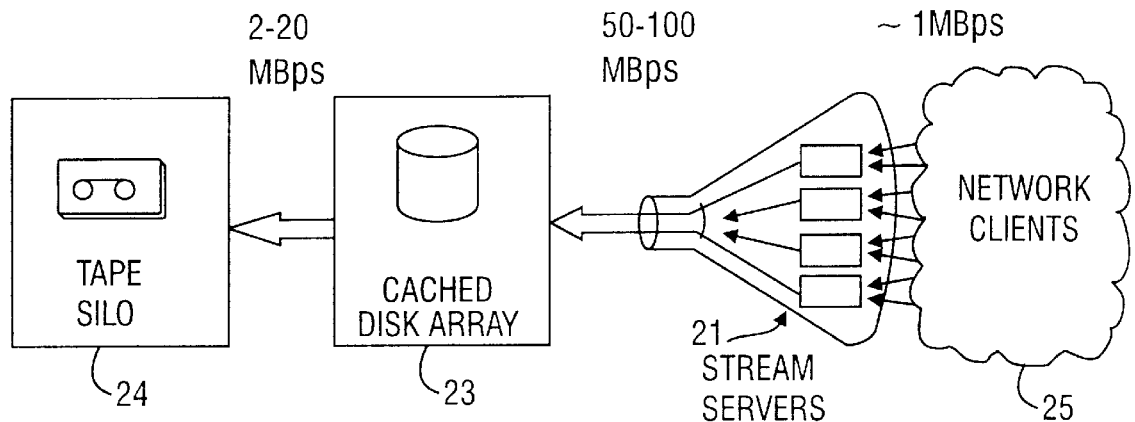
FIG. 19 is a schematic diagram illustrating data flow in the video file server of FIG. 1 during "on-line" tape backup operations.

Turning now to FIG. 19, there is shown a schematic diagram illustrating the flow of data through the file server (20 in FIG. 1) in a "network backup" operation. The stream servers 21 serve to funnel data from clients on the network 25 into the cached disk array 23. The stream servers accept data at a rate on the order of, typically, several megabits per second from each network client (as determined by the existing network connections and remote backup application capabilities). Each stream server sends data to the cached disk array 23 at a rate which is the aggregate of all the streams received by the stream server and can be on the order of about fifty to one hundred megabits per second. The cached disk array in turn sends the backup data to the tape silo 24 at the rate allowed by the capabilities of the tape silo—typically on the order of 2 to 20 megabits per second, much less than the capabilities of the cached disk array. (Disk arrays are typically faster than tape silos, as determined by the ratio of the concurrent number of disk read/write streams to the number of tape read/write drives.) The cached disk array serves as a speed matching buffer and as a means for combining the data or files to be written to a particular tape cartridge in the tape silo 24. Backup data can be streamed, concurrently by all the stream servers, to the cached disk array 23 at an aggregate speed on the order of 150 gigabytes per hour. The backup data are then sorted and written to tape at a tape transport speed on the order of 7 gigabytes per hour per device.

It is desirable to use the cached disk array 23 as a buffer because backup to tape is relatively slow. The rate at which data are written to a single tape cartridge can be slower than the aggregate rate at which data are transmitted by the network clients. The robotic control of the mounting of a selected tape on a read/write station and the control of the tape transport at the read/write station involves additional delays, which can be effectively avoided by the use of the cached disk array 23 as a buffer. The cached disk array therefore permits better utilization of the tape read/write stations and reduces tape and tape transport wear. Data can be streamed to tape continuously at tape speed from the cached disk array without attempting to match data flow from the stream servers.

Because the cached disk array 23 may use a nonvolatile write buffer and well-known RAID techniques of error correction to recover from disk drive failures, the cached disk array can acknowledge completion of a backup operation as soon as the data are written to the cached disk array. The actual writing to tape could be done as a background process, mainly during off-peak hours, when the stream servers are not heavily loaded by data transfers to and from network clients. The cached disk array can provide "instant" restore service for backup files maintained in the cached disk array. The cached disk array can also provide temporary batch backup, without writing to tape, pending success or failure of transactions by clients that employ transactional semantics or transaction processing.

Figure 20:
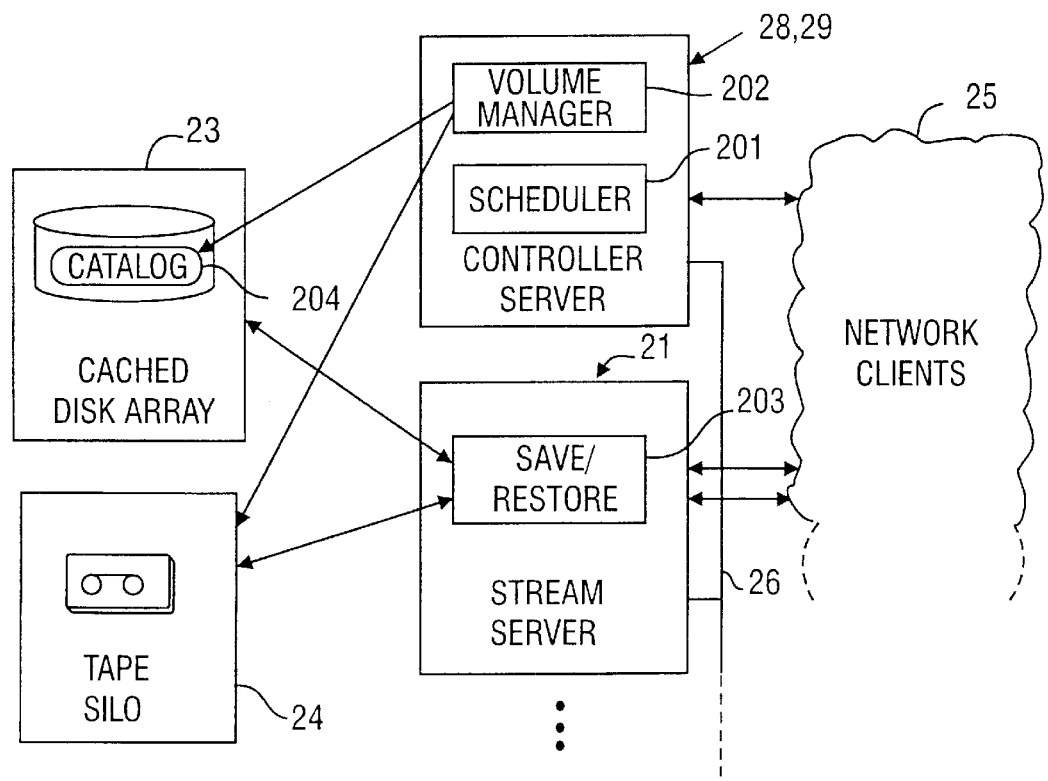
FIG. 20 is a block diagram showing a distribution of software used in the video file server of FIG. 1 for the "on-line" tape backup operations of FIG. 19.

Turning now to FIG. 20, there is shown a block diagram illustrating the distribution of software used in the file server (20 in FIG. 1) for the "on-line" tape backup operations of FIG. 19. The backup software used for this purpose can be designed and written specifically for it, or it can be a modification of an existing backup package, as described below. In particular, an existing implementation of suitable backup software is adapted from the Epoch™ backup software sold by EMC Corporation, 171 South Street, Hopkinton, Mass. 01748. The backup software includes a backup scheduler 201, a volume manager 202, and a save/ restore data mover 203. The backup software in the file server (20 in FIG. 1) is adapted from the Epoch™ Hierarchical Storage Management (HSM) software by splitting the save/restore data mover 203 from the backup scheduler 201 and volume manager 202 so that the data mover 203 can run in the environment of a separate computer. The backup scheduler 201 and the volume manager 202 comprise the "control" part of the Epoch™ backup software. The backup scheduler 201 and the volume manager 202 run in the active controller server (28 or 29 in FIG. 2) to provide backup scheduling, migration and catalog management. Alternatively, the backup scheduler 201 and the volume manager 202 could run in a separate external computer (not shown), which could communicate with the stream servers 21 over a network different from the internal Ethernet 26. The save/restore data mover 203 is replicated in each of the stream servers 21, only one of which is shown in FIG. 20. The save/restore data mover 203 is responsive to commands transmitted by the backup scheduler 201 and volume manager 202 over the internal Ethernet link 26. The backup scheduler 201, the volume manager 202, and the save/restore data mover 203 are adapted to communicate via the commands over the Ethernet link 26 instead of the procedure calls that are used in the Epoch™ backup software.

In operation, when the active controller server 28, 29 (or alternatively, the external computer executing the "control" part of the backup software) receives a request from a network client for backup service, the volume manager 202 keeps track of the location of a requested file or data set (whether on disk or on tape). For this purpose, the volume manager accesses a catalog 204 stored in the cached disk array 23. The catalog 204 stores information identifying backed-up files or data sets. For each backed-up file or data set, the catalog also stores information identifying whether the backed-up file is stored on disk in the cached disk array 23 or on tape in the tape silo 24. When the backed-up file or data set is stored on disk in the cached disk array 23, the catalog 204 stores information identifying the tracks containing the file or data set. Each track is identified by a volume, cylinder and head address. When the backed-up file or data set is stored on tape in the tape silo, the catalog 204 stores information identifying the tape cartridge or cartridges containing the file or data set, and the position of the file or data set in each tape cartridge. If a network client requests backup of a new file or data set, the volume manager 202 allocates disk and tape storage to the new file or data set and updates the catalog 204.

The scheduler 201 schedules the movement of data among a network client, the cached disk array 23, and the tape silo 24. For a typical save operation, the scheduler coordinates with the control application being executed by the active one of the controller servers 28, 29 to select one of the stream servers to function as a data mover. The selected stream server moves the backup data from the network client to allocated tracks in the cached disk array. Later, this same stream server or another selected stream server moves the backup data from the cached disk array to the tape silo. When the backup data has been written to allocated disk or tape storage, the catalog 204 is updated to indicate that the data are available to be read during a restore operation.

In a restore operation, a client on the network 25 specifies a file or data set to be restored. The volume manager 202 reads the catalog 204 to find the location of the specified file or data set. If the catalog 204 indicates that the specified file or data set is in the cached disk array 23, then the file or data set is read by a selected one of the stream servers 21 from the cached disk array and transmitted to the network client. Otherwise, if the catalog 204 indicates that the specified file or data set is stored in the tape silo 24, then the file or data set is read by a selected one of the stream servers 21 from the tape silo and transmitted to the client on the network 25.

The cache disk array 23 is used as an intermediate buffer during the restore process. In this case, the selected one of the stream servers 21 reads the backup data from the tape silo 24 and temporarily stores the backup data in the cached disk array 23. Then the same stream server, or another stream server, reads the backup data from the cached disk array 23 and transmits the backup data to the client on the network 25.

Figures 21, 22:
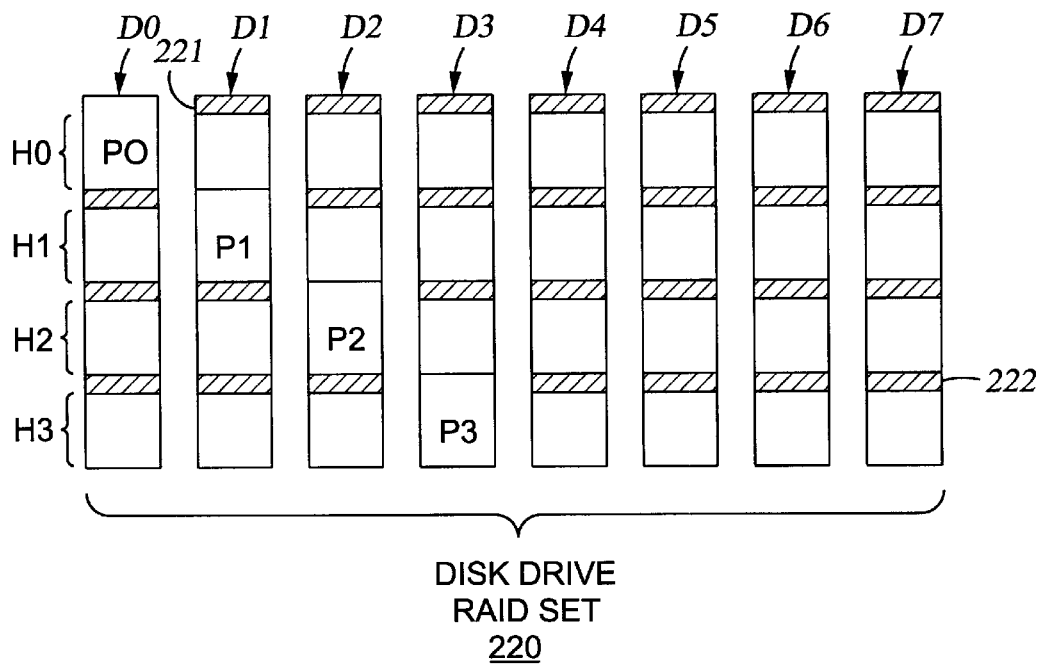
FIG. 21 is a memory map of a RAID set including eight disk drives.
FIG. 22 is a portion of a transfer unit mapping table that gives the disk drive number and hyper-volume number of each transfer unit in a stripe set.

VII. Configuration, Access, and RAID Striping of Data Storage for Continuous Media The video file server preferably uses RAID techniques in order to ensure data availability and in particular to recover from a failure of any single disk drive in a RAID set. The preferred configuration of data and parity in a RAID set is shown in FIG. 21. The RAID set 220 includes a group of n disk drives, and as shown n is eight. The RAID set 220 is one of a number of RAID sets formed by grouping the disk drives in such a way that one disk drive in the set stores parity information for data in the other disk drives in the RAID set. Moreover, the parity information for the data in the RAID set is spread across more than one of the disk drives, so that access to the parity does not become a bottleneck for write operations, and multiple writes to parity and data can proceed concurrently.

FIG. 21 depicts a memory map for each of the disk drives D0, D1, D2, . . . , D7. The memory maps for the disk drives form columns in a memory map array. The rows in the memory map array are parity groups. In particular, data storage of each disk drive D0, D1, D2, . . . , D7 in the RAID set is partitioned into an integer number m of hyper-volumes H0, H1, H2, H3, and the parity is stored in one hyper-volume of each of m disk drives in the RAID set. As shown, m is 4, and therefore there are four hyper-volumes of parity designated as P1, P1, P2, and P3. Each byte of parity in each of the parity hyper-volumes is computed as the exclusive-OR of the corresponding data bytes having the same address in each of the other disk drives in the RAID set. In FIG. 21, for example, the addresses increase consecutively from top to bottom in the memory map for each disk drive D0, D1, D2, . . . , D7.

Because the parity information in the RAID set 220 is distributed over the four disk drives D0, D1, D2, D3, the loading on the disk drives is more balanced during write access. A write access requires data to be written to at least one of the disk drives and to the disk drive for storing the associated parity information. If only one of the disk drives stored all of the parity information, then this one disk drive would need to be accessed during every write operation, which could become a bottleneck to data availability during a heavy concentration of write operations to the RAID set.

The storage of continuous media data in the RAID set introduces another problem of data availability that is particularly severe in the case of a single disk drive failure mode of operation. In such a single disk failure mode of operation, it is necessary to access all of the operational disk drives in the RAID set to reconstruct the data in the failed disk drive from the data and parity in the parity group of the reconstructed disk drive. If all of the data for any one of the continuous media files were stored in just one of the disk drives, and that one continuous media file had a very high access frequency, then all of the operational disk drives would be very heavily loaded during reconstruction of the data in the failed disk drive, possibly causing a bottleneck to the access of other files stored in the RAID set.

Unfortunately, it is very likely that a particular one of the continuous media files will have a very high access frequency in comparison to all other continuous media files stored in the RAID set. For example, the most popular new-release movie in a video-on-demand application may very well have an access frequency exceeding that of all other current movies. A continuous media file such as a popular movie also tends to be rather large and tends to be accessed concurrently by multiple users at different locations in the file. All of these circumstances tend to cause a data availability problem among the disk drives in the RAID set unless the data and the parity for each continuous media file is distributed over all of the disk drives in the RAID set.

As shown in FIG. 21, data for one continuous media file, shown with cross-hatching, are striped across all of the disk drives in the RAID set and have associated parity in each of the disk drives that store parity in the RAID set. Such striping across all of the disk drives in the RAID set, in combination with a relatively fixed overhead for disk access and the sequential or isochronous fashion of data access to the multimedia file, however, leads to a problem of a high rate of disk access unless a relatively large transfer unit of continuous media data is accessed during each disk access.

Preferably, the transfer unit includes an integer number j of data blocks, and each hyper-volume includes an integer number k of transfer units. Each stripe set includes (m)(n−1) transfer units of data, or a total of (j)(k)(m)(n−1) data blocks. For example, the transfer unit includes 256 blocks, and each block includes 512 bytes, so that the transfer unit is 128K bytes. For a RAID set including eight disk drives and four hyper-volumes per drive, one stripe set includes 28 transfer units, or 14,336 blocks total, or 3.5 M bytes total.

Preferably, the transfer units of the RAID set are allocated for the storage of continuous media data in a right-to-left and then top-to-bottom order in which the transfer units appear in an m row by n column matrix in which the rows of the matrix represent parity groups of hyper-volumes in the disk drives and the columns of the matrix represent the storage in the respective disk drives. For example, video data appearing in the first transfer unit 221 of the stripe set shown in FIG. 21 is the earliest video data in the stripe set, and video data appearing in the last transfer unit 222 of the stripe set shown in FIG. 21 is the latest video data in the stripe set. As continuous media data is read from the stripe set in a more or less isochronous fashion, this allocation scheme staggers the timing of the individual access operations to the disk drives in the RAID set to ensure data availability despite wide variations in access frequency. The staggered timing also permits efficient parity computations during write access and only a single write access is needed to each parity hyper-volume during a write access to the entire stripe.

Preferably the respective transfer units in a stripe are accessed sequentially by incrementing a transfer unit index, and indexing a transfer unit mapping table such as the table 230 illustrated in FIG. 22 to determine the disk drive and the particular hyper-volume in the storage of the disk drive that stores the transfer unit. The first column of the table 230 is the transfer unit index, the second column of the table is a disk drive index, and the third column of the table is a hyper-volume index. For the particular organization shown in FIG. 21, the parity associated with any transfer unit is found in the disk drive identified by the hyper-volume index. In other words, the parity P0 associated with the first hyper-volume H0 of data in any drive is found in the first hyper-volume H0 in the first disk drive D0, the parity P1 associated with the second hyper-volume H1 of data in any drive is found in the second hyper-volume H1 in the second disk drive D1, etc. Therefore a single look-up in the table 230 gives the disk drive and hyper-volume containing the associated parity as well as the disk drive and hyper-volume containing the transfer unit data.

FIG. 22 illustrates only a first and last series of entries in the transfer unit mapping table 230. The entire table is reproduced below:

| TRANSFER UNIT MAPPING TABLE | | |
|---|---|---|
| TRANSFER UNIT INDEX | DRIVE INDEX | HYPER-VOL. INDEX |
| 0 | 1 | 0 |
| 1 | 2 | 0 |
| 2 | 3 | 0 |
| 3 | 4 | 0 |
| 4 | 5 | 0 |
| 5 | 6 | 0 |
| 6 | 7 | 0 |
| 7 | 0 | 1 |
| 8 | 2 | 1 |
| 9 | 3 | 1 |
| 10 | 4 | 1 |
| 11 | 5 | 1 |
| 12 | 6 | 1 |
| 13 | 7 | 1 |
| 14 | 0 | 2 |
| 15 | 1 | 2 |
| 16 | 3 | 2 |
| 17 | 4 | 2 |
| 18 | 5 | 2 |
| 19 | 6 | 2 |
| 20 | 7 | 2 |
| 21 | 0 | 3 |
| 22 | 1 | 3 |
| 23 | 2 | 3 |
| 24 | 4 | 3 |
| 25 | 5 | 3 |
| 26 | 6 | 3 |
| 27 | 7 | 3 |

Each stripe set has an identification number consisting of a RAID set number and an index of the stripe set in the RAID set. The RAID set number identifies a particular one of a number of RAID sets or disk drive groups in the storage system. The stripe set index identifies a particular one of a number of stripe sets in the RAID set, and is used as an index for addressing a transfer unit in each disk drive in the RAID set. For example, if the transfer unit contains j blocks, and the hyper-volume contains k transfer units, then the starting block address of the transfer unit specified by the transfer unit index in the disk drive identified by the drive index from the table above is computed as: $((HVI)(k)+(SSI))(j)$, where HVI is the hyper-volume index from the table above and SSI is the stripe set index.

Figure 23:
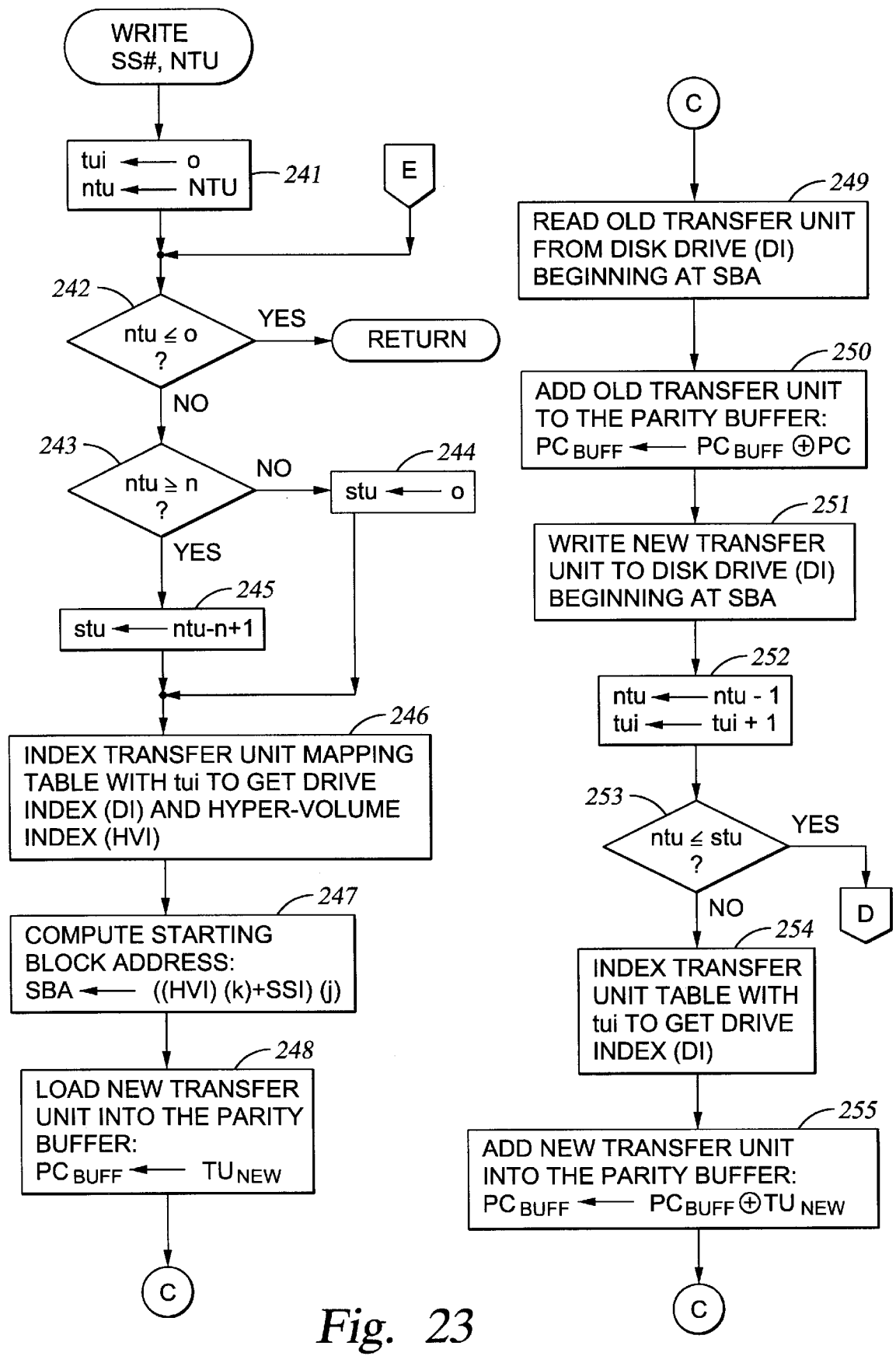
FIG. 23 is a first sheet of a flowchart of a procedure for providing write access to a stripe set.
Figure 24:
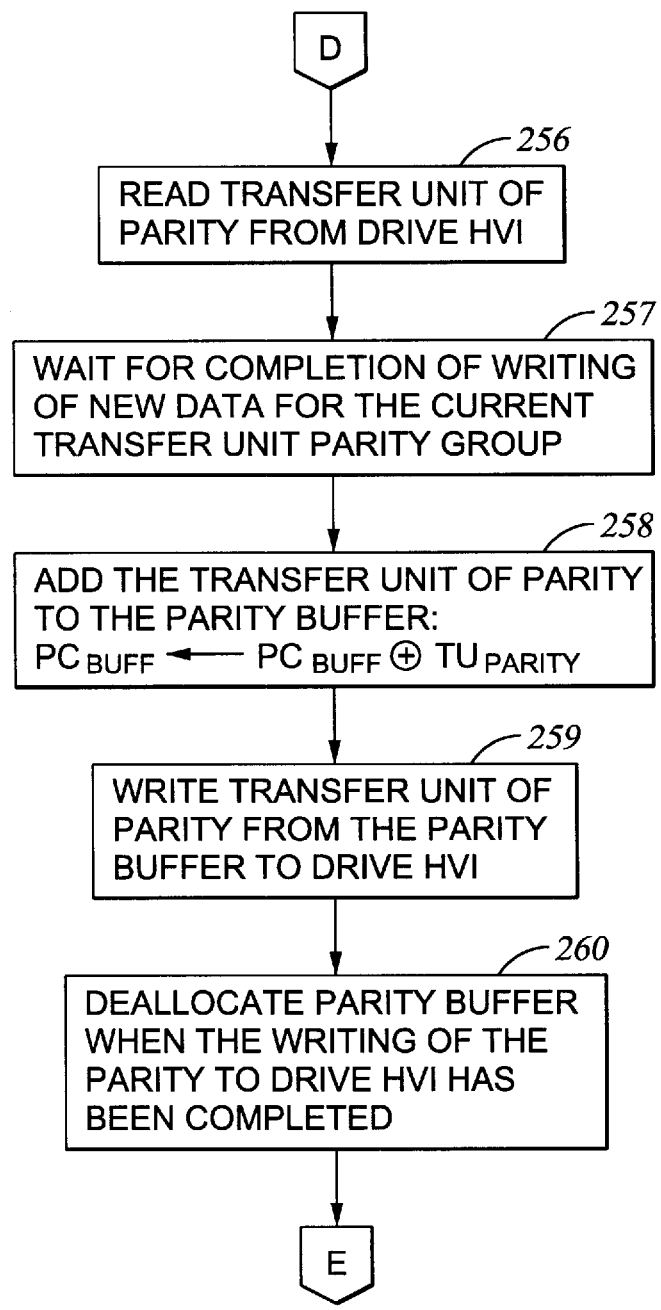
FIG. 24 is a second sheet of the flowchart begun in FIG. 23.

Because parity groups are formed of contiguous transfer units in each stripe set, at most one write access to each parity hyper-volume need be performed during write access to a stripe set. A high level of recoverability can be guaranteed by retaining at most one transfer unit of new parity information in non-volatile memory. An example of such a procedure for providing write access to a stripe set is shown in the flowchart of FIGS. 23 and 24. The procedure accepts as input parameters a stripe set identification number (SS#), and a parameter (NTU) specifying a certain number of transfer units to be written to the stripe set. The procedure, for example, is encoded as a subroutine program executed by processors in the disk directors (44 in FIG. 3).

In a first step 241 of FIG. 23, a transfer unit index (tui) is set to zero, and a transfer unit counter (ntu) is set to the value of the parameter NTU. Since stripe sets are the minimum granularity of disk storage allocated to continuous media data, a first transfer unit of data can always be written to a transfer unit of disk storage for which the transfer unit index has a value of zero. Next, in step 242, execution returns if the transfer unit counter (ntu) has a value of zero. Otherwise, execution continues to step 243.

In steps 243 to 245, a value is computed for a variable (stu) indicating the value that the transfer unit counter (ntu) should have upon completing the writing of a next parity group of transfer units. In particular, in step 243, the value of the transfer unit counter is compared to the number of disk drives in the RAID set to determine whether or not the write operation can be completed by writing to a single parity group of transfer units (i.e., to at most one transfer unit in each of the disk drives in the RAID set). If the value of the transfer unit counter is not greater or equal to the number (n) of disk drives in the RAID set, then the write operation can be completed by writing to a single parity group of transfer units, and the write operation is completed when the transfer unit counter reaches a value of zero. In this case, execution branches from step 243 to step 244 to set stu to zero. Otherwise, if the value of the transfer unit counter is not greater or equal to the number (n) of disk drives in the RAID set, then the write operation cannot be completed by writing to a single parity group of transfer units, and the write operation to the next parity group is completed when the transfer unit counter reaches a value of ntu−n+1. In this case, execution continues from step 243 to step 245 to set stu to a value of ntu−n+1. After step 244 or step 245, execution continues to step 246.

In step 246, the transfer unit mapping table (FIG. 22) is indexed with the transfer unit index (tui) to fetch the associated drive index (DI) and hyper-volume index (HVI). Then, in step 247, a starting block address (SBA) for the current transfer unit (and all other transfer units in the same parity group) is computed as SBA←((HVI)(k)+SSI)(j), where k is the number of transfer units in each hyper-volume, and j is the number of blocks in each transfer unit. Then, in step 248, data of the new transfer unit having the index (tui) are loaded into a non-volatile parity buffer. Execution continues to step 249.

Steps 249 to 255 comprise a processing loop that is traversed once for each transfer unit of data to be written to the same parity group containing at most one transfer unit of data in each disk drive of the RAID set. In step 249, the old version of the transfer unit of data indexed by tui is read from the disk drive indexed by DI beginning at the starting block address SBA. Next, in step 250, the old version read from disk is added to the parity buffer using an exclusive-OR operation in order to compute parity changes due to the writing of the new version over the old version, and in order to accumulate these parity changes in the parity buffer.

In step 251, the new version of the transfer unit of data indexed by tui is written to the disk drive indexed by DI beginning at SBA. In step 252, the transfer unit counter ntu is decremented by one, and the transfer unit index is incremented by one. Next, in step 253, the value of the transfer unit counter ntu is compared to the stopping value stu.

If the value of the transfer unit counter ntu is not less than or equal to the stopping value stu, then execution continues from step 253 to step 254 in order to index the transfer unit table with the transfer unit index tui to get the drive index (DI). Then in step 255, new data for the transfer unit indexed by tui is added into the parity buffer using an exclusive-OR operation, and execution loops back to step 249 to perform another iteration for this next transfer unit.

If the value of the transfer unit counter ntu is less than or equal to the stopping value stu, then execution branches from step 253 to step 256 in FIG. 24.

In step 256 of FIG. 24, a transfer unit of parity for the current transfer unit parity group is read from the disk drive HVI, beginning at the starting block address SBA last computed in step 247 of FIG. 23. Next, in step 257, execution waits for completion of the writing of data for the current transfer unit parity group, if writing has not been completed when step 257 is reached. Then, in step 258, the transfer unit of parity is added to the parity buffer, by performing an exclusive-OR of the transfer unit of parity read from the drive HVI with the parity information in the parity buffer, and storing the result back in the parity buffer. In step 259, the transfer unit is written from the parity buffer back to the drive HVI, starting at the starting block address SBA. Finally, in step 260, the parity buffer is deallocated when the writing of the parity to the drive HVI has been completed. After step 260, execution returns to step 242 of FIG. 23. Eventually, the transfer unit counter ntu reaches a value of zero when all of the transfer units have been written to the disk drives, and execution returns from step 242 of FIG. 23.

The subroutine depicted as a flowchart in FIGS. 23 and 24 uses the stripe set identification number for specification of locations for accessing desired continuous media data. In a data network, however, it is conventional for network clients to specify desired data by a file name. Preferably, continuous media data is logically organized as individually named files, which will be referred to as "clips".

Figure 25:
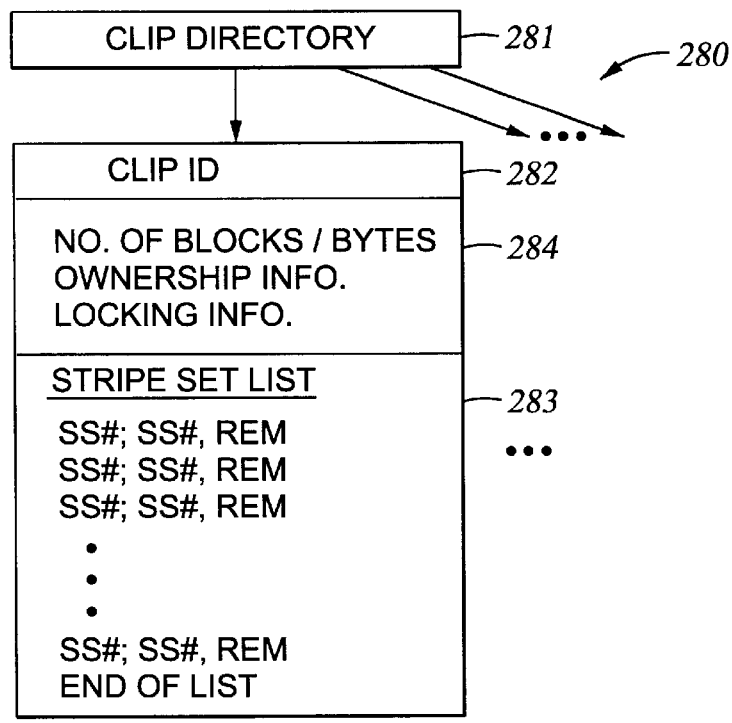
FIG. 25 is a block diagram of a clip directory and information associated with each clip including a list of stripe sets comprising the clip.

As shown in FIG. 25, a clip directory 281 associates a clip name or identifier 282 with a list 283 of allocated stripe sets, and other information 284 about the clip such as its size in blocks and bytes, ownership, and locking information. The clip directory 281, for example, is organized as a conventional hash table of pointers to associated lists of respective pointers to the information about clips.

The stripe set list associated with each clip, for example, includes a doubly-linked list of entries, and each entry includes a starting stripe set number, an ending stripe set number, and a value indicating the number of data blocks included in the terminal stripe set. Therefore, each entry in the list represents in sequence data blocks beginning in the initial stripe set, continuing in any intermediate stripe set, and ending in the terminal stripe set, and including in the terminal stripe set only the indicated number of data blocks. The stripe set list for each clip can therefore easily be edited by linking and unlinking entries.

When editing of the clip results in a number of stripe sets that are partially empty, compaction can be performed as a background operation by copying data to newly allocated stripe sets, unlinking the entries pointing to the old stripe sets, linking to new entries pointing to the newly allocated stripe sets, and deallocating the old stripe sets.

Figure 26:
FIG. 26 is a diagram showing a free stripe set list.

Stripe sets are allocated by removing them from a free stripe set list, and de-allocated by returning them to the free stripe set list. As shown in FIG. 26, for example, each entry in the stripe set free list 291 includes a starting stripe set number and an ending stripe set number, to indicate a range of unallocated stripe sets.

It is desirable for a video file server to transmit respective isochronous data streams concurrently to multiple clients. Also, it is desirable for the video file server to transmit to each client an uninterrupted, isochronous data stream including a series of clips, and to permit each client to schedule, without interruption, clips to be added to the isochronous data stream. For example, in a video on-demand system, the customer could schedule a next movie to view before a present movie is finished.

Figure 27:
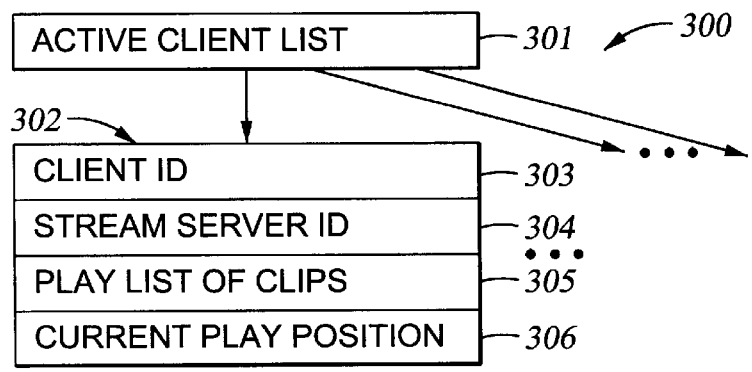
FIG. 27 is a block diagram of a client directory and information associated with each active client including a play list of clips.

As shown in FIG. 27, the video file server maintains an active client list 301 in order to manage the servicing of client requests. The active client list 301 is essentially a directory to blocks of information about maintaining respective isochronous data streams to the active clients. Such a block of information 302 includes a client identifier 303 identifying the client to which the block of information is relevant, a stream server identifier 304 identifying a stream server assigned to service the client, a play list 305 of clips that are transmitted in sequence to the client, and a current play position 306 in the play list and in the clip currently being played. The play list 305, for example, is a doubly-linked list including, at the head of the list, the clip identifier of the clip currently being transmitted to the client. The video file server responds to a client request for scheduling additional clips by inserting corresponding clip identifiers to the tail of the play list. The video file server responds to a client request to edit its schedule of clips by linking or unlinking corresponding clip identifiers to or from the client's play list.

Figure 28:
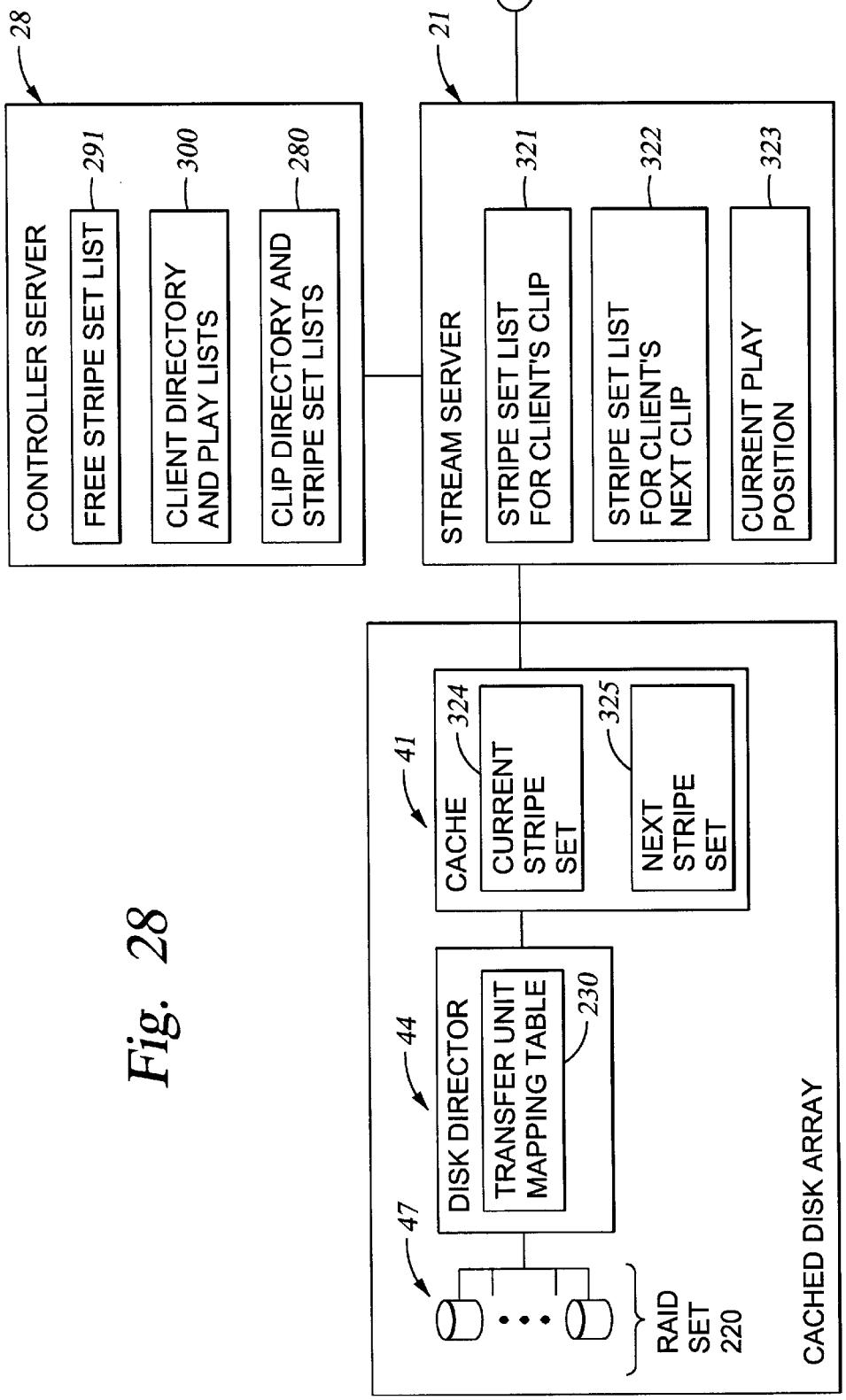
FIG. 28 is a diagram showing locations of the data structures of FIG. 21 in the video file server of FIG. 2.

FIG. 28 shows a preferred placement of the data structures of FIGS. 22 and 25 to 27 in a video file server having the architecture of FIG. 2. As shown in FIG. 28, the free stripe set list 291, the client directory and play lists 300, and the clip directory and stripe set lists 280, are stored in the controller server 28. When a stream server 21 is assigned to service a client 54, the controller server 28 transmits to the stream server a copy of the stripe set list 321 for the client's current clip, and the stripe set list for the client's next clip.

The stream server 21 maintains a pointer 323 to the current play position in the client's current clip 321, and streams continuous media data to the client 54 from the current stripe set 324 in cache 41 of the cached disk array 23. The stream server 21 issues a prefetch command to the cached disk array so that the next stripe set 325 is prefetched from the RAID set 220 and stored in the cache 41. The transfer unit mapping table 230 for the RAID set is stored in each disk director 44 that may access the RAID set. Although not shown in FIG. 28, at least two disk directors may access each RAID set over a respective redundant link from each of the disk directors to the RAID set to provide access in case one disk director should become inoperative.

VIII. Client-Server Protocol and Interface for Open Network Connectivity and Broadcast Automation A. CMFAP VCR-Like Functionality and Management Commands As described above, the continuous media file access protocols (CMFAP; see 75 in FIG. 6) provide a VCR-like functionality that includes commands to Play, Record, Pause, Restart, and Rewind. CMFAP also supports a set of management commands for opening and closing streams, listing all active streams, and redirecting an active playback stream to an alternative display destination. In general, the CMFAP protocols are open network connectivity (ONC) remote procedure calls (RPC) based, and operate over a network link using the user datagram protocol (UDP/IP).

The VCR-like functionality of CMFAP includes record commands and play commands. The states of the video file server responsive to the record commands are distinct from the states of the video file server responsive to the play commands.

Figure 29:
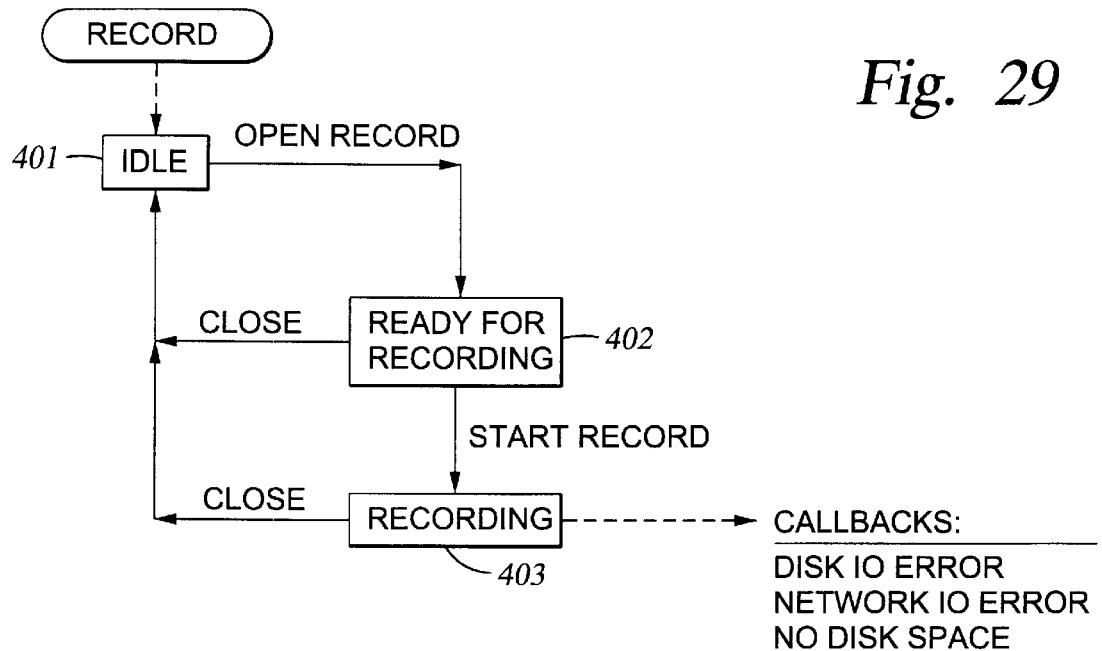
FIG. 29 is a state diagram of controller server states when processing recording commands from a client.

Turning now to FIG. 29, there is shown a state diagram of controller server states when processing recording commands from a client. At each state, there is a set of valid client requests. If the continuous media file server receives a request that is not valid for the present state, then the video file server will send the client an error message indicating that the client's continuous media stream is in the wrong state.

Initially, the video file server is in an idle state 401 for the client. In the idle state 401, an "open record" command is one of many valid client requests. In response to an "open record" command, the video file server will attempt to allocate resources within the server to enable recording of a specified clip. If this attempt is successful, a stream server and a network channel for the client's stream will be assigned. To identify the stream, the video file server assigns a unique "handle" to the stream, and returns the handle to the client. Then the continuous media file server enters a "ready for recording" state 402 for the stream. In this state, the stream will be "paused" waiting to start the recording operation.

In the "ready for recording" state 402 for a stream, a "start record" command for the stream is a valid client request. The "start record" command must include a "handle" to identify the stream for which recording is to begin. In response to the "start record" command, the video file server begins recording continuous media data received by the assigned stream server from the client over the network channel assigned to the stream, and the video file server enters the "recording" state 403 for the stream.

In both the "ready for recording" state and the "recording" state for a stream, a "close" command specifying the steam is a valid client request. The close command terminates any recording process for the stream, and releases all resources of the video file server associated with the stream. When a recording process for the stream is terminated, the video file server updates the clip directory to indicate that the clip is available for playback. The stream handle, however, is no longer available for stream operations.

In the recording state for a client's stream, the video file server sends a callback to the client whenever the recording operation is disrupted, and the callback indicates the nature of the disruption. For example, the callback may indicate that recording has been disrupted by a disk input/output error, a network input/output error, or a lack of sufficient disk storage to continue recording.

Following are specific examples of the recording commands. A format for the "open record" command is:

```
VCMPPopenres_t*vcmp_openrecord_1 (recordargs_t*args, CLIENT*)
    where:
        struct recordargs_t {
            ticket_t        ticket;
            ulong_t         cbprog;
            ulong_t         cbvers;
            record_t        recordtype;
            blocksize_t     blocksize;
            endpoint_t      source;
            name_t          clip;
            attstring_t     attributes;
            encoding_t      encoding;
            bandwidth_t     bandwidth;
            blockcount_t    blocks;
        };
``` ticket—access control code cbprog, cbvers—RPC program and version to be used for callback recordtype—type of recording process (e.g., DIRECT)

blocksize—block size for RELIABLEMULTICAST recording source—source network address and protocol information clip—name to be given to the clip attributes—attribute string to be associated with the clip encoding—encoding format used bandwidth—bandwidth needed for real-time display blocks—expected file size in units of 512 byte blocks Returns:

```
struct VCMPopenres_t {
    VCMPstatus_t    status;
    sHandle_t       handle;
    endpoint_t      destination;
};
``` status—status code; e.g., successful, wrong state, insufficient bandwidth, communication failure, clip missing, clip empty, bad endpoint, invalid session handle, invalid clip handle, unsupported operation, insufficient resources, bandwidth of clip for playing inconsistent with bandwidth of clip as created, disk I/O error, network I/O error, generic failure, clip in use, attempt to edit too late for continuous playback.

handle—streamhandle if successful destination—destination endpoint allocated if successful A format for the "start_record" is:

VCMPstatus_t vcmp_startrecord_1(sHandle_t*handle, CLIENT*)

where:

handle—pointer to a stream handle (returned the "open_record" command).

A format for the "close" command is:

VCMPstatus_t*vcmp_close_1(sHandle_t*handle, CLIENT*)

where:

handle—pointer to a streamhandle (returned by the "open_record" command).

The commands associated with recording are examples of content management commands recognized by CMFAP. Other content management commands include commands for deleting, copying in, and copying out clips.

A delete command is provided to enable an authorized client to delete all copies of a specified clip from the video file server. The video file server does this by releasing storage associated with the clip and removing references to the clip from the clip directory (280 in FIG. 28).

A command is provided for copying data from a remote storage system to the video file server. A successful status code is returned if the transfer can be initiated. The transfer operates at the desired network bandwidth until either it completes or an error is detected. In either case, a callback is issued to the client to indicate the final status of the transfer. A similar command is provided for copying data from the video file server to a remote storage system.

A format for a delete command is:

```
VCMP_status_t*vcmp_delete_1 (deleteargs_t*args, CLIENT*)
    where:
        struct deleteargs_t {
            ticket_t    ticket;
            string_t    clip;
        };
``` ticket—access control code clip—full pathname of the clip to delete

A format for a command for copying continuous media data into the continuous media file server is:

```
VCMPcopyres_t*vcmp copying_1 (copyinargs_t*args, CLIENT*)
where:
    struct copyinargs_t {
        ticket_t        ticket;
        ulong_t         cbprog;
        ulong_t         cbvers;
        string_t        clip;
        attrstring_t    attributes;
        encoding_t      encoding;
        bandwidth_t     bandwidth;
        copyparams_t    params;
    };
    union copyparams_t switch (proto_t protocol) {
        case    OUTOFBAND:
                    void;
        case    FTP:
                    remotefile_t    remote;
        case    TFTP:
                    remotefile_t    remote;
        case    TAPE:
                    tapefile_t      tape;
    };
    struct remotefile_t {
        string_t        remotehost;
        string_t        username;
        string_t        password;
        string_t        remotefile;
        blockcount_t    maxfilesize;
        bandwidth_t     bandwidth;
    };
    struct tapefile_t {
        string_t        drivename;
        ulong_t         slot;
        string_t        filename;
        blockcount_t    maxfilesize;
    };
``` ticket—access control code cbprog, cbvers—RPC program and version to be used for callback clip—full pathname of the clip attributes—attribute string to be associated with the clip encoding—encoding format used bandwidth—bandwidth needed for real-time display params—copy parameters:

protocol—transfer protocol to use remote—remote file information:

remotehost—hostname or IP address of remote system username—username on remote system for FTP login password—password on remote system for FTP login remotefile—remote file name maxfilesize—amount of disk space required for file in units of 512 byte blocks Returns:

```
struct VCMPcopyres_t {
    VCMPstatus_t    status;
    tHandle_t       handle;
};
``` status—status code handle—transfer handle if successful

A format of a command for copying data out of the video file server is:

```
VCMPcopyres_t*vcmp_copyout_1 (copyoutargs_t*args, CLIENT*)
    where:
        struct copyoutargs_t {
                ticket_t        ticket;
                ulong_t         cbprog;
                ulong_t         cbvers;
                string_t        clip;
                copyparams_t    params;
        };
``` ticket—reserved for future use cbprog, cbvers—RPC program and version to be used for callback clip—copy parameters (see the VCMP copyin_1 command above)

params—copy parameters (see the VCMP copyin_1 command above)

Figure 30:
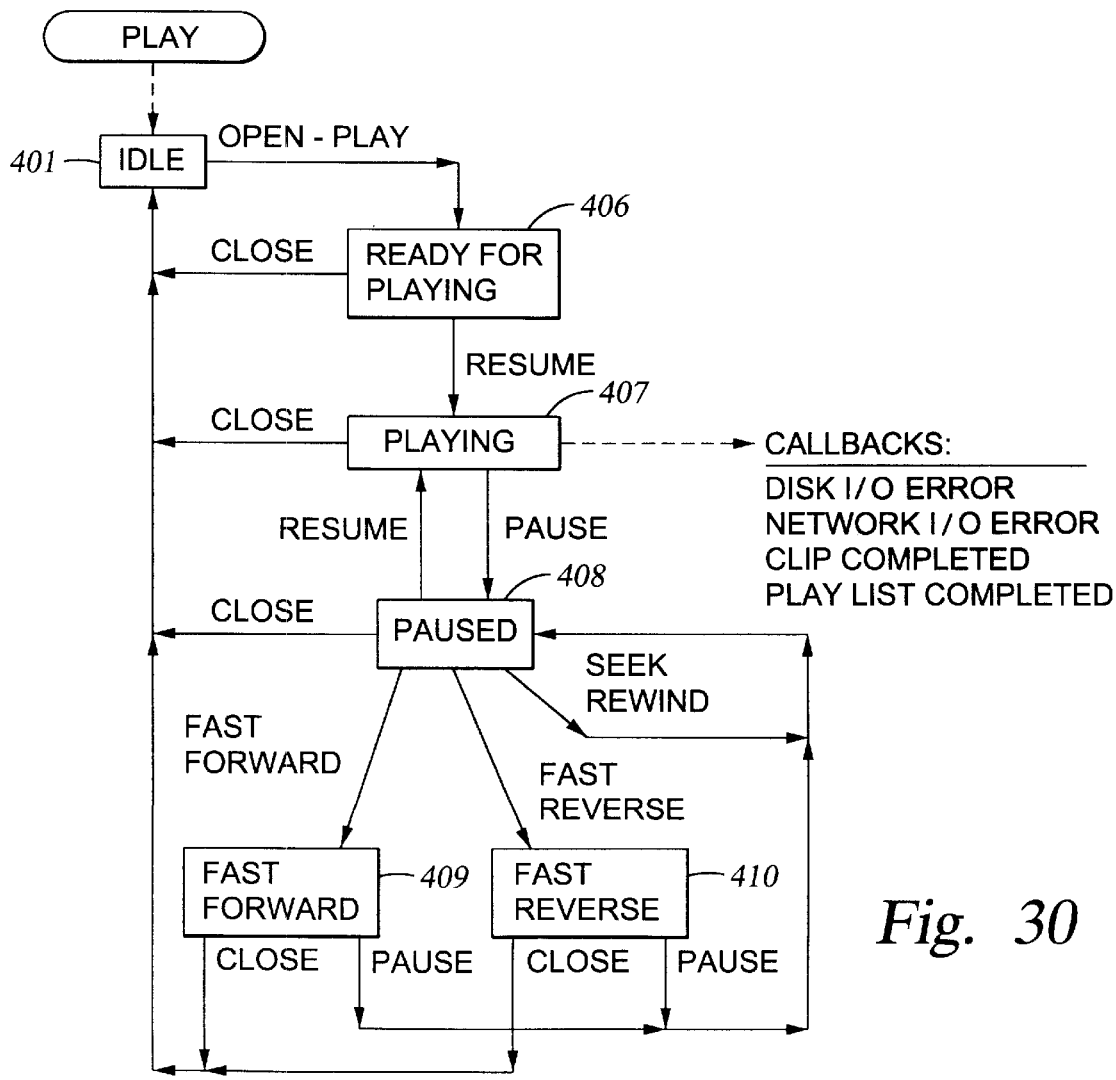
FIG. 30 is a state diagram of controller server states when processing play commands from a client.

Turning now to FIG. 30, there is shown a state diagram of controller server states when processing play commands from a client. At each state, there is a set of valid client requests. If the video file server receives a request that is not valid for the present state, the video file server will send the client an error message indicating that the client's continuous media stream is in the wrong state.

Initially, the video file server is in the idle state 401 for the client. In the idle state 401, an "open play" command is a valid client requests. In response to an "open play" command, the video file server will attempt to allocate resources within the server to enable playing of a specified list of clips. If this attempt is successful, a stream server and a network channel will be assigned to stream continuous media data to the client. To identify the stream, the video file server assigns a unique "handle" to the stream, and returns the handle to the client. Then the continuous media file server enters a "ready for playing" state 406 for the stream. In this state, the stream will be "paused" waiting to start the playing operation at the beginning of the first clip in the specified list of clips to play over the stream.

In the "ready for playing" state 406 of a stream, a "resume" command for the stream is a valid client request. The "resume" command includes a "handle" to identify the stream for which playing is to begin. In response to the "resume" command, the video server begins transmitting continuous media data from the assigned stream server to the client over the network channel assigned to the stream, and enters the "playing" state 407 for the stream.

In the playing state 407 for a client's stream, the video file server sends a callback to the client whenever the playing operation is disrupted, and the callback indicates the nature of the disruption. For example, the callback may indicate that playing has been disrupted by a disk input/output error, or a network input/output error. In the playing state 407 for a client's stream, the video file server also sends a callback to the client when playing of the play list has been completed.

In the "playing" state for a stream, the continuous media file server will accept a "pause" command for the stream from the client if the "open play" command for the stream had set a service flag indicating that stream controls will be accepted. The client may have set either a "pause only" flag or a "VCR controls" flag so that the continuous media file server will accept the "pause" command.

When the "pause" command is accepted, the continuous media file server pauses transmission of the specified stream, returns to the client an indication of the current position within the stream, and enters the "paused" state 408. The position, for example, is accurate to within 512 bytes (i.e., the block size of the cached disk array 23 in FIG. 2) of the actual position with the current clip being played.

In the "paused" state 408 for a stream, the video file server may accept a "resume" command to resume playing of the stream.

In the "paused" state 408 for a stream, if a "VCR controls" flag is set and a "pause only" flag is not set, then the video file server may accept a "fast forward" command, a "fast reverse" command, a "seek" command, or a "rewind" command.

The "fast forward" command causes the playing of the stream to be resumed in a forward direction at a fast rate, placing the stream in a "fast forward" state 409. A "pause" command for the stream causes the stream to return from the "fast forward" state 409 to the "paused" state 408.

The "fast reverse" command causes the playing of the stream to be resumed in a reverse direction at a fast rate, placing the stream in a "fast reverse" state 410. A "pause" command for the stream causes the stream to return from the "fast reverse" state 410 to the "paused" state 408.

The "rewind" command repositions the current play position of the stream to the start of the first clip of the play list.

The "seek" command positions the current play position of the stream to a position specified by seek arguments of the command. The seek arguments, for example, may specify relative or absolute position in time or in 512 byte blocks in the stream or in the portion of the stream from a specified clip included in the play list for the stream.

In the "ready for playing" state 406, the "playing" state 407, and the "paused" state 408, a "close" command specifying the steam is a valid client request. The close command terminates any playing process for the stream, and releases all resources of the video file server associated with the stream. The stream handle is no longer available for stream operations.

Figure 31:
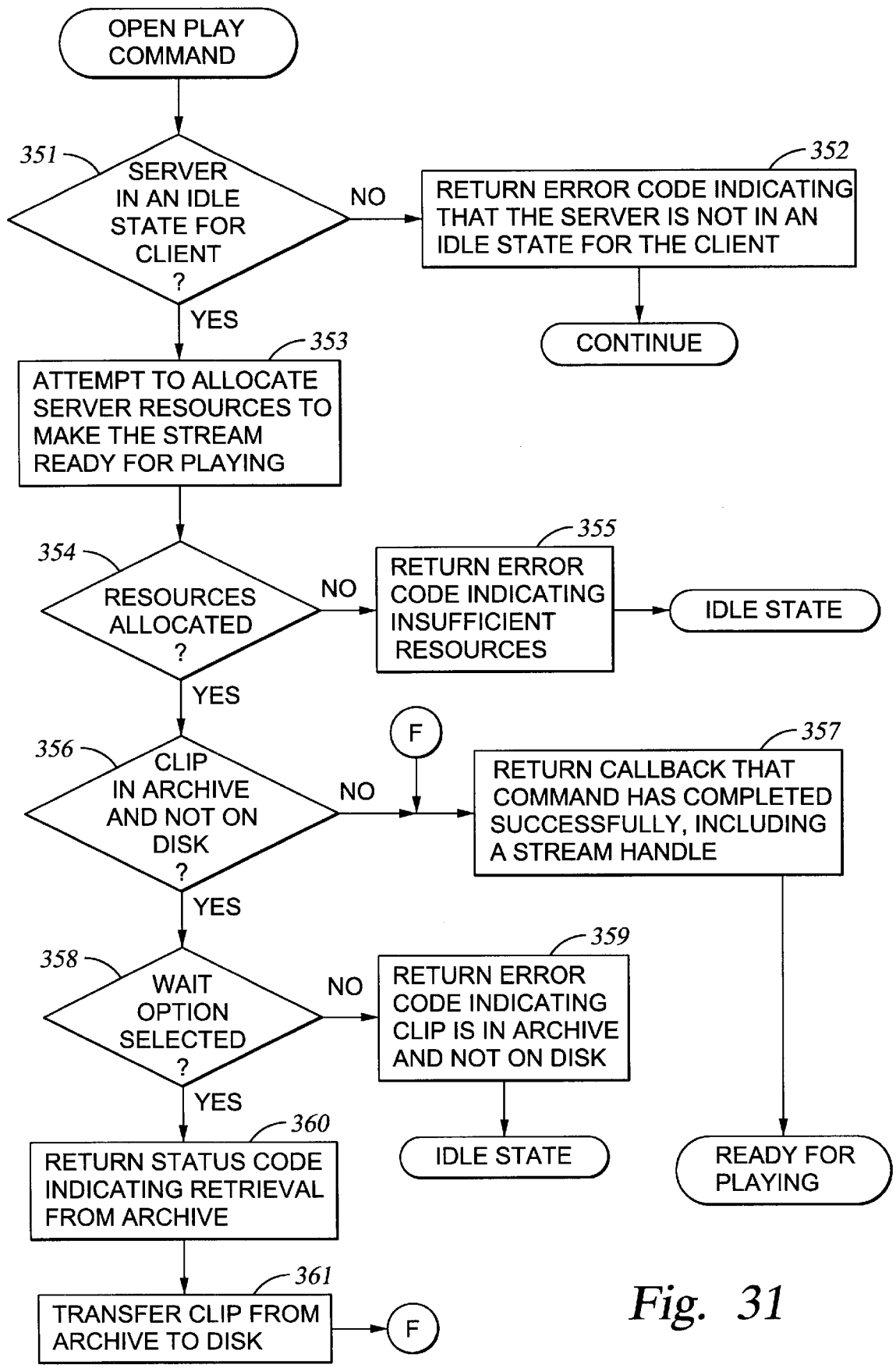
FIG. 31 is a flow chart of a program executed by an active controller server in response to an "open play" command from a client.

Turning now to FIG. 31, there is shown a flow chart of a program executed by the active controller server in response to an "open play" command from a client. In the first step 351, the active controller server checks whether the server is in an idle state for the client; i.e., whether the active controller is in a proper state for processing an "open play" command. If not, then in step 352 the active controller server returns to the client an error code indicating that the server is not in an idle state for the client, and the controller server continues in its pre-existing state for the client and is finished responding to the "open play" command. Otherwise, in step 353, the active controller server attempts to allocate server resources to make the stream ready for playing. Then, in step 354, execution branches to step 355 if the active controller server is unsuccessful in allocating sufficient resources. In step 355, the active controller server returns to the client an error code indicating that the video file server has insufficient resources to open a stream for playing, and the active controller server continues in its idle state for the client and is finished responding to the "open play" command.

It is possible that resources are available in the video file server for assigning a stream server and a stream in response to the "open play" command, but one or more of the specified clips are in archive (e.g., in the tape silo 24 in FIG. 2) and absent from the cached disk array storage (23 in FIG. 2). The active server controller checks for this possibility in step 356. If a clip is on disk, execution branches to step 357. In step 357, the active controller server returns to the client a callback indicating that the "open play" command has completed successfully, and including a stream handle identifying a stream assigned to the client, and the active controller server advances to the "ready for playing" state for the client's assigned stream and is finished responding to the "open play" command. Otherwise, if a clip is in archive and not on disk, execution continues from step 356 to step 358.

In step 358, the active controller server checks whether the client has selected an option of either waiting or not waiting for a clip to be transferred from archive to disk. The option is selected by the client setting or not setting a flag that is a parameter of the "open play" command.

If the client has selected the option of not waiting, execution branches from step 358 to step 359 where the active controller server returns to the client an error code indicating that a clip is not in the cached disk array storage but is in archive storage, and the active controller server continues in its idle state for the client and is finished responding to the "open play" command.

If the client has selected the option of waiting, then in step 360 the active controller server returns to the client a status code indicating that a clip is being recovered from the archive. In step 362 the clip is transferred from the archive to the cached disk array storage, and execution continues to step 357 to return to the client a callback indicating that the "open play" command has completed.

Figure 32:
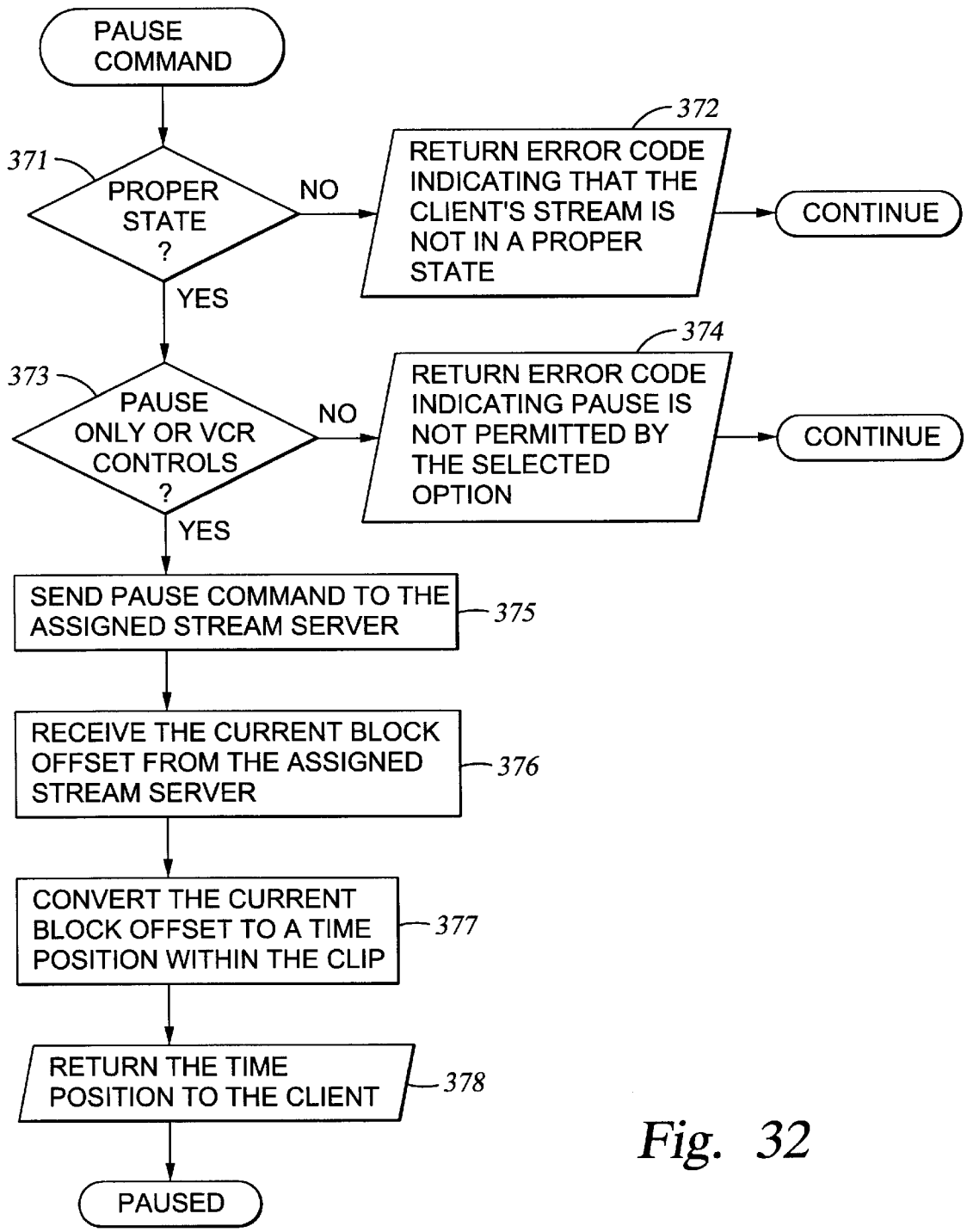
FIG. 32 is a flow chart of a program executed by an active controller server in response to a "pause" command from a client.

Turning now to FIG. 32, there is shown a flow chart of a program executed by the active controller server in response to a "pause" command from a client. In a first step 371, the active controller server checks whether it is in a proper state (i.e., playing, fast forward, or fast reverse) for the client's stream for processing a "pause" command. If not, execution branches to step 372, where the active controller server returns to the client an error code indicating that the client's stream is not in a proper state, and the active controller continues in its pre-existing state and it is finished responding to the "pause" command.

If in step 371 the client's stream is in a proper state for processing a "pause" command, then execution continues from step 371 to step 373. In step 373, the active controller server tests whether the "open play" command for the stream had set either a "pause only" flag or a "VCR controls" flag. If not, execution branches to step 374 in which the active controller server returns to the client an error code indicating that a "pause" command is not permitted by the selected option, and the active controller server continues in its pre-existing state and is finished responding to the "pause" command. Otherwise, execution continues to step 375 to begin processing of the "pause" command.

In step 375, active controller server sends the pause command to the stream server assigned to the stream, and in step 376, the stream server assigned to the stream returns to the active controller server a current block offset in the current clip. Then, in step 377, the active controller server converts the block offset to a time position within the clip, and in step 378 the time position is returned to the client. In this fashion, the time position returned to the client is independent of the encoding or data rate of the stream. After step 378, the controller server enters the paused state, and processing of the "pause" command is finished.

Figure 33:
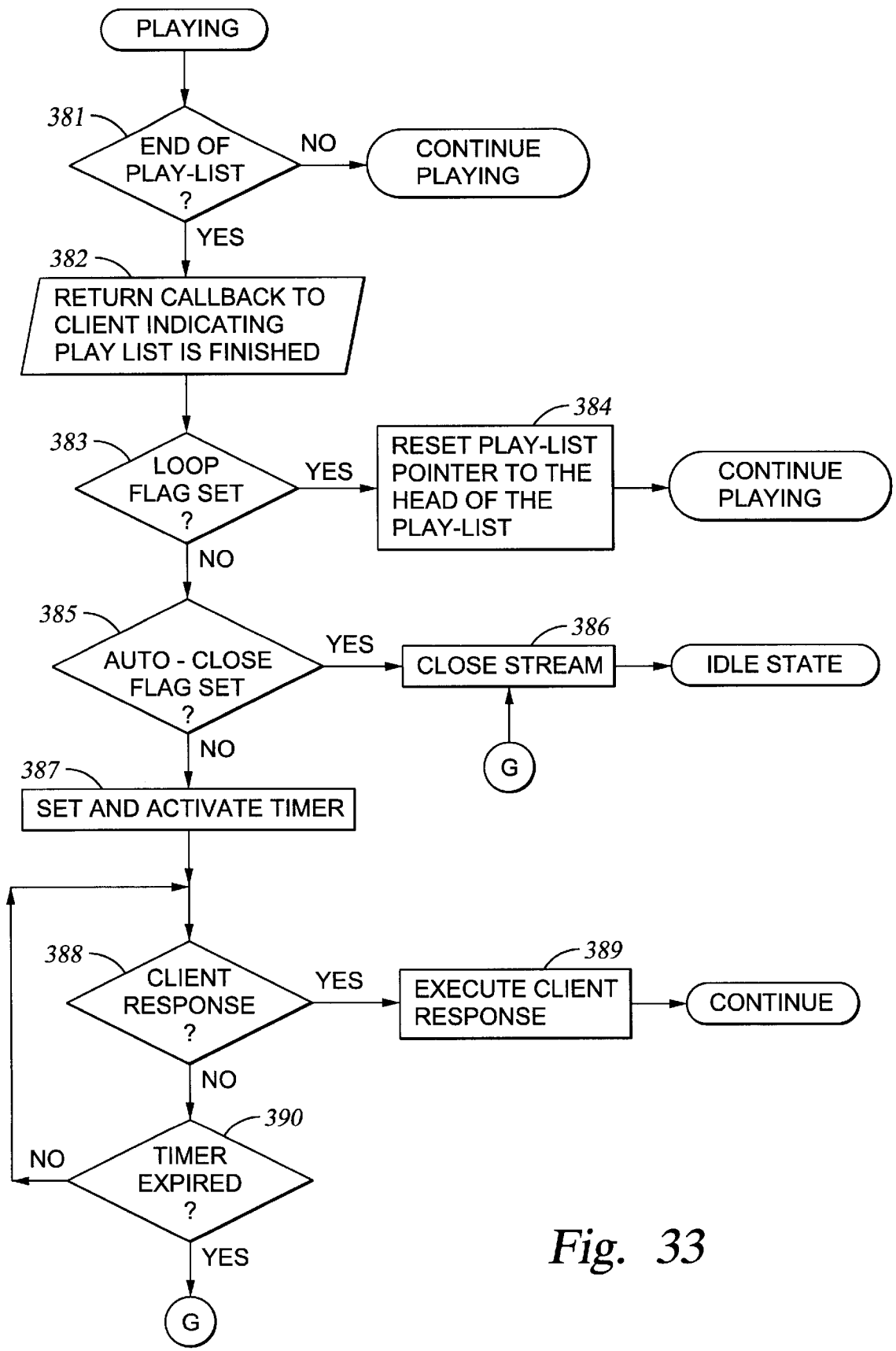
FIG. 33 is a flow chart of a program executed by an active controller server when reaching the end of a play-list during the playing of continuous media data for a client.

Turning now to FIG. 33, there is shown a flow chart of a program executed by the active controller server when reaching the end of a play-list during the playing of continuous media data for a client. When the end of the play-list occurs, as tested in step 381, execution continues to step 382. In step 382, the active controller server returns a callback to the client indicating that the play-list is finished. Next, in step 383, the active controller checks whether a "loop" flag has been set for the stream. In the "open play" command, the client has the option of setting the "loop" flag for selecting whether or not the play list should restart from the beginning when playing of the play list has been completed. If the loop flag has been set, then execution branches from step 383 to step 384 where the play-list pointer is reset to point to the head of the play-list (i.e., a "rewind" operation), and the playing of continuous media data from the play-list continues.

If the loop flag has not been set, execution continues from step 383 to step 385. In step 385, the active controller server checks whether an "auto-close" flag for the stream has been set. In the "open play" command, the client has the option of setting the "auto-close" flag. If the "auto close" flag has been set, then in step 386 the active controller closes the stream so that the active controller returns to the idle state for the client.

If the "auto close" flag has not been set, then in step 387 the active controller server sets and activates a thirty-second timer. If the client does not respond to the callback of step 382 before the timer expires, then the video file server automatically performs a close operation, which will terminate the stream and release all resources associated with the stream. In particular, in step 388 the active controller server checks for a client response. If a client response is received, then in step 389 the client response is executed, and processing for the stream continues in a state appropriate for the client response. If a client response is not found in step 388, then in step 390 the active controller server checks whether the timer has expired. If not, then execution loops back to step 388. If the timer expires before the detection of a client response, then execution continues from step 390 to step 386 to automatically perform a "close" operation.

An automatic "close" operation may also occur as a result of a "keepalive" timer feature. In the "open play" command, the client has the option of setting a "keepalive" flag, and specifying a "keepalive" timer value. If the "keepalive" flag is set, then the video file server periodically advances a keepalive timer for the stream, and resets the timer upon receipt of a "keepalive" message from the client. If the video file server fails to receive from the client a "keepalive" message within the time interval specified by the "keepalive" timer value, then the "keepalive" timer will reach the "keepalive" timer value, causing the video file server to automatically perform the "close" operation. This "keepalive" timer feature will save network and server resources when the client suffers a failure preventing it from sending the "keepalive" messages.

Preferably, the video file server also performs an automatic close operation if a stream remains in the "ready for playing" state for more than a certain amount of time, such as five minutes.

Following are specific examples of the playing commands. A format for the "open play" command is:

```
VRPopenres_t*vrp_openplay_1 (playargs_t*, CLIENT*)
    where
        structplayargs_t {
            ticket_t       ticket;
            ulong_t        cbprog;
            ulong_t        cbvers;
            endpoint_t     destination;
            cliplist_t     *clips;
            service_t      service;
            failover_t     failover;
            bool           loop;
        };
``` ticket—access control code cbprog, cbvers—RPC program and version to be used for callback destination—destination network address and protocol information clips—list of clips to play
service—type of service requested:

```
struct service_t {
    flags_t      flags;
    priority_t   priority;
    ulong_t      keepalive;
};
``` where
flags—requested stream features:
  const FLAG_PAUSEONLY=0x01;
  const FLAG_VCRCONTROLS=0x02;
  const FLAG_AUTOCLOSE=0x04
  const FLAG_KEEPALIVE=0x08;
  const FLAG_NOARCHIVEWAIT=0x10;
priority—stream priority
keepalive—keepalive timer interval (in seconds)
failover—failover capability requested (further described below)
loop—TRUE/FALSE if clips should loop forever
Returns:

```
struct VRPopenres_t {
    VRPstatus_t  status;
    sHandle_t    handle;
    endpoint_t   source;
};
``` status—status code
handle—streamhandle if successful
source—source endpoint allocated if successful
A format for the "resume" command is:
VRPstatus_t*vrp_resume_1(sHandle_t*handle, CLIENT*)
where:
  handle—pointer to a stream handle returned by vrp_openplay_1( )
A format for the "pause" command is:
position_t*vrp_pause_1(sHandle_t*handle,CLIENT*)
where:
  handle—pointer to a streamhandle returned by vrp_openplay_1( )
A format for the "fast forward" command is:
VRPstatus_t*vrp fastfwd_1(sHandle_t*handle, CLIENT*)
where:
  handle—pointer to a stream handle returned by vrp_openplay_1( )
A format for the "fast reverse" command is as follows:
VRPstatus_t*vrp_fastrev_1(sHandle_t*handle, CLIENT*)
where:
  handle—pointer to stream handle returned by vrp_openplay_1( )
A format for the "seek" command is:
VRPstatus_t*vrp_seek_1(seekargs_t*args,CLIENT*)
where:

```
struct seekargs_t {
    sHandle_t     handle;
    how_t         whence;
    positioning_t position;
};
``` handle—handle returned by vrp_openplay_1( )
whence—how to perform the seek; e.g., seek forward from start of media, seek forward from the current position, seek backward from the current position, or seek backward from end of media
position—relative or absolute position
A format for the "rewind" command is:
VRPstatus_t*vrp rewind_1(sHandle_t*handle,CLIENT*)
where:
  handle—pointer to stream handle returned by vrp_openplay_1( )
A format for the "close" command is:
VRPstatus_t*vrp_close_1(sHandle_t*handle,CLIENT*)
where:
  handle—pointer to a stream handle returned by vrp_openplay_1( )
The video file server recognizes a command from the client for listing the status of active streams. A format for such a command is:
info_t*vrp_streaminfo_1(sHandle_t*handle,CLIENT*)
where:
  handle—pointer to stream handle returned by vrp_openplay_1( )
Returns:

```
struct info_t {
    VRPstatus_t   status;
    service_t     service;
    failover_t    failover;
    bool          canSeekByTime;
    state_t       state;
    positioning_t position;
}
``` status—status code
service—service video file server is supplying
failover—failover video file server is providing
canSeekByTime—media can seek using a time offset
canSeekByFrame—media can seek using a frame number
state—current state of the stream
position—current position within the stream
The video file server recognizes a command from the client for browsing through the clip directory (280 in FIG. 28). A format for such a command is:
cliresult_t*vrp_listclips_1(clipargs_t*,CLIENT*)
where:

```
struct clipargs_t {
    ticket_t  ticket;
    string_t  directory;
    cookie_t  cookie;
};
``` ticket—reserved for future use
directly—name of directory being listed
cookie—an unsigned 32-bit value initially set to zero
Returns:

```
structclipresult_t {
    VRPstatus_t status;
    bool        endoflist;
    cookie_t    cookie;
    clipinfo_t  *info;
```

```
};
struct clipinfo_t {
    bool            isdirectory;
    bool            isarchived;
    name_t          name;
    attrstring_t    attributes;
    encoding_t      encoding;
    bandwidth_t     bandwidth;
    blockcount_t    blocks;
    clipinfo_t      *next;
};
``` status—status code endoflist—TRUE if no more information is available cookie—cookie for use in next call of vrp_cliplist_1( )

info—pointer to a list of clip entries:
    isdirectory—TRUE if this entry names a directory
    isarchived—TRUE if this clip has been archived
    name—name of the clip or directory
    attributes—attribute string that was associated with the clip
    encoding—encoding format of the clip
    bandwidth—bandwidth required to play the clip in real-time
    blocks—size of the clip in units of 512 byte blocks
    next—pointer to next clipinfo_t, NULL if no more Upon receipt of this command, the video file server returns information about clips and/or directories at the current position within the name space which are playable. Since there may be more entries than will fit within a single RPC response message, the information is returned over a sequence of calls. The cookie value is initialized to zero for the first call which returns some number of entries together with a new cookie value which should be sent in the next call. This sequence continues until a request returns with the "endoflist" field TRUE indicating that this request completes the information return.

B. CMFAP Commands for Broadcast Automation

Although the VCR-like functionality of CMFAP described above is sufficient for streaming data from continuous media files, it is cumbersome to use the VCR functions in a broadcast environment where a stream needs to run continuously with old clips being deleted from the stream as their playback completes and new clips being appended to the stream as their play time approaches. There must be down-time while an existing play-list is being closed and a new one created.

To solve these problems, CMFAP has been extended to process a set of commands from the client for providing broadcast playback functionality. In particular, the extended protocol and interface easily provides continuous play over multiple clips for extended periods of time, allows a play-list to be edited after being given to the video server and during playback of clips in the play-list, allows some notion of "current time" to be used during the streaming of continuous media data, and supports features of the "Louth Automation" video disk communications protocol. The extended protocol and interface permits an external application to create and manipulate a dynamic play-list; as clips finish playing they are discarded from the play-list and new clips may be appended to or inserted into the play-list at arbitrary points (subject to server imposed constraints).

A specific example of a format for the play-list is:

```
struct VAPPplaylist_t {
    bool_t    isPlaying;       /* true if currently
                                  playing */
    int       playlist_len;    /*length of playlist */
    cHandle_t *playlist_val;   /* array of playlist
                                  handles */};
```

Figure 34:
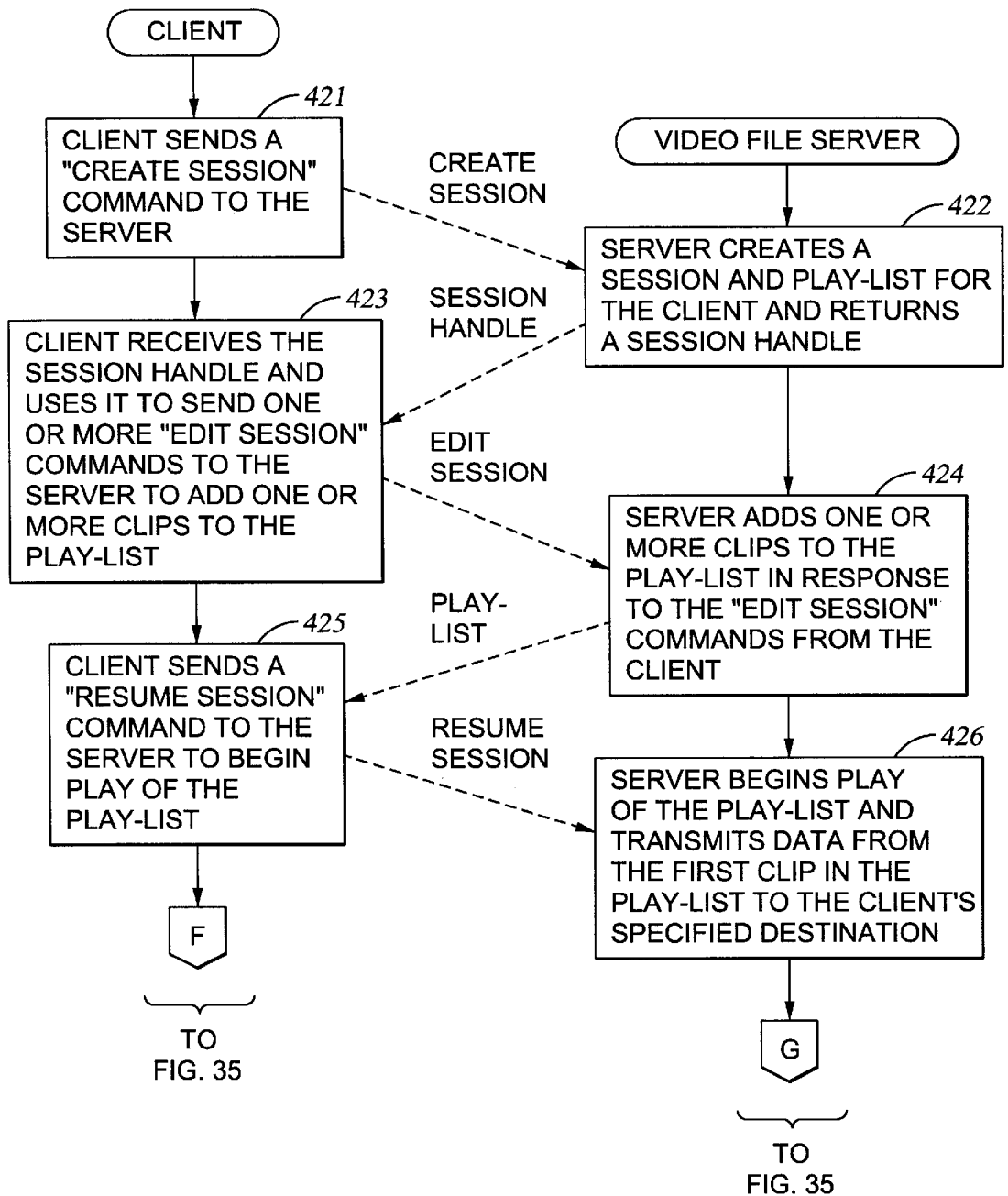
FIG. 34 is a first portion of a flow diagram of a client-server protocol for open network connectivity and broadcast automation.
Figure 35:
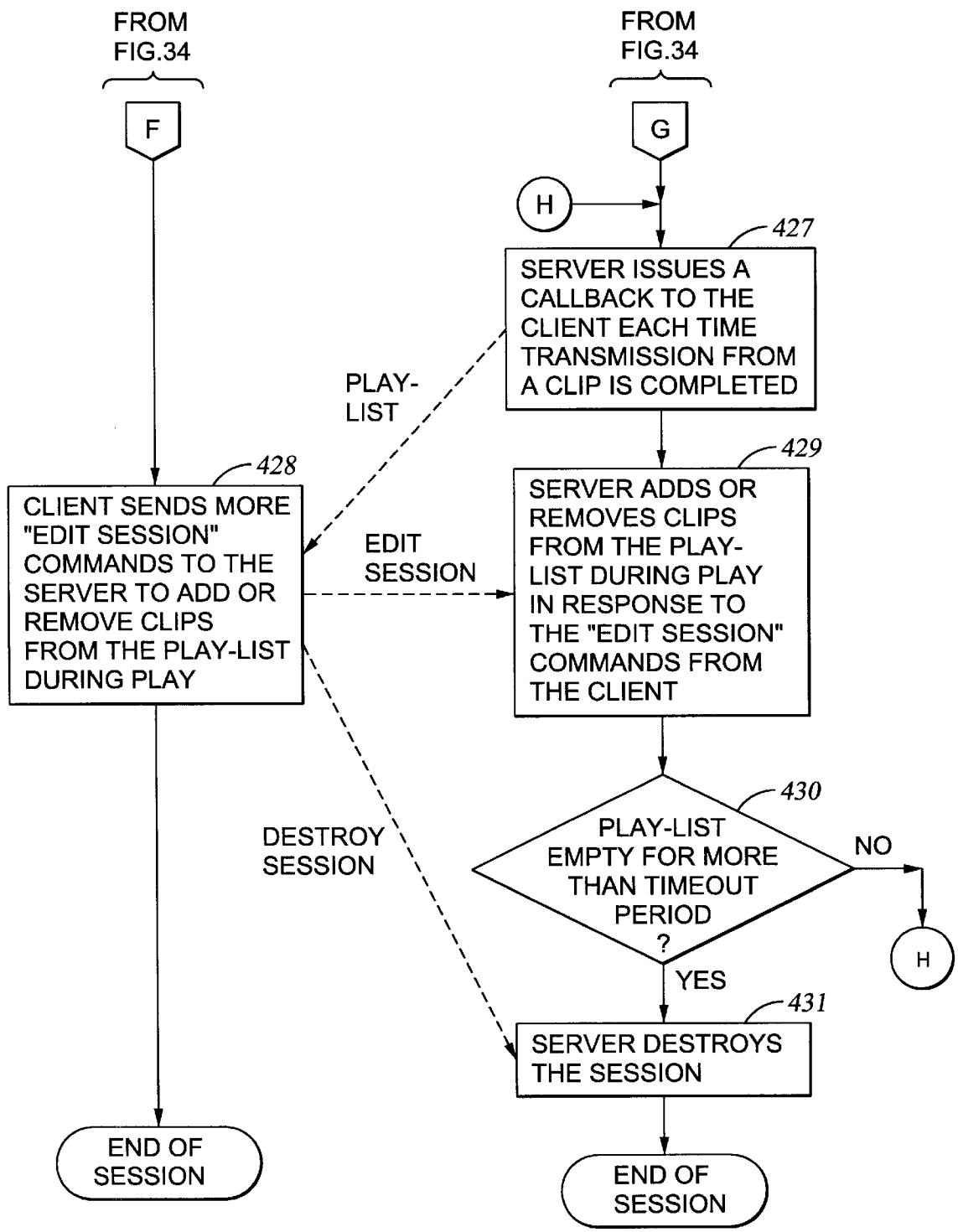
FIG. 35 is a second portion of a flow diagram begun in FIG. 34.

Turning now to FIGS. 34 to 35, there is shown a flow diagram illustrating use of the CMFAP broadcast playback commands in a protocol between a client and the video file server. The client first creates a session with a play-list containing a fixed number of entries; the number should be as small as possible consistent with the functions that the client wishes to perform. The client application does this by first sending a "create session" command to the video file server, as show in step 421 of FIG. 34. In response, in step 422 of FIG. 34, the video file server allocates server resources for a broadcast video session to the client's specified destination. The server initially creates the play-list as empty, and it must be populated with at least one clip before playing of a broadcast session may be started. The server returns a "session handle" to the client, to identify the broadcast video session. A format for such a "create session" command is:

VAPPcreateres_t*vapp_createSession_1(VAPPcreate_t*, CLIENT*)

where:

```
struct VAPPcreate_t {
    ticket_t      ticket;
    ulong_t       cbprog;
    ulong_t       cbvers;
    endpoint_t    destination;
    bandwidth_t   bandwidth;
    VAPPrate_t    rate;
    VAPPmode_t    mode;
    int           count;
};
``` ticket—access control code cbprog/cbvers—RPC program and version to be used for callback destination—destination network address and protocol information bandwidth—network bandwidth to allocate rate—desired video standard; e.g., a default depending on context, 30 frames per second (fps) NTSC, 29.97 fps NTSC, 25 fps PAL or SECAM, or 24 fps film mode—mode of operation; e.g. either continuous across clip transitions, or as each clip completes the session is paused requiring a vapp_resumeSession_1( ) call to transition between clips count—size of the play-list in clips Returns:

```
struct VAPPcreateres_t {
    VAPPstatus_t  status;
    VAPPrate_t    rate;
    dHandle_t     handle;
};
``` status—status reply; e.g., successful, session in wrong state, insufficient bandwidth, internal communications failure, requested clip missing, requested clip empty, bad endpoint, invalid session handle, invalid clip handle, unsupported operation, insufficient internal resources, bandwidth of requested clip is inconsistent with bandwidth requested when the play-list was created, disk I/O error, network I/O error, generic failure, clip already in use for incompatible operation, attempt to edit too late rate—video standard supported by the endpoint handle—broadcast session handle Next, in step 423 of FIG. 34, the client receives the session handle, and uses it to send one or more "edit session" commands to the video file server to add one or more clips to the play-list. Each such edit command may manipulate the state of a single clip within the play-list by adding a new clip or deleting an existing clip within the play-list. A format for such a play-list edit command is:

VAPPeditres_t *vapp_editSession_1(VAPPedit_t*, CLIENT*)

where:

```
struct VAPPedit_t {
    dHandle_t       sessionHandle;
    VAPPeditop_t    op;
    cHandle_)t      clipHandle;
    name_t          name;
    clipposition_t  startpos;
    clipposition_t  endpos;
};
``` sessionHandle—session handle returned by vapp_createSession-1( )

op—edit operation to perform clipHandle—handle of an existing clip or O name—name of a new clip or NULL startpos—starting position of a new clip endpos—ending position of a new clip Returns:

```
struct VAPPeditres_t {
    VAPPstatus_t   status;
    cHandle_t      newHandle;
    VAPPplaylist_t playlist;
};
``` status—operation status; may indicate that an attempt to edit a clip within a play-list was made too late to maintain continuous playback newHandle—handle of newly created clip or O play-list—current play-list VAPPeditop_t is an enumerated type which defines edit operations on a play-list:

VAPPeditDelete—delete a clip from a play-list

VAPPeditAppend—append a new clip to a play-list

VAPPeditInsertBefore—insert a new clip before an existing clip

VAPPeditInsertAfter—insert a new clip after an existing clip

VAPPeditTrim—trim start/end time of a clip

In response to each "edit session" command, in step 424, the video file server adds a clip to the play-list, and returns to the client the new version of the play-list.

To start continuous media transmission for the session from the video file server to the client's specified destination, in step 425, the client sends a "resume session" command to the video file server. A format for such a "resume session" command is:

VAPPstatus_t*vapp_resumeSession_1(VAPPresume_t*, CLIENT*)

where:

```
struct VAPPresume_t {
    dHandle_t    sessionHandle;
    VAPPtime_t   starttime;
};
``` sessionHandle—session handle returned by vappcreateSession_1( )

starttime—time to resume playing

Preferably, the start time can be specified in relative as well as current or absolute time. For example, the parameter VAPPtime_t used to specify the start time in the above example of the "resume session" command is a union describing an instance in time as follows:

```
union VAPPtime_tswitch (VAPPtimecod_t) {
    case  VAPPnow:
              void;
    case  VAPPclock:
              VAPPclocktime_t   clocktime;
    case  VAPPsmpte:
              VAPPsmptetime_t   smptetime;
};
``` where

VAPPnow—as soon as possible

VAPPclock—absolute local time; e.g.,

```
struct VAPPclocktime_t {
    ulong_t   sec;     /*seconds since 1 Jan 1970 */
    ulong_t   usec;    /* microseconds within the
                          second */
};
VAPPsmpte                -SMPTE time code; e.g.,
struct VAPPsmptetime_t {
    ushort_t  day;     /* day */
    ushort_t  hour;    /* hour of the day */
    ushort_t  minute;  /* minute of the hour */
    ushort_t  sec;     /* second of the minute */
    ushort_t  frame;   /* within the second */
    VAPPrate  rate;    /* frame rate (when
                          necessary) */
};
```

In response to the resume session command, in step 426, the server begins play of the clips in the play-list, by transmitting continuous media data from the first clip in the play-list to the client's specified destination. Each time transmission of continuous media data of the clip at the head of the play-list is completed, the clip is removed from the head of the play-list, and transmission of continuous media data from the next clip in the play-list is begun immediately, without any interruption in the stream of continuous media data to the client's specified destination. In addition, a callback is issued to the client with the current, updated, play-list. A specific format for such a callback is:

*vapp_callback_1(VAPPcallback_t *,CLIENT*)

where:

```
struct VAPPcallback_t {
    dHandle_t    sessionHandle;
```

```
            VAPPtime_t      completetime;
            bool_t          isEmpty;
            VAPPplaylist_t  playlist;
    };
``` sessionHandle—session handle returned by vappcreateSession_1( )
completetime—time the clip completed playing
isEmpty—true if play-list is now empty
play-list—the current play-list At any time while the video session is playing, edit commands may be issued to delete or insert new material from or into the play list of the video session. For example, as shown in steps 427 and 428 of FIG. 35, the client may respond to the callback from the server when transmission from a clip is completed by sending one or more "edit session" commands to the server to add additional clips to the play-list. The client may also send "edit session" commands to the video file server during playback of the session to remove clips from the play-list. The video file server responds in step 429 by dynamically revising the play-list during broadcast of the clip at the head of the play-list. Preferably, there is a limit as to how close to broadcast time a clip normally may be deleted or new material inserted, in order to ensure continuity of transmission of the continuous media stream of each clip.

It is the client's responsibility to ensure that the play-list does not become empty. As tested in step 430, if the play-list becomes empty for more than a certain timeout period, such as thirty seconds, then in step 431 the server automatically destroys the session. Steps 430 and 431 can be programmed in a fashion similar to the programming shown in FIG. 33 for playing under VCR controls. The server will also destroy the session in response to a "destroy session" command from the client.

Figure 36:
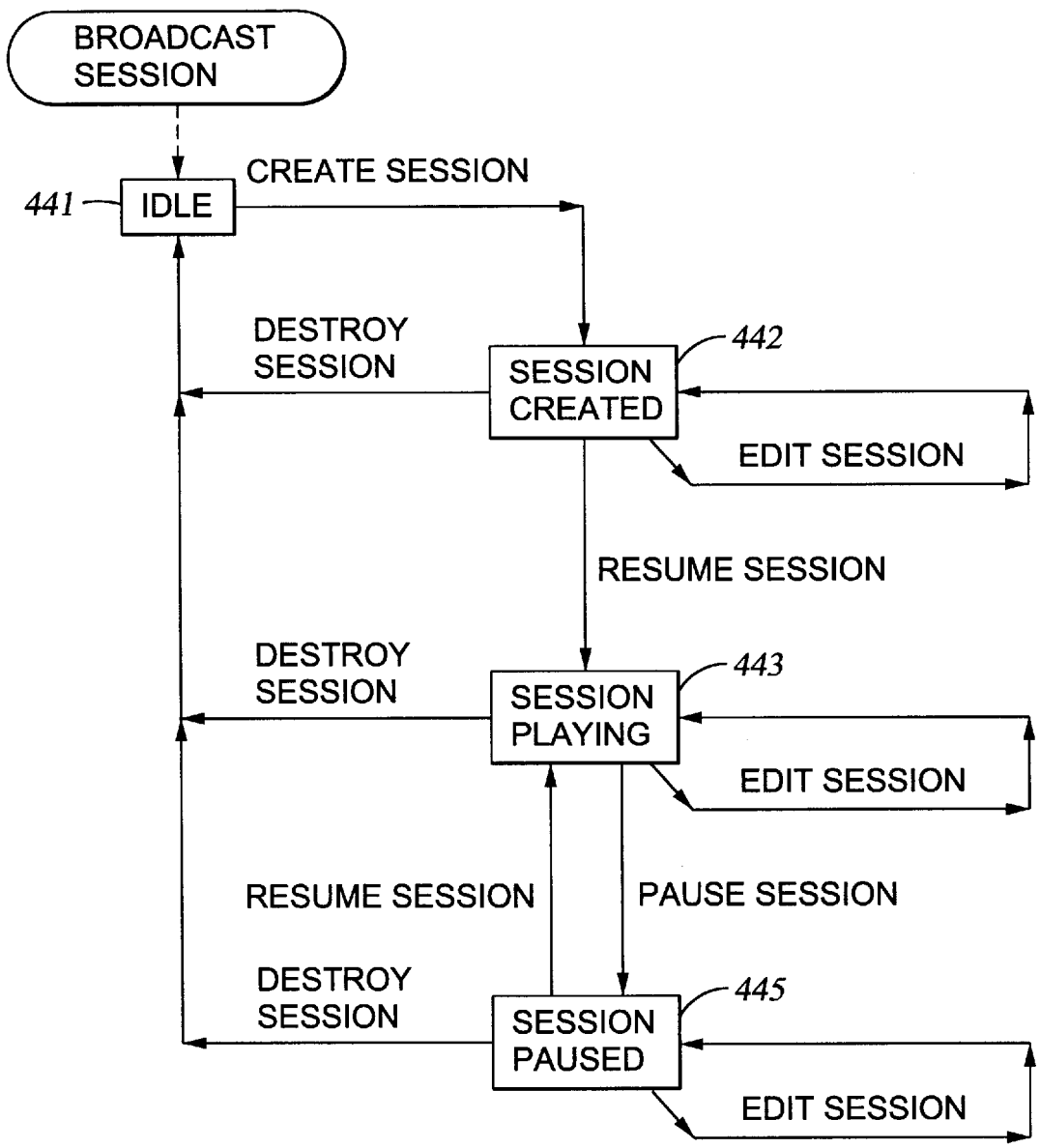
FIG. 36 is a state diagram of controller server states during the client-server protocol introduced in FIGS. 34 and 35.

Turning now to FIG. 36, there is shown a state diagram of state of the active controller server during a broadcast session for a client. Initially, the active controller server is in an idle state 441 for a client. As introduced above, the "create session" command places the active controller server into a "session created" state 442 for a client's session. Once a session has been created, the "resume session" command places the active controller server into a "session playing" state 443 for the client's session. To allow live break-ins or other "emergency" operations, the session may be paused and later resumed. The client may also send "edit session" messages to the video file server to trim subsequent clips to reduce their play times to recover the time lost to the break-in.

The client sends a "pause session" command to the video file server to cause the server to pause the session by placing the active controller server in a "session paused" state 445. A format for such a "pause session" command is:
VAPPstatus_t *vapp_pauseSession_1(VAPPpause_t*, CLIENT*)
where:

```
            struct VAPPause_t {
                    dHandle_t    sessionHandle;
            };
``` sessionHandle—session handle returned by vappcreateSession_1( )
The "pause session" command is programmed in a fashion similar to the flow chart of FIG. 32 for the VCR controls "pause" command in order to return a current time position to the client. The client can send a "resume session" command to the video file server to resume the playing of a paused session.

The client can terminate a session at any time by sending a "destroy session" command to the video file server. In response to a "destroy session" command, the video file server stops any transmission of a session's continuous media data and releases all server resources which were allocated to the session. The "destroy session" command returns the active controller server to the idle state 441 for the client. An example of a format for such a "destroy session" command is:
VAPPstatus_t*vapp_destroysession_1(dHandle_t*handle,CLIENT*)
where:
handle—pointer to a handle returned by vapp_createSession_1( )

As seen in the state diagram of FIG. 36, edit session commands can be issued whenever the session exists; i.e., in the session created state, the session playing state, and the session paused state. Edit commands delete or insert new material from or into the play-list during the session playing state without causing an interruption of the broadcast transmission. To ensure continuity of broadcast transmission during each clip, however, it is desirable to set a limit as to how close to air-time a clip normally may be deleted or new material inserted. If this limit would not be met, the edit command is rejected. To allow live break-ins or other "emergency" operations, however, the session may be paused and later resumed and subsequent clips may be "trimmed" to reduce their play times to recover the time lost to the break-in.

Figure 37:
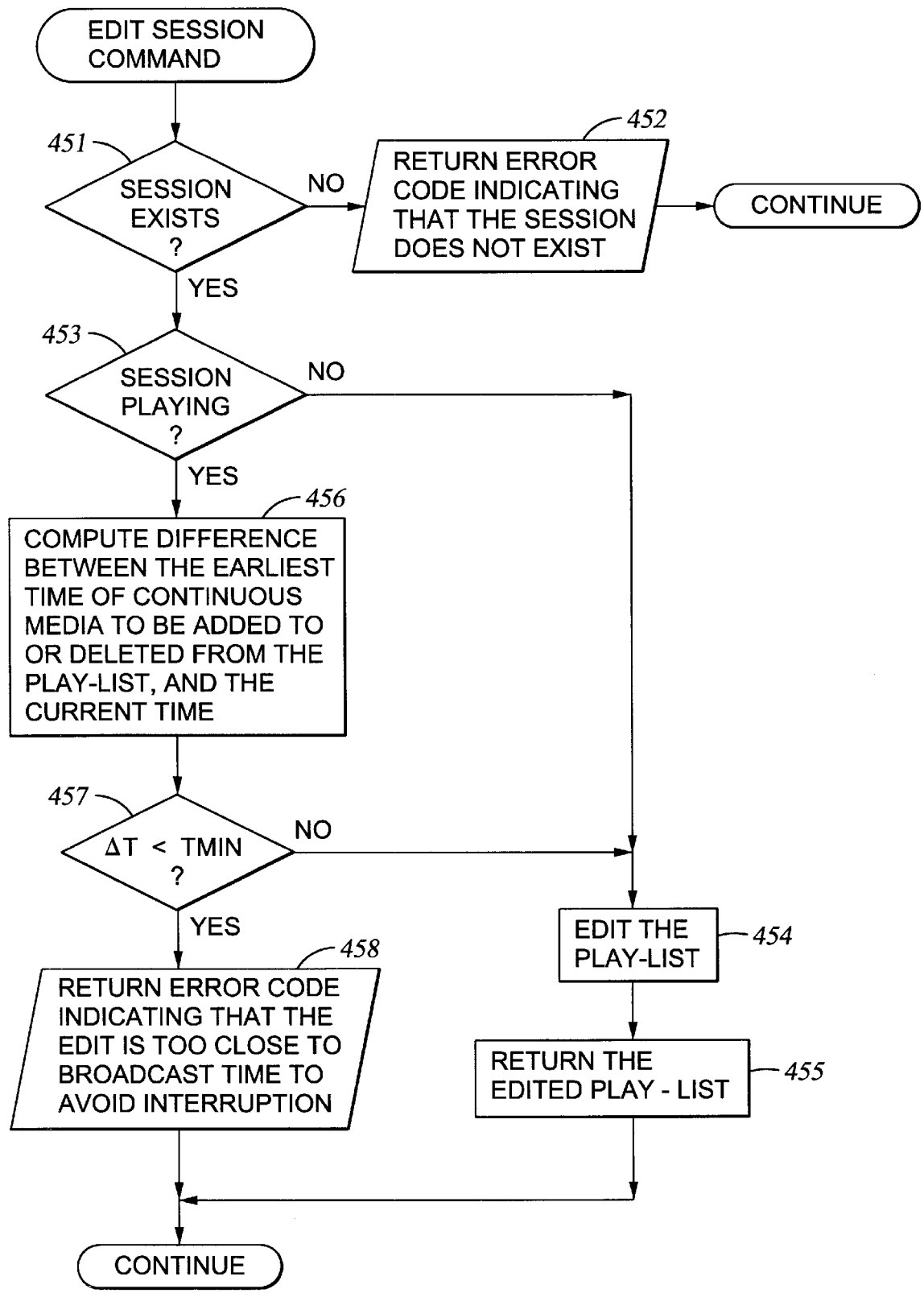
FIG. 37 is a flow chart of a program routine in the controller server for processing an edit command and checking whether or not an edit is too close to broadcast time to avoid interruption of a broadcast transmission.

Turning now to FIG. 37, there is shown a flow chart of a program routine in the controller server for processing an "edit session" command and checking whether or not an edit is too close to air time to ensure that continuity of a broadcast transmission will not be interrupted. In a first step 451, execution branches to step 452 if the session identified by the session handle in the "edit session" command does not exist. If so, in step 452 the controller server returns to the client an error code indicating that the session does not exist, and processing of the "edit session" command is finished. If not, execution continues from step 451 to step 453.

In step 453, the controller server checks whether it is in the "session playing" state for the session identified by the "edit session" command. If not, the possibility of interrupting broadcast transmission does not exist, and execution branches to step 454 to edit the play-list for the session. In step 455, the controller server transmits to the client the edited play-list to acknowledge completion of the "edit session" command, and processing of the "edit session" command is finished.

If the controller server finds in step 453 that the session is playing, then execution continues to step 456 to check whether the requested edit is too close to air time. In step 456, the controller server computes the difference in time (ΔT) between the earliest time of continuous media to be added to or deleted from the play-list, and the current time. Then, in step 457, the controller server checks whether this difference in time (ΔT) is less than a certain minimum time (TMIN). If not, then execution branches from step 457 to step 454 to edit the play-list. Otherwise, execution continues to step 458. In step 458, the controller server returns to the client an error code indicating that the edit is too close to broadcast time to avoid an interruption, and processing of the "edit session" command is finished.

IX. Failover Services

As shown in FIG. 2, the video file server 20 has dual redundant controller servers 28, 29 and multiple stream servers 21 to permit recovery from controller server and stream server failures. Preferably, the recovery is performed with little or no disruption of client services and little or no client involvement. The programming in the video file server 20 that coordinates the recovery operations is referred to as failover services. A major portion of this programming is included in the controller server software. In general, controller server or stream server failover involves recovery of state information necessary for resuming the interrupted operations of the failed controller server or stream server, and the resumption of the interrupted operations by the alternative controller server or an alternative stream server.

Recovery from a controller server failure is transparent to the network clients. At most, controller server failover might be observed by a client as a failure of the video file server 20 to receive a client request, or as an incident in which the video file server 20 issues a duplicate response to the client. Therefore, as observed by a client, controller server failover would be no more disruptive than a transient failure of a network link. In either case, the client operations would merely be delayed for a short instant in time during which the client would resend its request upon failing to receive a timely acknowledgement, or would check for and discard any duplicate response from the video file server that might cause a disruption.

As shown in FIG. 2, the state information necessary for resuming the interrupted operations of the failed controller server is maintained in the cached disk array 23 and normally resides at least in the cache memory 41 of the cached disk array 23. This state information includes "controller server ephemeral atomic state" 501, and may also include state information in one of the log files 502.

In general, transaction processing techniques are used in the failover services in order to ensure recovery of a consistent controller server ephemeral atomic state from which the alternative controller server can resume the interrupted operations of the failed controller server. The cached disk array 23 supports a certain granularity of atomic memory access operations; for example, an instruction in the controller server software to access the cached disk array in order to write data to a 512 byte addressable block is guaranteed to either succeed or fail in the event that the controller server fails during execution of that instruction.

If a transition in the controller server ephemeral atomic state from one consistent state to another involves a change in more than the minimum granularity of atomic read and write operations, then the conventional log file technique of transaction processing is used to ensure recovery of a consistent controller server ephemeral atomic state. To make a recoverable change to the controller server ephemeral state, this technique involves the controller server writing the changes into a transaction log, then writing a checkpoint to the log, and then committing the changes to the ephemeral atomic state by writing the changes to the ephemeral atomic state. Therefore, recovery of a consistent state involves checking the transaction log to determine whether a checkpoint is the last entry in the log, and if so, writing to the controller ephemeral atomic state all changes before that checkpoint and after the next most recent checkpoint. This logging technique also provides, for diagnostic purposes, a history of the state changes for prior transactions in the transaction log.

Initially, one of the controller servers is designated as a master controller and the other is designated as a slave controller. There is a three-second "heartbeat" signal sent over both channels of the internal Ethernet 26 from the master controller server to the slave controller server. The heartbeat signal from the master controller server indicates whether or not the master controller server has any failure, such as a processor problem, severe enough that the slave controller server should assume master status. The slave controller server assumes master status when it fails to receive the heartbeat signal from the master controller server within the three-second "heartbeat" interval or when the heartbeat signal from the master controller server indicates a failure severe enough that the slave server controller should assume master status. The slave server assumes master status by recovering controller server ephemeral atomic state and then resuming control of the video file server.

Figure 38:
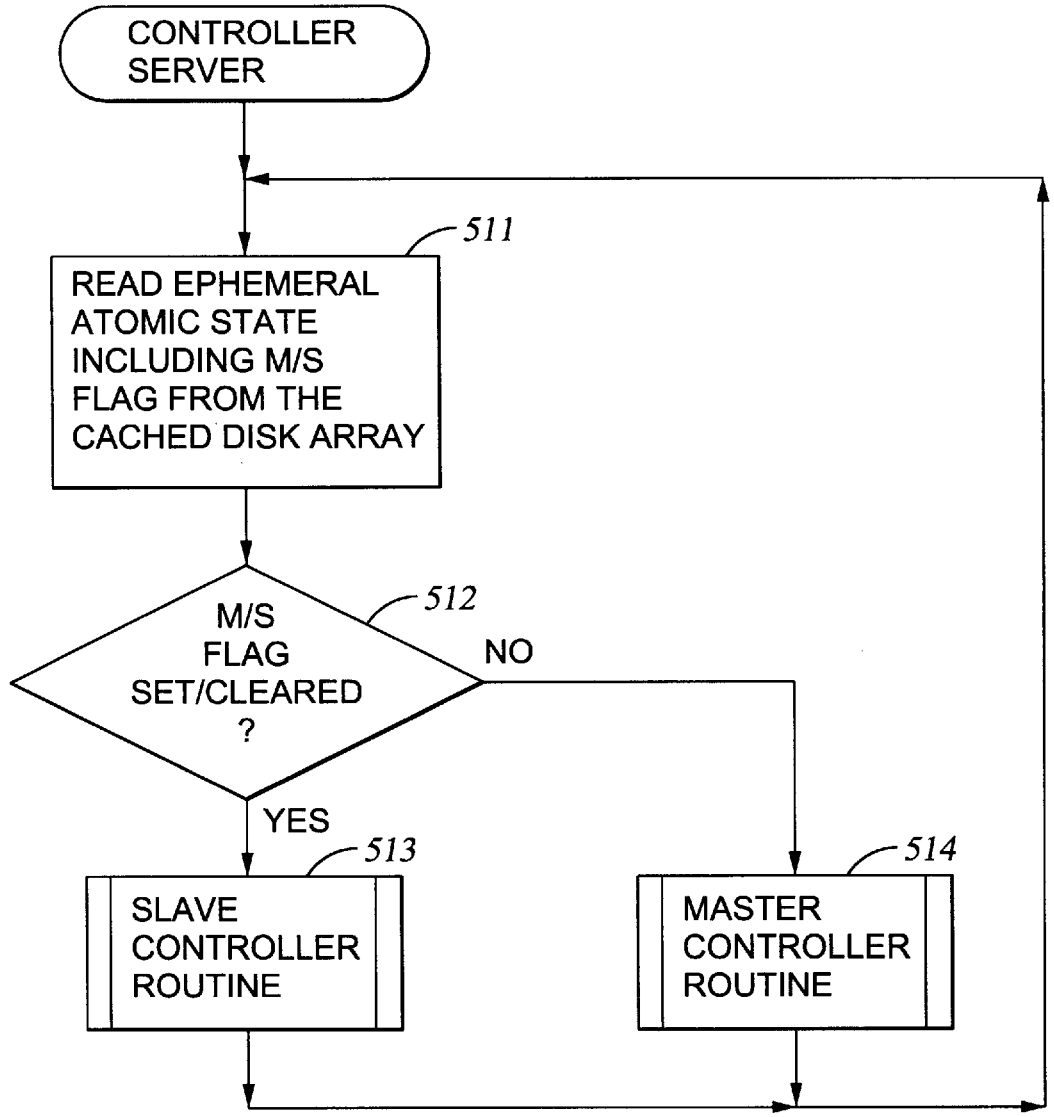
FIG. 38 is a flow chart of a top-level program routine loaded into each of the controller servers.

Turning now to FIG. 38, there is shown a flow chart of a high-level routine in each of the controller servers. To determine whether or not the controller server should assume master or slave status, in the first step 511 the controller server reads a block of ephemeral atomic state including a master/slave flag (M/S). This block of ephemeral atomic state, for example, also includes other basic configuration information for the video file server, such as indications of the operational stream servers and current network port assignments. Then in step 512 the M/S flag is inspected to determine whether execution should branch to a slave controller routine in step 513 or a master controller routine in step 514. The branch condition for step 512 is different depending on whether the program represented by FIG. 38 is loaded into the controller server 28 or the controller server 29. For example, in the program for the controller server 28, if the M/S flag is found to be set, execution branches from step 512 to the slave controller routine in step 513, and in the program for the controller server 29, if the M/S flag is found to be cleared, then execution branches from step 512 to the slave controller routine in step 514. In this fashion, initially one of the server controllers assumes master status, and the other assumes slave status, as selected by the initial state of the M/S flag. After steps 513 and 514, execution loops back to step 511.

Figure 39:
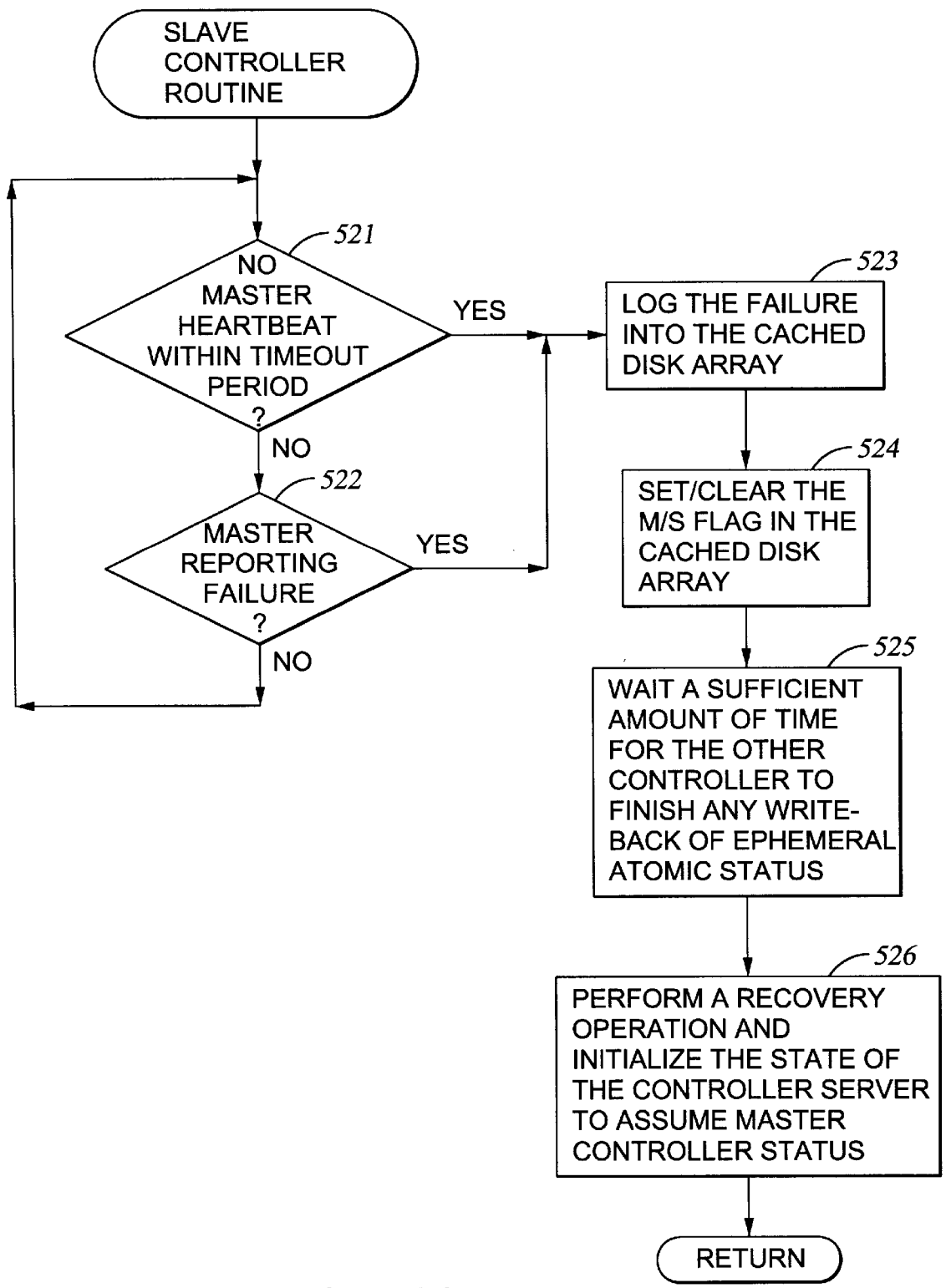
FIG. 39 is a flow chart of a program routine executed by the controller server having slave status.

Turning now to FIG. 39, there is shown a flow chart of the slave controller routine called in step 513 of FIG. 38. In the first step 521 of FIG. 39, the controller server checks whether it has failed to receive a master heartbeat within the three-second timeout period. Step 521, for example, is programmed using software interrupt routines. Initially a software timer is set to a value of at least three seconds. The software timer is periodically decremented by a scheduler timer routine, and reset to a value of three seconds upon receipt of a master heartbeat. The scheduler timer routine executes a software interrupt when the software timer has a zero value, causing execution to branch from step 521 to step 523.

In step 522 the slave controller server checks whether the master controller, in its heartbeat, has reported a failure sufficiently severe that the slave controller server should assume master status. If so, execution branches from step 522 to step 523.

In step 523, for diagnostic purposes, the slave controller logs the nature of the failure into the cached disk array. Then in step 524 the slave controller sets or clears the M/S flag in the cached disk array in order to assume master status. Step 524 is therefore different for the two controller servers; for example, the program for the controller server 28 in FIG. 2 clears the M/S flag, and the program for the controller server 29 in FIG. 2 sets the M/S flag. In step 525 the slave controller waits a sufficient amount of time for the other controller to finish any write-back of ephemeral atomic state (in step 572 of FIG. 40 described below). Then in step 526 the slave controller server performs a recovery operation upon the ephemeral atomic state, and initializes its state to assume master controller status. The state of the controller server is initialized to assume master controller status by fetching from the cached disk array the ephemeral atomic state that defines the context of the master controller program, such as respective program counter values last committed for master controller tasks in progress, and the values of variables used by the master program and last committed by the master controller server. Finally, execution returns to the main routine shown in FIG. 38.

Figure 40:
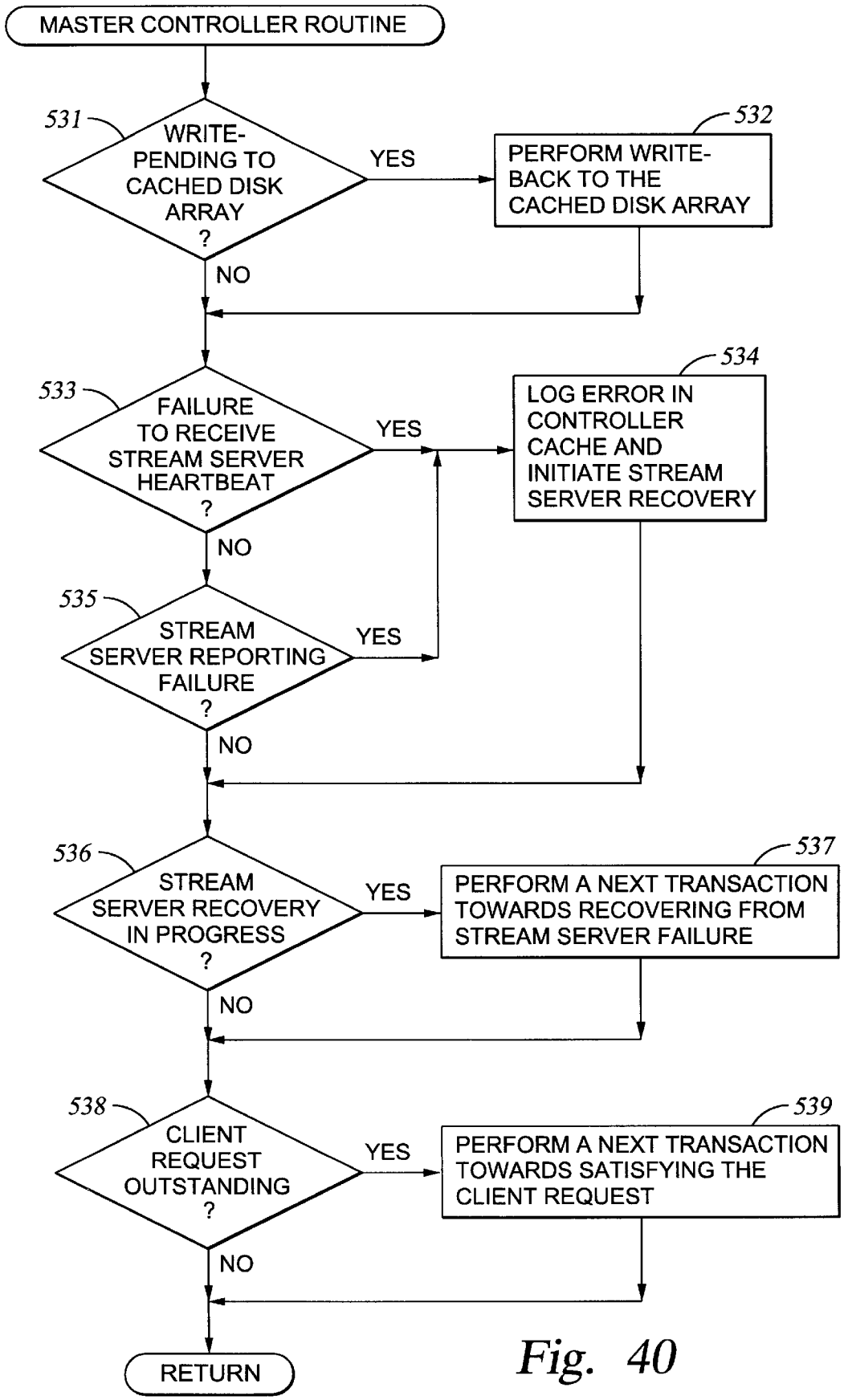
FIG. 40 is a flow chart of a program routine executed by the controller server having master status.

Turning now to FIG. 40, there is shown a flow chart of the master controller routine called in step 514 of FIG. 38. In the first step 531, the master controller checks whether a write-back operation is pending to the cached disk array. If so, execution branches to step 532 to perform the write-back operation. Step 532 includes the committing, to the controller server ephemeral atomic state in the cached disk array, of any state change for transactions most recently performed in the master controller routine. In this fashion, the committing of the controller ephemeral atomic state is synchronized with the checking of the M/S flag in step 512 of FIG. 38, ensuring that write access to the ephemeral atomic state in the cached disk array by the master controller server will cease within a certain time after the slave controller changes the state of the M/S flag in step 524 of FIG. 39. After steps 531 or 532, execution proceeds to step 533.

In step 533, execution branches to step 534 if the master controller fails to receive a heartbeat over the internal Ethernet from each of the stream servers within a certain time-out period. For example, every second, each stream server sends the heartbeat over both channels of the internal Ethernet. The heartbeat includes, for each stream being processed by the stream server, an indication of the current position in the stream, the state of the stream (e.g., pause, playing, completed), and a failure type code indicating any failure that may have occurred. Step 533 can be programmed in a fashion similar to that described above in step 521, using a respective software timer for each of the stream servers. In step 534, the master controller logs the error in the master controller's cache, and initiates stream server recovery. After step 534, execution continues to step 536.

If there has not been a failure to receive the stream server heartbeat within the timeout period, then execution continues from step 533 to step 535. Step 535 checks whether the heartbeat from any of the stream servers indicates a failure sufficiently serious to disrupt a stream. If so, then execution branches from step 535 to step 534 to log the error and initiate stream server recovery. Otherwise, execution continues to step 536.

In step 536, the master controller checks whether recovery for any stream server is in progress. If so, execution branches to step 537 to perform a next transaction towards recovering from a stream server failure. Recovery from a stream server failure will be described further below with reference to FIG. 41. After step 537, execution continues to step 538. Execution also continues from step 536 to step 538 if stream server recovery is not in progress.

In step 538, the master controller checks whether there is a client request outstanding. If so, execution branches to step 539 to perform a next transaction towards satisfying the client request. After step 539, execution returns to the higher-level routine of FIG. 38. Execution also returns after step 538 if there is not a client request outstanding.

It should be understood that the master controller would also be performing certain background tasks not depicted in FIG. 40. For example, the master controller periodically transmits its "heartbeat" to the slave controller, and the master controller also services the media server display and keyboard 32 shown in FIGS. 1 and 2.

From the above description of FIG. 40, it is understood that the activities of the master controller are subdivided into independent tasks, and each task is subdivided into transactions. Each transaction includes the contiguous steps of a task which can be repeated together without system disruption upon resumption of processing after a recovery operation. Tolerance of repeating steps of a transaction is desired because the controller state indicating the precise point of interruption within a transaction may be lost during a system controller failure. If repeating of the steps within a transaction is tolerated, recovery may consist of no more than starting the interrupted transaction over using the recovered state existing at the start of the transaction.

Preferably, the stream servers communicate with the controller servers in such a way that the stream servers can tolerate receipt of at least one duplicated command from the controller servers without adversely affecting stream server state, and therefore proper system operation is resumed when the slave controller server assumes master control after recovery. For example, if the stream server receives a command to simply store or retrieve information, this command can be executed repeatedly without adversely affecting stream server state. In general, the commands from the master controller server to each stream server are of the kind requesting the stream server to assume a definite state, or to begin an operation if that operation has not yet been performed or is not being performed, and therefore the stream servers can tolerate receipt of at least one duplicated command from the controller servers without adversely affecting stream server state.

A hypothetical example of a request that if duplicated might adversely affect stream server state is a single command that would cause the stream server to increment a counter in the stream server. In this hypothetical, the value of the counter would be adversely changed after recovery by a duplicate command because the counter would be incremented a second time by the duplicate command and therefore assume an incorrect value. However, it would be possible for the controller server to send two different commands to the stream server to increment the counter in such a way that duplication of any single command would not adversely affect the state of the stream server. For example, the controller server program could send a command "A" in a first transaction followed by a different command "B" in a second transaction, and the stream server could be programmed to increment the counter only upon receiving the command "B" immediately after the command "A". By using this technique, it is always possible for the stream servers to communicate with the controller servers in such a way that the stream servers can tolerate receipt of at least one duplicated command from the controller servers without adversely affecting stream server state.

Figure 41:
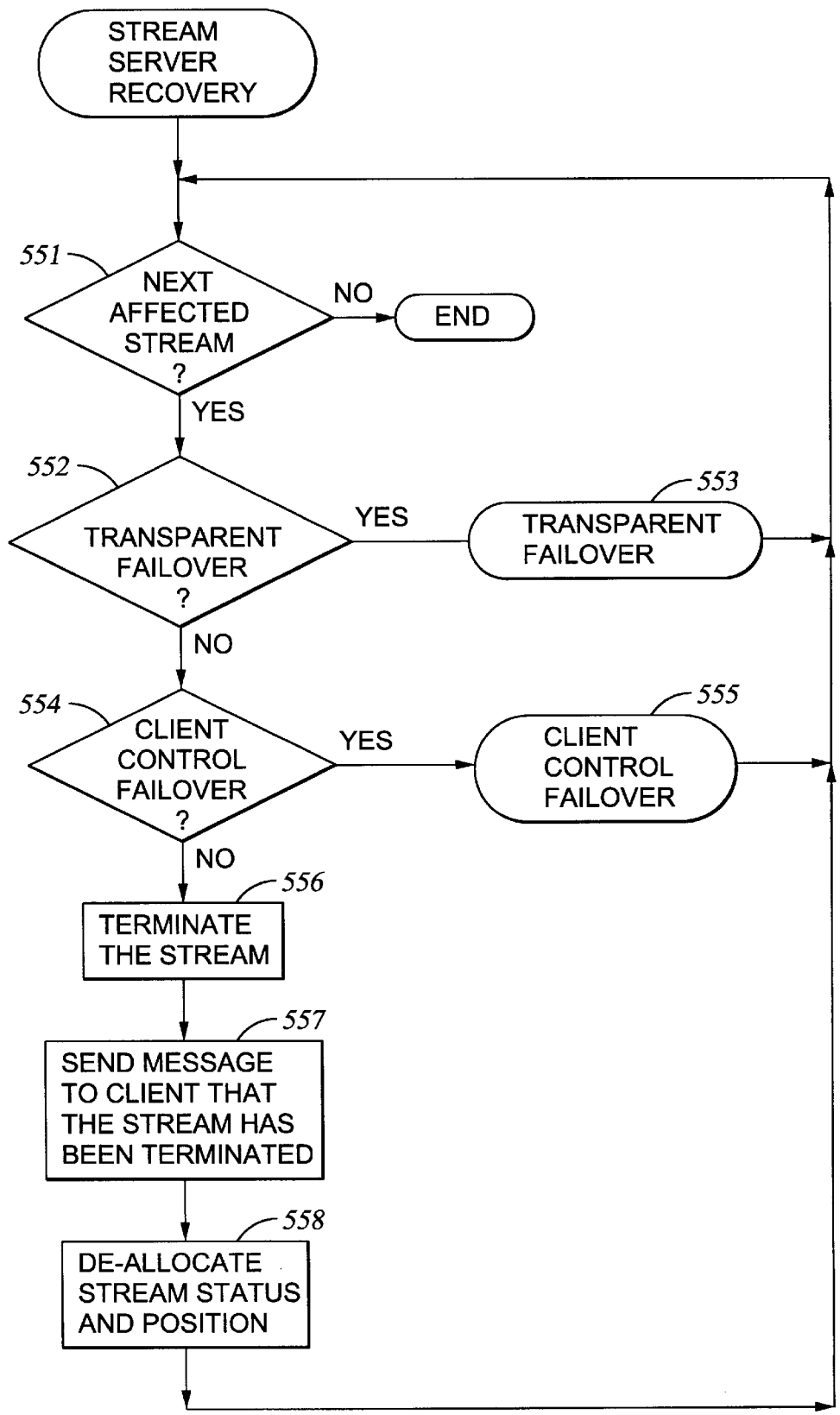
FIG. 41 is a flow chart of a program routine executed by the controller server having master status for recovering from a stream server failure.

Turning now to FIG. 41, there is shown a flow chart of the task executed by the master controller server for recovering from a stream server failure. Preferably, the video file server has a "failover" capability permitting the video file server and/or the client application to resume playing of a media stream through newly allocated resources when a failure is detected in the hardware currently allocated to the stream. As introduced above, when a stream for a client is allocated, for example in response to an "open play" command from the client, the client may specify a parameter "failover_t" which defines how to perform failover. Possible values are:

FAILOVER_NONE—no failover

FAILOVER_AUTOMATIC—video file server transparently fails-over the stream

FAILOVER_SIGNALCLIENT—the client will be signalled to request if failover should occur FAILOVER_MUSTHAVE—if this is ORed with the desired failover mode, the stream will be created only if the desired failover mode is available The feasibility of performing failover and the mechanisms used to perform failover are tightly tied to the way the video file server is connected to the decoder hardware. As shown in FIG. 2, for example, the video file server 20 is connected through the ATM switch 53 to the network clients 54, and the ATM switch has an address decoder that can be programmed by the clients or the video file server in order to dynamically change the network addresses of the stream servers 21. However, the video file server can be connected to the decoder hardware in a variety of ways. In order of increasing capability, these variations fall into three categories.

First, there could be a hardwired connection to the decoder rather than a capability for dynamically programming the network addresses of the stream servers. When the decoder is hardwired directly to the video file server, there is no possibility of performing failover. Therefore, manual intervention is required to swap out the failed hardware and the stream must be manually restarted. This mode of responding to a stream server failure is also the mode selected by the value of FAILOVER_NONE for the parameter "failover_t".

Second, there could be a network decoder with network switching controlled by the client application. In this case, the client application may initiate the failover function either on its own or in response to a callback from the video file server. This mode of responding to a stream server failure is selected by the value of FAILOVER_SIGNALCLIENT for the parameter "failover_t".

Third and finally, there could be a network decoder with network switching controlled by the video file server. When there is a network fabric present between the video file server and the decoder and the fabric switching is controlled by the video file server, failover may be performed transparently by the video file server. This mode of responding to a stream server failure is selected by the value of FAILOVER_AUTOMATIC for the parameter "failover_t".

The failover capability of a given stream is therefore dependent on the hardware configuration as well as the software executed by the controller server. Moreover, a hardware configuration with a higher capability should also support all lower capability failover modes. In addition, a client may request the video file server to perform the highest capability failover and have it quietly downgrade the failover mode to the maximum level supported by the hardware.

Turning now to FIG. 41, there is shown a flow chart of the stream server recovery task executed by the controller server having master status. In a first step 551, the master controller checks whether any continuous media streams are affected by a stream server failure. For example, if the controller server fails to receive a heartbeat from a stream server, then the controller server presumes that all streams assigned to that stream server are affected by a stream server failure. If no stream is found in step 551 to be affected by a stream server failure, then the stream server recovery task is finished. Otherwise, execution continues through a processing loop to attempt failover for a next one of the streams affected by a stream server failure. In particular, in step 552 the master controller server checks whether it should attempt transparent failover for the next affected stream. If the client of the next affected stream has specified a transparent failover mode for the stream and the network includes a switch and decoder controllable by the master controller server for performing transparent failover for the stream, then execution branches from step 552 to step 553 to initiate a transparent failover task for the stream. The transparent failover task is further described below with reference to FIG. 42.

If transparent failover is neither requested nor feasible for the stream, execution continues from step 552 to step 554. In step 554, the master controller server checks whether it should attempt client control failover for the stream. If the network has the capability of providing client control failover for the stream, and the client requested client control failover for the stream or requested transparent failover without FAILOVER_MUSTHAVE for the stream, then execution branches from step 554 to step 555 to initiate a client control failover task for the stream. The client control failover task is further described below with reference to FIG. 43. Otherwise, failover is not attempted for the stream, and instead in step 556 the master controller server terminates the stream, in step 557 the master controller server sends a message to the client of the stream informing the client that the stream has been terminated, and in step 558 the master controller server de-allocates the stream status and position from the master controller's state memory.

Eventually, when the processing loop of FIG. 41 has been traversed once for each stream supported by the failed stream server, step 551 finds no more affected streams, and the stream server recovery task is finished.

Figure 42:
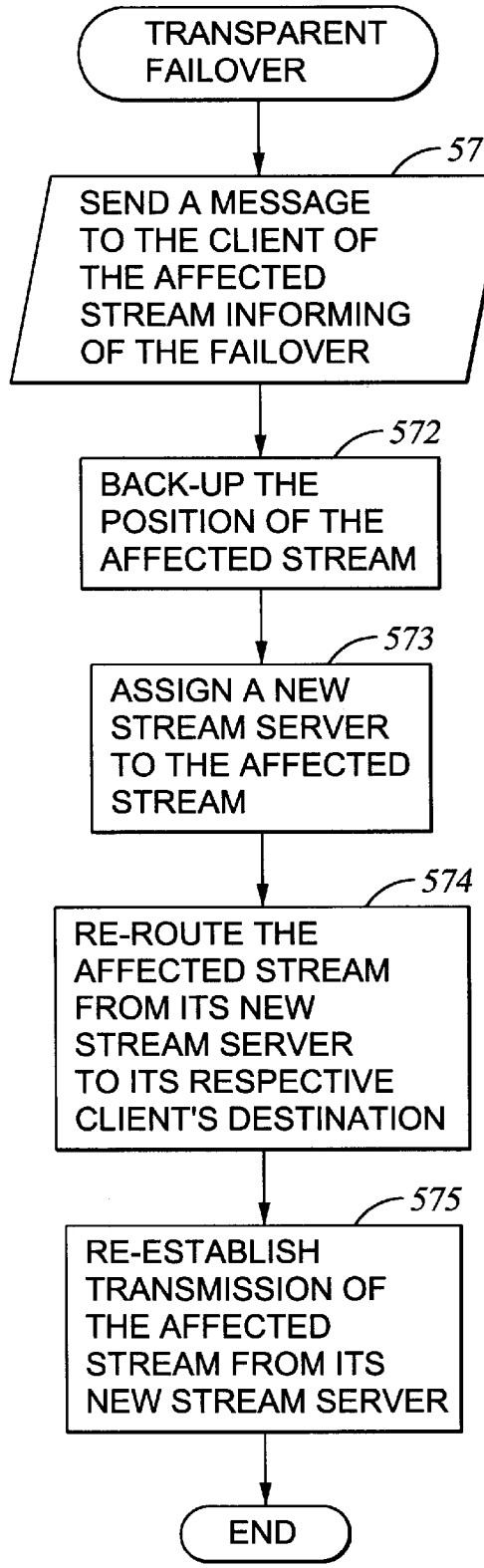
FIG. 42 is a flow chart of a program routine executed by the controller server having master status for performing transparent failover of a stream.

Turning now to FIG. 42, there is shown a flow chart of the task for preforming a transparent failover for a stream. In the first step 571, the master controller sends a message to the client of the stream informing the client that a failover is occurring. Then in step 572 the master controller backs up the position of the affected stream to the last point in the stream known to have been transmitted before the time of failure of the stream server. By backing up to the last known good point, there will be no loss of information from the stream, although there will be a "freeze frame" during the time required by the system to detect the stream server failure and initiate failover, and a "blip" when transmission resumes at the backed-up position, followed by some duplication of information when transmission is resumed. In step 573, a new stream server is assigned to the stream, and in step 574 the stream is re-routed from its new stream server to its respective client. Finally, in step 575, transmission of the stream is re-established from its new stream server to its client, and the failover task is finished.

Figure 43:
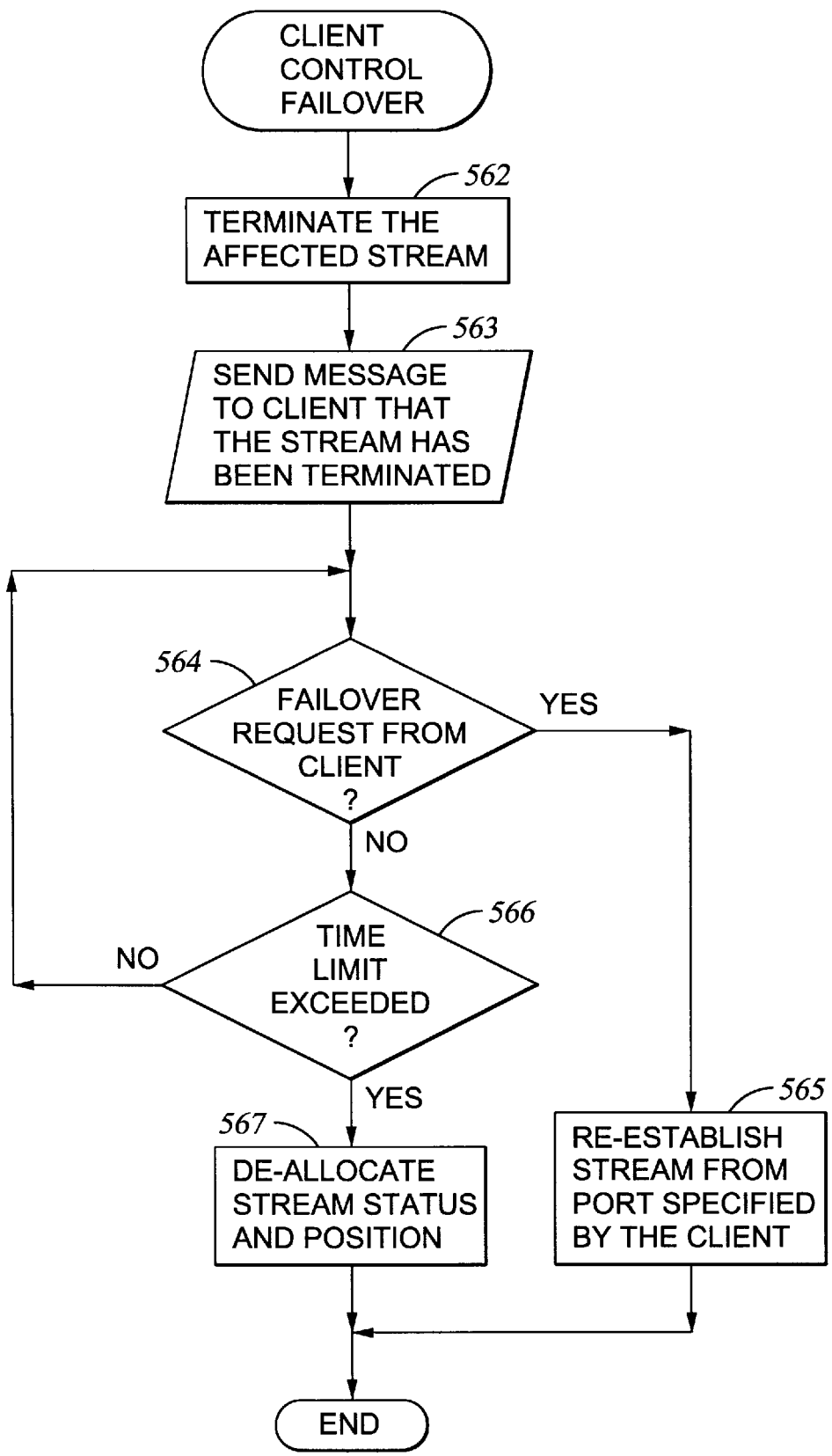
FIG. 43 is a flow chart of a program routine executed by the controller server having master status for performing, under client control, failover of a stream.

Turning now to FIG. 43, there is shown a flow chart of a task for performing failover under client control. In a first step 562, the master controller terminates the affected stream. Next, in step 563, the master controller sends a message to the stream's client informing the client that the stream has been terminated. Then, in step 564, the master controller checks whether a failover request has been received from the client. If so, execution branches to step 565, where the master controller server re-establishes the stream from the port specified by the client. If not, execution continues to step 566. In step 566, the master controller server checks whether or not a time limit has been exceeded for a response from the client. If not, execution loops back to step 564. Otherwise, execution continues to step 567 where the master controller server de-allocates the stream status and position. After steps 565 and 567, the client control failover task is finished.

When the master control station informs a client that the client's stream has been interrupted, it preferably sends a status message having the following format:

VRPstatus_t*vrp_failure_1(VRPfailargs_t*args, struct svc_req*)
where:

```
struct VRPfailargs_t {
    sHandle_t      handle;
    positioning_t  position;
    state_t        state;
    failover_t     type;
    endpoint_t     ep;
};
``` handle—streamhandle returned by vrp_openplay_1( )
position—last known position of the stream
state—state of the stream before the failure
type—type of failure:
 FAILOVER_NONE—automatic failover failed
 FAILOVER_SIGNALCLIENT—failover indication
 FAILOVER_AUTOMATIC—failover completion
ep—new endpoint if failover completion
Depending on the value of the parameter "type", the client may need to initiate failover:

FAILOVER_NONE

The video file server attempted to perform a transparent failover but was unable to allocate resources. The client may attempt to perform manual failover (as for FAILOVER_SIGNALCLIENT) or close the stream.

FAILOVER_SIGNALCLIENT

The client must initiate failover or close the stream since the video file server does not have switching control over the underlying network infrastructure.

FAILOVER_AUTOMATIC

The video file server performed a transparent failover. The argument "ep" contains the new source endpoint for the stream. The stream will have been repositioned to its last known point before playing resumed.

To allow the client application to initiate failover on its own, the client application may send a specific command to the video file server. Such a command, for example, has the following format:

VRPstatus_t*vrp_failover_1(VRfailover_t*args, CLIENT*)
where:

```
struct VRPfailover_t {
    sHandle_t   handle;
    endpoint_t  destination;
};
```

In response to this command, the video file server will attempt to manually failover an existing play stream to the specified destination. The stream will be left in the "paused" state to allow the client application to reposition the stream before resuming.

In view of the above, there has been described a client-server protocol and interface for providing broadcast playback functionality. The protocol and interface easily provides continuous play over multiple clips for extended periods of time, allows a play-list to be edited after being given to the video server and during playback of clips in the play-list, allows some notion of "current time" to be used during the streaming of continuous media data, and supports features of the "Louth Automation" video disk communications protocol. The protocol and interface permits an external application to create and manipulate a dynamic play-list; as clips finish playing they are discarded from the play-list and new clips may be appended to or inserted into the play-list at selected positions (subject to server-imposed constraints).

What is claimed is:

1. A method of communication between a client and a continuous media server in a data network, said method comprising the steps of:
   (a) the client sending a first command to the server requesting the server to allocate server resources for a broadcast session including transmission of continuous media data from the server to a destination in the data network; and then
   (b) the server receiving the first command and in response allocating server resources for the broadcast session and returning to the client an acknowledgement that server resources have been allocated for the broadcast session; and then
   (c) the client receiving the acknowledgement and in response transmitting to the server at least a second command specifying a play-list of continuous media clips from which continuous media data are to be transmitted from the server to said destination during the broadcast session; and then
   (d) the server receiving said at least a second command and thereafter beginning the broadcast session by transmitting continuous media data from a first clip in the play-list to said destination; and then
   (e) the client sending to the server play-list edit commands during the transmission of continuous media data from at least one clip in the play-list for editing the play-list including the addition of at least one additional clip to the play-list, and the server receiving the play-list edit commands and in response editing the play-list during the broadcast session without interruption of the transmission of continuous media data from the server to said destination.

2. The method as claimed in claim 1, wherein the acknowledgement that server resources have been allocated for the broadcast session includes a session handle transmitted by the server to the client, and the second command includes the session handle.

3. The method as claimed in claim 1, wherein the second command is substantially identical in format to the play-list edit commands.

4. The method as claimed in claim 3, which includes:
   the client transmitting to the server a third command for initiating the broadcast session; and
   the server receiving the third command and in response to the third command beginning the broadcast session by transmitting continuous media data from the first clip in the play-list to said destination.

5. The method as claimed in claim 1, wherein the server returns to the client an acknowledgement of each play-list edit command, and the acknowledgement of each play-list edit command includes an edited version of the play-list resulting from the server editing the play-list in accordance with said each play-list edit command.

6. The method as claimed in claim 1, wherein the server transmits to the client an indication that transmission from a clip is complete each time the server has completed transmission of continuous media data from a clip in the play-list during the broadcast session.

7. The method as claimed in claim 6, wherein said indication that transmission from a clip is complete includes a current version of the play-list.

8. The method as claimed in claim 1, wherein the server transmits to the client an indication that the play-list is empty when transmission of continuous media data from a last clip in the play-list is finished and the play-list becomes empty.

9. The method as claimed in claim 1, wherein the server de-allocates the server resources when the play-list is empty for more than a certain amount of time.

10. The method as claimed in claim 1, wherein the server checks whether or not each of said play-list edit commands specifies a change of continuous media too close to broadcast time to avoid an interruption of transmission of the continuous media data from the server to said destination, and when one of said play-list edit commands is found to specify a change of continuous media too close to broadcast time to avoid an interruption of transmission of the continuous media data from the server to said destination, not editing the play-list in response to said one of said play-list edit commands, and instead returning an error message to the client.

11. A method of communication between a client and a continuous media server in a data network, said method comprising the steps of:

(a) the server conducting a broadcast session for the client by transmitting continuous media data from clips in a play-list to a destination in said data network, beginning with continuous media data from a first clip in the play-list;

(b) the client sending to the server play-list edit commands during the transmission of continuous media data from at least one clip in the play-list for editing the play-list including the addition of at least one additional clip to the play-list, and the server receiving the play-list edit commands and in response editing the play-list during the broadcast session without interruption of the transmission of continuous media data from the server to said destination;

wherein the server checks whether or not each of said play-list edit commands specifies a change of continuous media too close to broadcast time to avoid an interruption of transmission of the continuous media data from the server to said destination, and when one of said play-list edit commands is found to specify a change of continuous media too close to broadcast time to avoid an interruption of transmission of the continuous media data from the server to said destination, not editing the play-list in response to said one of said play-list edit commands, and instead returning an error message to the client.

12. The method as claimed in claim 11, wherein the server returns to the client an edited version of the play-list when the server edits the play-list in response to each of the play-list edit commands.

13. The method as claimed in claim 11, wherein the server transmits to the client an indication that transmission from a clip is complete each time the server has completed transmission of continuous media data from a clip in the play-list during the broadcast session.

14. The method as claimed in claim 13, wherein said indication that transmission from a clip is complete includes a current version of the play-list.

15. The method as claimed in claim 13, wherein the server transmits to the client an indication that the play-list is empty when transmission of continuous media data from a last clip in the play-list is finished and the play-list becomes empty.

16. A method of communication between a client and a continuous media server in a data network, said method comprising the steps of:

(a) the client sending a first command to the server requesting the server to create a broadcast session for the transmission of continuous media data from the server to a client-specified destination in the data network; and then (b) the server receiving the first command and in response allocating server resources for the broadcast session and returning to the client a session handle identifying the allocated server resources; and then (c) the client receiving the session handle and in response transmitting to the server at least one play-list edit command including the session handle and specifying at least one continuous media clip to be transmitted from the server to said destination during the broadcast session; and then (d) the server receiving said at least one play-list edit command, producing an edited version of the play-list in accordance with said at least one play-list edit command, and acknowledging the play-list edit command by returning to the client the edited version of the play-list; and then (e) the client receiving the edited version of the play-list and thereafter transmitting a command for beginning the broadcast session; and then (f) the server receiving the command for beginning the broadcast session and in response beginning the broadcast session by transmitting continuous media data from a first clip in the play-list to said destination; and then (g) the client sending to the server additional play-list edit commands during the transmission of continuous media data from at least one clip in the play-list for editing the play-list including the addition of at least one additional clip to the play-list, and the server receiving the additional play-list edit commands and in response editing the play-list during the broadcast session without interruption of the transmission of continuous media data from the server to said destination.

17. The method as claimed in claim 16, wherein the server transmits to the client an indication that transmission from a clip is complete each time the server has completed transmission of continuous media data from a clip in the play-list during the broadcast session.

18. The method as claimed in claim 17, wherein said indication that transmission from a clip is complete includes a current version of the play-list.

19. The method as claimed in claim 16, wherein the server transmits to the client an indication that the play-list is empty when transmission of continuous media data from a last clip in the play-list is finished and the play-list becomes empty, and wherein the server de-allocates the server resources when the play-list is empty for more than a certain amount of time.

20. The method as claimed in claim 16, wherein the client sends to the server a pause command for interrupting the transmission of continuous media data during the broadcast session, and a resume command for resuming the transmission of continuous media data during the broadcast session, and wherein the command for beginning the broadcast session is substantially identical in format to the resume command.

21. The method as claimed in claim 16, wherein the server checks whether or not each of said play-list edit commands specifies a change of continuous media too close to broadcast time to avoid an interruption of transmission of the continuous media data from the server to said destination, and when one of said play-list edit commands is found to specify a change of continuous media too close to broadcast time to avoid an interruption of transmission of the continuous media data from the server to said destination, not editing the play-list in response to said one of said play-list edit commands, and instead returning an error message to the client.

22. A continuous media server for use in a data network, said continuous media server comprising:
   data storage for storing clips of continuous media data; and
   a controller for communicating with clients in the data network and being coupled to the data storage for controlling transmission of continuous media data from the data storage to destinations in the data network;
   wherein the controller is programmed for:
      (a) receiving from a client a first command requesting the server to allocate server resources for a broadcast session including transmission of continuous media data from the server to a destination in the data network, and in response allocating server resources for the broadcast session and returning to the client an acknowledgement that server resources have been allocated for the broadcast session;
      (b) receiving from the client a second command specifying a play-list of continuous media clips from which continuous media data are to be transmitted from the server to said destination during the broadcast session, and thereafter beginning a broadcast session by transmitting continuous media data from a first clip in the play-list to said destination; and
      (c) receiving from the client play-list edit commands during the transmission of continuous media data from at least one clip in the play-list for editing the play-list including the addition of at least one additional clip to the play-list, and in response editing the play-list during the broadcast session without interruption of the transmission of continuous media data from the server to said destination.

23. The continuous media server as claimed in claim 22, wherein the controller is programmed for including a session handle in the acknowledgement that server resources have been allocated for the broadcast session, and for receiving back the session handle in the second command.

24. The continuous media server as claimed in claim 22, wherein the second command is substantially identical in format to the play-list edit commands.

25. The continuous media server as claimed in claim 24, wherein the controller is programmed for receiving from the client a third command for initiating the broadcast session, and in response beginning the broadcast session by transmitting continuous media data from the first clip in the play-list to said destination.

26. The continuous media server as claimed in claim 22, wherein the controller is programmed for returning to the client an acknowledgement of each play-list edit command, and the acknowledgement of each play-list edit command includes an edited version of the play-list resulting from the server editing the play-list in accordance with said each play-list edit command.

27. The continuous media server as claimed in claim 22, wherein the controller is programmed for transmitting to the client an indication that transmission from a clip is complete each time the server has completed transmission of continuous media data from a clip in the play-list during the broadcast session.

28. The continuous media server as claimed in claim 27, wherein the controller is programmed for including a current version of the play-list in said indication that transmission from a clip is complete.

29. The continuous media server as claimed in claim 22, wherein the controller is programmed for transmitting to the client an indication that the play-list is empty when transmission of continuous media data from a last clip in the play-list is finished and the play-list becomes empty.

30. The continuous media server as claimed in claim 22, wherein the controller is programmed for de-allocating the server resources when the play-list is empty for more than a certain amount of time.

31. The continuous media server as claimed in claim 22, wherein the controller is programmed for checking whether or not each of said play-list edit commands specifies a change of continuous media too close to broadcast time to avoid an interruption of transmission of the continuous media data from the server to said destination, and when one of said play-list edit commands is found to specify a change of continuous media too close to broadcast time to avoid an interruption of transmission of the continuous media data from the server to said destination, for not editing the play-list in response to said one of said play-list edit commands, and instead returning an error message to the client.

32. A continuous media server for use in a data network, said continuous media server comprising:
   data storage for storing clips of continuous media data; and
   a controller for communicating with clients in the data network and being coupled to the data storage for controlling transmission of continuous media data from the data storage to destinations in the data network;
   wherein the controller is programmed for:
      (a) conducting a broadcast session for the client in which the server transmits continuous media data from clips in a play-list to a destination in said data network, beginning with continuous media data from a first clip in the play-list; and
      (b) receiving from the client play-list edit commands during the transmission of continuous media data from at least one clip in the play-list, and in response editing the play-list during the broadcast session, including the addition of at least one additional clip to the play-list, without interruption of the transmission of continuous media data from the server to said destination;
   wherein the controller is programmed for checking whether or not each of said play-list edit commands specifies a change of continuous media too close to broadcast time to avoid an interruption of transmission of the continuous media data from the server to said destination, and when one of said play-list edit commands is found to specify a change of continuous media too close to broadcast time to avoid an interruption of transmission of the continuous media data from the server to said destination, not editing the play-list in response to said one of said play-list edit commands, and instead returning an error message to the client.

33. The continuous media server as claimed in claim 32, wherein the controller is programmed for returning to the client an edited version of the play-list when the controller edits the play-list in response to each of the play-list edit commands.

34. The continuous media server as claimed in claim 32, wherein the controller is programmed for transmitting to the client an indication that transmission from a clip is complete each time the server has completed transmission of continuous media data from a clip in the play-list during the broadcast session.

35. The continuous media server as claimed in claim 34, wherein the controller is programmed for including a current version of the play-list in said indication that transmission from a clip is complete.

36. The continuous media server as claimed in claim 32, wherein the controller is programmed for transmitting to the client an indication that the play-list is empty when transmission of continuous media data from a last clip in the play-list is finished and the play-list becomes empty.

37. A continuous media server for use in a data network, said continuous media server comprising:
   data storage for storing clips of continuous media data; and
   a controller for communicating with clients in the data network and being coupled to the data storage for controlling transmission of continuous media data from the data storage to destinations in the data network;
   wherein the controller is programmed for:
      (a) receiving from the client a command requesting the server to create a broadcast session for the transmission of continuous media data from the server to a client-specified destination in the data network, and in response allocating server resources for the broadcast session and returning to the client a session handle identifying the allocated server resources;
      (b) receiving from the client at least one play-list edit command including the session handle and specifying at least one continuous media clip to be transmitted from the server to said destination during the broadcast session, editing a play-list for the session in accordance with the play-list edit command to produce an edited version of the play-list, and returning to the client the edited version of the play-list;
      (c) receiving from the client a command for beginning the broadcast session and in response beginning the broadcast session by beginning transmission of continuous media data from a first clip in the play-list to said destination; and
      (d) receiving from the client additional play-list edit commands during the transmission of continuous media data from at least one clip in the play-list, and in response editing the play-list during the broadcast session without interruption of the transmission of continuous media data from the server to said destination.

38. The continuous media server as claimed in claim 37, wherein the controller is programmed for transmitting to the client an indication that transmission from a clip is complete each time the server has completed transmission of continuous media data from a clip in the play-list during the broadcast session.

39. The continuous media server as claimed in claim 38, wherein the controller is programmed for including a current version of the play-list in the indication that transmission from a clip is complete.

40. The continuous media server as claimed in claim 37, wherein the controller is programmed for transmitting to the client an indication that the play-list is empty when transmission of continuous media data from a last clip in the play-list is finished and the play-list becomes empty, and for de-allocating the server resources when the play-list is empty for more than a certain amount of time.

41. The continuous media server as claimed in claim 37, wherein the controller is programmed for receiving from the client a pause command for interrupting the transmission of continuous media data during the broadcast session, and for receiving from the client a resume command for resuming the transmission of continuous media data during the broadcast session, and wherein the command for beginning the broadcast session is substantially identical in format to the resume command.

42. The continuous media server as claimed in claim 37, wherein the controller is programmed for checking whether or not each of said play-list edit commands specifies a change of continuous media too close to broadcast time to avoid an interruption of transmission of the continuous media data from the server to said destination, and when one of said play-list edit commands is found to specify a change of continuous media too close to broadcast time to avoid an interruption of transmission of the continuous media data from the server to said destination, for not editing the play-list in response to said one of said play-list edit commands, and instead returning an error message to the client.

43. A program storage device storing a program executable by a continuous media server in a data network, said program being executable by the server for:
   (a) controlling the server for receiving from a client a first command requesting the server to allocate server resources for a broadcast session including transmission of continuous media data from the server to a destination in the data network, and in response allocating server resources for the broadcast session and returning to the client an acknowledgement that server resources have been allocated for the broadcast session;
   (b) controlling the server for receiving from the client a second command specifying a play-list of continuous media clips from which continuous media data are to be transmitted from the server to said destination during the broadcast session, and thereafter beginning a broadcast session by transmitting continuous media data from a first clip in the play-list to said destination; and
   (c) controlling the server for receiving from the client play-list edit commands during the transmission of continuous media data from at least one clip in the play-list, and in response editing the play-list, including the addition of at least one additional clip to the play-list, without interruption of the transmission of continuous media data from the server to said destination during the broadcast session.

44. The program storage device as claimed in claim 43, wherein program is executable by the server for including a session handle in the acknowledgement that server resources have been allocated for the broadcast session includes a session handle, and for receiving back the session handle in the second command.

45. The program storage device as claimed in claim 43, wherein the second command is substantially identical in format to the play-list edit commands.

46. The program storage device as claimed in claim 45, wherein the program is executable by the server for receiving from the client a third command for initiating the broadcast session, and in response beginning the broadcast session by transmitting continuous media data from the first clip in the play-list to said destination.

47. The program storage device as claimed in claim 43, wherein the program is executable by the server for returning to the client an acknowledgement of each play-list edit command, and for including, in the acknowledgement of each play-list edit command, an edited version of the play-list resulting from the server editing the play-list in accordance with said each play-list edit command.

48. The program storage device as claimed in claim 43, wherein the program is executable by the server for transmitting to the client an indication that transmission from a clip is complete each time the server has completed transmission of continuous media data from a clip in the play-list during the broadcast session.

49. The program storage device as claimed in claim 48, wherein the program is executable by the server for including a current version of the play-list in said indication that transmission from a clip is complete.

50. The program storage device as claimed in claim 43, wherein the program is executable by the server for transmitting to the client an indication that the play-list is empty when transmission of continuous media data from a last clip in the play-list is finished and the play-list becomes empty.

51. The program storage device as claimed in claim 43, wherein the program is executable by the server for de-allocating the server resources when the play-list is empty for more than a certain amount of time.

52. The program storage device as claimed in claim 43, wherein the program is executable by the server for checking whether or not each of said play-list edit commands specifies a change of continuous media too close to broadcast time to avoid an interruption of transmission of the continuous media data from the server to said destination, and when one of said play-list edit commands is found to specify a change of continuous media too close to broadcast time to avoid an interruption of transmission of the continuous media data from the server to said destination, for not editing the play-list in response to said one of said play-list edit commands, and instead returning an error message to the client.

53. A program storage device storing a program executable by a continuous media server in a data network, said program being executable by the server for:
  (a) controlling the server for conducting a broadcast session for the client in which the server transmits continuous media data from clips in a play-list to a destination in said data network, beginning with continuous media data from a first clip in the play-list; and
  (b) controlling the server for receiving from the client play-list edit commands during the transmission of continuous media data from at least one clip in the play-list, and in response editing the play-list during the broadcast session, including the addition of at least one additional clip to the play-list, without interruption of the transmission of continuous media data from the server to said destination;
  wherein the program is executable by the server for checking whether or not each of said play-list edit commands specifies a change of continuous media too close to broadcast time to avoid an interruption of transmission of the continuous media data from the server to said destination, and when one of said play-list edit commands is found to specify a change of continuous media too close to broadcast time to avoid an interruption of transmission of the continuous media data from the server to said destination, for not editing the play-list in response to said one of said play-list edit commands, and instead returning an error message to the client.

54. The program storage device as claimed in claim 53, wherein the program is executable by the server for returning to the client an edited version of the play-list when the controller edits the play-list in response to each of the play-list edit commands.

55. The program storage device as claimed in claim 53, wherein the program is executable by the server for transmitting to the client an indication that transmission from a clip is complete each time the server has completed transmission of continuous media data from a clip in the play-list during the broadcast session.

56. The program storage device as claimed in claim 55, wherein the program is executable by the server for including a current version of the play-list in said indication that transmission from a clip is complete.

57. The program storage device as claimed in claim 53, wherein the program is executable by the server for transmitting to the client an indication that the play-list is empty when transmission of continuous media data from a last clip in the play-list is finished and the play-list becomes empty.

58. A program storage device storing a program executable by a continuous media server in a data network, said program being executable by the server for:
  (a) controlling the server for receiving from the client a command requesting the server to create a broadcast session for the transmission of continuous media data from the server to a client-specified destination in the data network, and in response allocating server resources for the broadcast session and returning to the client a session handle identifying the allocated server resources;
  (b) controlling the server for receiving from the client at least one play-list edit command including the session handle and specifying at least one continuous media clip to be transmitted from the server to said destination during the broadcast session, and for editing a play-list for the session in accordance with the play-list edit command to produce an edited version of the play-list, and for returning to the client the edited version of the play-list;
  (c) controlling the server for receiving from the client a command for beginning the broadcast session and in response beginning the broadcast session by beginning transmission of continuous media data from a first clip in the play-list to said destination; and
  (d) controlling the server for receiving from the client additional play-list edit commands during the transmission of continuous media data from at least one clip in the play-list, and in response editing the play-list during the broadcast session without interruption of the transmission of continuous media data from the server to said destination.

59. The program storage device as claimed in claim 58, wherein the program is executable by the server for transmitting to the client an indication that transmission from a clip is complete each time the server has completed transmission of continuous media data from a clip in the play-list during the broadcast session.

60. The program storage device as claimed in claim 59, wherein the program is executable by the server for including a current version of the play-list in the indication that transmission from a clip is complete.

61. The program storage device as claimed in claim 58, wherein the program is executable by the server for transmitting to the client an indication that the play-list is empty when transmission of continuous media data from a last clip in the play-list is finished and the play-list becomes empty, and for de-allocating the server resources when the play-list is empty for more than a certain amount of time.

62. The program storage device as claimed in claim 58, wherein the program is executable by the server for receiving from the client a pause command for interrupting the transmission of continuous media data during the broadcast session, and for receiving from the client a resume command for resuming the transmission of continuous media data during the broadcast session, and wherein the command for beginning the broadcast session is substantially identical in format to the resume command.

63. The program storage device as claimed in claim 58, wherein the program is executable by the server for checking whether or not each of said play-list edit commands specifies a change of continuous media too close to broadcast time to avoid an interruption of transmission of the continuous media data from the server to said destination, and when one of said play-list edit commands is found to specify a change of continuous media too close to broadcast time to avoid an interruption of transmission of the continuous media data from the server to said destination, for not editing the play-list in response to said one of said play-list edit commands, and instead returning an error message to the client.

* * * * *